US012713469B2

(12) United States Patent
Agiwal et al.

(10) Patent No.: US 12,713,469 B2
(45) Date of Patent: Aug. 18, 2026

(54) METHOD AND APPARATUS FOR SELECTING RANDOM ACCESS PREAMBLE GROUP AND IDENTIFYING RNTI IN WIRELESS COMMUNICATION SYSTEM

(71) Applicant: Samsung Electronics Co., Ltd., Suwon-si (KR)

(72) Inventors: Anil Agiwal, Suwon-si (KR); Jaehyuk Jang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 412 days.

(21) Appl. No.: 17/677,554

(22) Filed: Feb. 22, 2022

(65) Prior Publication Data

US 2022/0279596 A1 Sep. 1, 2022

(30) Foreign Application Priority Data

Feb. 24, 2021 (KR) ........................ 10-2021-0025062

(51) Int. Cl.

| | |
|---|---|
| ***H04W 74/08*** | (2024.01) |
| ***H04L 27/26*** | (2006.01) |
| ***H04W 72/0446*** | (2023.01) |
| ***H04W 72/0453*** | (2023.01) |
| ***H04W 74/0833*** | (2024.01) |

(Continued)

(52) U.S. Cl.

CPC ... *H04W 74/0841* (2013.01); *H04L 27/26025* (2021.01); *H04W 72/0446* (2013.01); *H04W 72/0453* (2013.01); *H04W 74/0833* (2013.01); *H04W 74/0866* (2013.01); *H04W 74/0836* (2024.01); *H04W 74/0838* (2024.01)

(58) Field of Classification Search

CPC ......... H04W 74/0841; H04W 72/0446; H04W 72/0453; H04W 74/0866; H04W 74/0836; H04W 74/0838; H04W 74/0833; H04L 27/26025; H04L 27/2666

See application file for complete search history.

(56) References Cited

U.S. PATENT DOCUMENTS

| | | | |
|---|---|---|---|
| 10,467,471 | B2 | 11/2019 | Lee et al. |
| 2013/0222564 | A1 | 8/2013 | Park et al. |
| 2016/0371535 | A1 | 12/2016 | Li et al. |

(Continued)

FOREIGN PATENT DOCUMENTS

| | | | |
|---|---|---|---|
| JP | 2015-177510 | A | 10/2015 |
| JP | 6248178 | B2 | 12/2017 |
| KR | 10-2018-0108214 | A | 10/2018 |

OTHER PUBLICATIONS

3GPP; TSG RAN; NR; Physical layer procedures for control (Release 16)', 3GPP TS 38.213 V16.4.0, pp. 17-23, Jan. 8, 2021.

(Continued)

*Primary Examiner* — Kan Yuen

(74) *Attorney, Agent, or Firm* — Jefferson IP Law, LLP

(57) ABSTRACT

The disclosure relates to a 5th generation (5G) communication system or a 6th generation (6G) communication system for supporting higher data rates beyond a 4th generation (4G) communication system such as long term evolution (LTE). A method and an apparatus for selecting random access group and identifying radio network temporary identifier (RNTI) for random access procedure in next generation wireless communication system are provided.

16 Claims, 30 Drawing Sheets

(51) Int. Cl.
*H04W 74/0836* (2024.01)
*H04W 74/0838* (2024.01)

(56) References Cited

U.S. PATENT DOCUMENTS

2018/0167979 A1 6/2018 Guo et al.
2018/0359784 A1 12/2018 Agiwal et al.
2019/0208550 A1* 7/2019 Ko .......................... H04L 5/0053
2019/0278974 A1 9/2019 Lubin et al.
2020/0314917 A1 10/2020 Jeon et al.
2021/0204326 A1* 7/2021 Zhang .................... H04W 72/23
2022/0167427 A1* 5/2022 Ko .......................... H04L 5/0044
2022/0225416 A1* 7/2022 He .......................... H04L 5/0094
2022/0369380 A1* 11/2022 Zhang ............... H04W 72/0453
2022/0408492 A1* 12/2022 Shin ...................... H04W 16/14
2023/0046124 A1* 2/2023 Ko .......................... H04L 5/0051
2023/0071927 A1* 3/2023 Kim ........................ H04L 5/0048
2023/0108745 A1* 4/2023 Yang .................... H04W 74/006 370/329
2023/0156812 A1* 5/2023 Yang ........................ H04L 27/26 370/329
2023/0247676 A1* 8/2023 Shin ........................ H04L 5/0053
2023/0345541 A1* 10/2023 Li ............................ H04L 5/0048
2023/0354411 A1* 11/2023 Zhang ............... H04W 72/0446
2024/0098794 A1* 3/2024 Farag .................. H04W 74/006

OTHER PUBLICATIONS

Ericsson, 'Enhancements to Initial Access Procedures', R1-2002032, 3GPP TSG-RAN WG1 Meeting #100bis-e, e-Meeting, pp. 1-9, Apr. 11, 2020.

AT&T et al., 'RAN1 Ue features list for Rel-16 NR after RAN1#100-E', R1-2001484, 3GPP TSG RAN WG1 #100-e, e-Meeting, pp. 198-199, Apr. 10, 2020.

International Search Report with Written Opinion dated Jun. 2, 2022, issued in International Patent Application No. PCT/KR2022/002552.

International Search Report with Written Opinion dated Jul. 29, 2022, issued in International Patent Application No. PCT/KR2022/000058.

Extended European Search Report dated Apr. 30, 2024, issued in European Patent Application No. 22760008.7.

* cited by examiner

METHOD AND APPARATUS FOR SELECTING RANDOM ACCESS PREAMBLE GROUP AND IDENTIFYING RNTI IN WIRELESS COMMUNICATION SYSTEM

CROSS-REFERENCE TO RELATED APPLICATION(S)

This application is based on and claims priority under 35 U.S.C. § 119(a) of a Korean patent application number 10-2021-0025062, filed on Feb. 24, 2021, in the Korean Intellectual Property Office, the disclosure of which is incorporated by reference herein in its entirety.

BACKGROUND

1. Field

The disclosure relates to a wireless communication system. More particularly, the disclosure relates to an apparatus, a method and a system for selecting random access preamble group and identifying radio network temporary identifier (RNTI) for random access procedure in wireless communication system.

2. Description of Related Art

Considering the development of wireless communication from generation to generation, the technologies have been developed mainly for services targeting humans, such as voice calls, multimedia services, and data services. Following the commercialization of 5th-generation (5G) communication systems, it is expected that the number of connected devices will exponentially grow. Increasingly, these will be connected to communication networks. Examples of connected things may include vehicles, robots, drones, home appliances, displays, smart sensors connected to various infrastructures, construction machines, and factory equipment. Mobile devices are expected to evolve in various form-factors, such as augmented reality glasses, virtual reality headsets, and hologram devices. In order to provide various services by connecting hundreds of billions of devices and things in the 6th-generation (6G) era, there have been ongoing efforts to develop improved 6G communication systems. For these reasons, 6G communication systems are referred to as beyond-5G systems.

6G communication systems, which are expected to be commercialized around 2030, will have a peak data rate of tera (1,000 giga)-level bps and a radio latency less than 100 μsec, and thus will be 50 times as fast as 5G communication systems and have the 1/10 radio latency thereof.

In order to accomplish such a high data rate and an ultra-low latency, it has been considered to implement 6G communication systems in a terahertz band (for example, 95 GHz to 3 THz bands). It is expected that, due to severer path loss and atmospheric absorption in the terahertz bands than those in millimeter wave (mmWave) bands introduced in 5G, technologies capable of securing the signal transmission distance (i.e., coverage) will become more crucial. It is necessary to develop, as major technologies for securing the coverage, radio frequency (RF) elements, antennas, novel waveforms having a better coverage than orthogonal frequency division multiplexing (OFDM), beamforming and massive multiple input multiple output (MIMO), full dimensional MIMO (FD-MIMO), array antennas, and multiantenna transmission technologies such as large-scale antennas. In addition, there has been ongoing discussion on new technologies for improving the coverage of terahertz-band signals, such as metamaterial-based lenses and antennas, orbital angular momentum (OAM), and reconfigurable intelligent surface (RIS).

Moreover, in order to improve the spectral efficiency and the overall network performances, the following technologies have been developed for 6G communication systems: a full-duplex technology for enabling an uplink transmission and a downlink transmission to simultaneously use the same frequency resource at the same time; a network technology for utilizing satellites, high-altitude platform stations (HAPS), and the like in an integrated manner; an improved network structure for supporting mobile base stations and the like and enabling network operation optimization and automation and the like; a dynamic spectrum sharing technology via collision avoidance based on a prediction of spectrum usage; an use of artificial intelligence (AI) in wireless communication for improvement of overall network operation by utilizing AI from a designing phase for developing 6G and internalizing end-to-end AI support functions; and a next-generation distributed computing technology for overcoming the limit of user equipment (UE) computing ability through reachable super-high-performance communication and computing resources (such as mobile edge computing (MEC), clouds, and the like) over the network. In addition, through designing new protocols to be used in 6G communication systems, developing mechanisms for implementing a hardware-based security environment and safe use of data, and developing technologies for maintaining privacy, attempts to strengthen the connectivity between devices, optimize the network, promote softwarization of network entities, and increase the openness of wireless communications are continuing.

It is expected that research and development of 6G communication systems in hyper-connectivity, including person to machine (P2M) as well as machine to machine (M2M), will allow the next hyper-connected experience. Particularly, it is expected that services such as truly immersive extended reality (XR), high-fidelity mobile hologram, and digital replica could be provided through 6G communication systems. In addition, services such as remote surgery for security and reliability enhancement, industrial automation, and emergency response will be provided through the 6G communication system such that the technologies could be applied in various fields such as industry, medical care, automobiles, and home appliances.

Meanwhile, there have been various studies on random access procedure for enhanced wireless communication system recently.

The above information is presented as background information only to assist with an understanding of the disclosure. No determination has been made, and no assertion is made, as to whether any of the above might be applicable as prior art with regard to the disclosure.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a communication method and system for converging a fifth generation (5G) communication system for supporting higher data rates beyond a fourth generation (4G).

Additional aspects will be set forth in part in the description which follows and, in part, will be apparent from the description, or may be learned by practice of the presented embodiments.

In accordance with an aspect of the disclosure, a method performed by a terminal is provided. The method includes receiving, from a base station, physical random access channel (PRACH) configuration information including information on a subcarrier spacing for a random access preamble, transmitting, to the base station, the random access preamble for a random access procedure in a PRACH occasion by using the subcarrier spacing, identifying a radio network temporary identifier (RNTI) for the random access procedure based on the subcarrier spacing used for the random access preamble, and monitoring a physical downlink control channel (PDCCH) addressed to the RNTI in a random access response window, wherein the RNTI for the random access procedure is identified by using a parameter s_id which is an index of a first orthogonal frequency division multiplexing (OFDM) symbol of the PRACH occasion, a parameter t_id which is an index of a first slot of the PRACH occasion in a system frame, a parameter f_id which is an index of the PRACH occasion in a frequency domain, and a parameter ul_carrier_id which is an uplink carrier used for the random access preamble, and wherein, in case that the subcarrier spacing used for transmitting the random access preamble is larger than 120 kHz, the parameter t_id is identified based on an assumption that the subcarrier spacing for the random access preamble is 120 kHz and the system frame includes 80 slots.

In accordance with another aspect of the disclosure, a method performed by a base station is provided. The method includes transmitting, to a terminal, physical random access channel (PRACH) configuration information including information on a subcarrier spacing for a random access preamble, receiving, from the terminal, the random access preamble for a random access procedure in a PRACH occasion by using the subcarrier spacing, identifying a radio network temporary identifier (RNTI) for the random access procedure based on the subcarrier spacing used for the random access preamble, and transmitting, to the terminal, a physical downlink control channel (PDCCH) addressed to the RNTI in a random access response window, wherein the RNTI for the random access procedure is identified by using a parameter s_id which is an index of a first orthogonal frequency division multiplexing (OFDM) symbol of the PRACH occasion, a parameter t_id which is an index of a first slot of the PRACH occasion in a system frame, a parameter f_id which is an index of the PRACH occasion in a frequency domain, and a parameter ul_carrier_id which is an uplink carrier used for the random access preamble, and wherein, in case that the subcarrier spacing used for transmitting the random access preamble is larger than 120 kHz, the parameter t_id is identified based on an assumption that the subcarrier spacing for the random access preamble is 120 kHz and the system frame includes 80 slots.

In accordance with another aspect of the disclosure, a terminal is provided. The terminal includes a transceiver, and a controller configured to receive, from a base station, physical random access channel (PRACH) configuration information including information on a subcarrier spacing for a random access preamble, transmit, to the base station, the random access preamble for a random access procedure in a PRACH occasion by using the subcarrier spacing, identify a radio network temporary identifier (RNTI) for the random access procedure based on the subcarrier spacing used for the random access preamble, and monitor a physical downlink control channel (PDCCH) addressed to the RNTI in a random access response window, wherein the RNTI for the random access procedure is identified by using a parameter s_id which is an index of a first orthogonal frequency division multiplexing (OFDM) symbol of the PRACH occasion, a parameter t_id which is an index of a first slot of the PRACH occasion in a system frame, a parameter f_id which is an index of the PRACH occasion in a frequency domain, and a parameter ul_carrier_id which is an uplink carrier used for the random access preamble, and wherein, in case that the subcarrier spacing used for transmitting the random access preamble is larger than 120 kHz, the parameter t_id is identified based on an assumption that the subcarrier spacing for the random access preamble is 120 kHz and the system frame includes 80 slots.

In accordance with another aspect of the disclosure, a base station is provided. The base station includes a transceiver, and a controller configured to transmit, to a terminal, physical random access channel (PRACH) configuration information including information on a subcarrier spacing for a random access preamble, receive, from the terminal, the random access preamble for a random access procedure in a PRACH occasion by using the subcarrier spacing, identify a radio network temporary identifier (RNTI) for the random access procedure based on the subcarrier spacing used for the random access preamble, and transmit, to the terminal, a physical downlink control channel (PDCCH) addressed to the RNTI in a random access response window, wherein the RNTI for the random access procedure is identified by using a parameter s_id which is an index of a first orthogonal frequency division multiplexing (OFDM) symbol of the PRACH occasion, a parameter t_id which is an index of a first slot of the PRACH occasion in a system frame, a parameter f_id which is an index of the PRACH occasion in a frequency domain, and a parameter ul_carrier_id which is an uplink carrier used for the random access preamble, and wherein, in case that the subcarrier spacing used for transmitting the random access preamble is larger than 120 kHz, the parameter t_id is identified based on an assumption that the subcarrier spacing for the random access preamble is 120 kHz and the system frame includes 80 slots.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
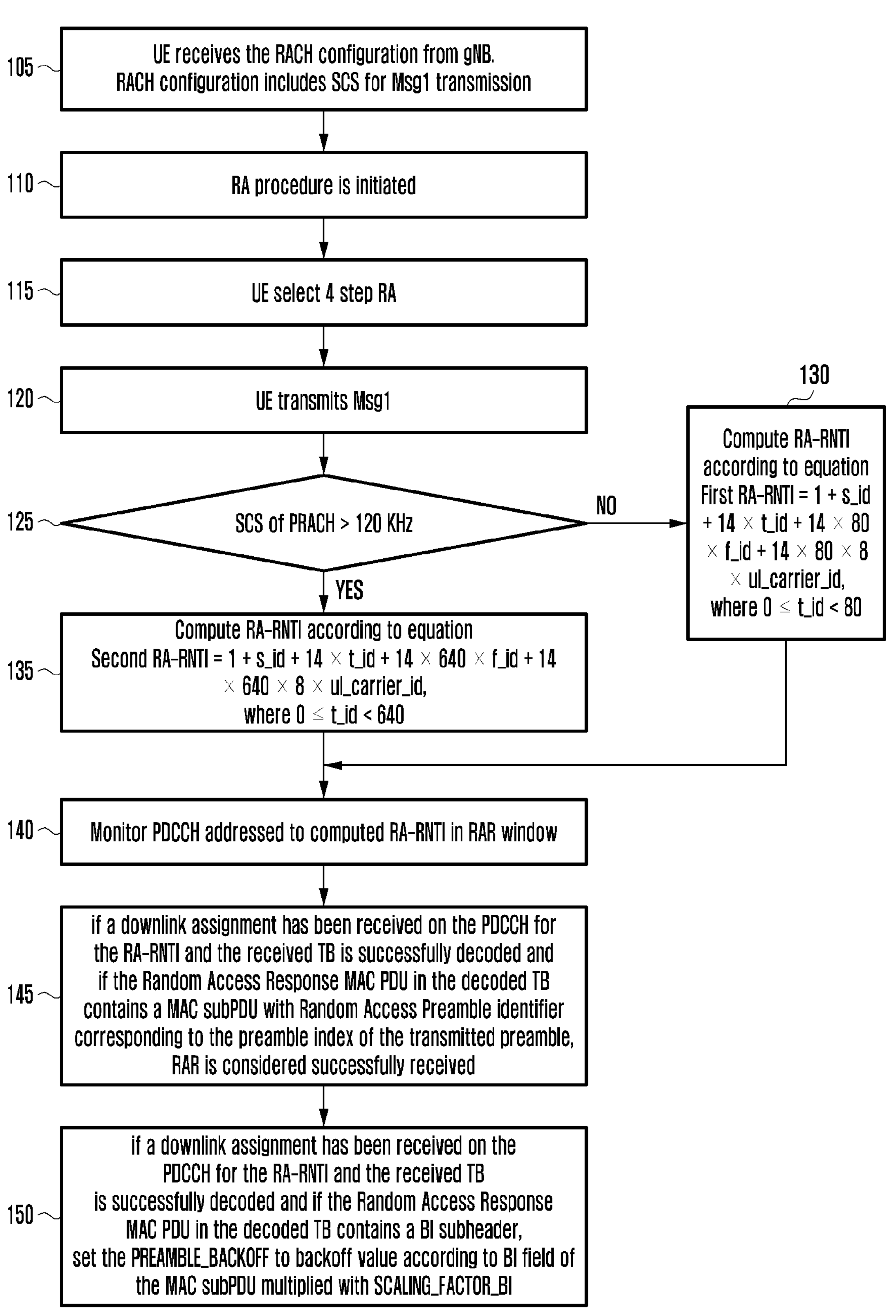
FIG. 1 illustrates an example of identifying random access associated RNTI according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms “a,” “an,” and “the” include plural referents unless the context clearly dictates otherwise. Thus, for example, reference to “a component surface” includes reference to one or more of such surfaces.

By the term “substantially” it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

It is known to those skilled in the art that blocks of a flowchart (or sequence diagram) and a combination of flowcharts may be represented and executed by computer program instructions. These computer program instructions may be loaded on a processor of a general purpose computer, special purpose computer, or programmable data processing equipment. When the loaded program instructions are executed by the processor, they create a means for carrying out functions described in the flowchart. Because the computer program instructions may be stored in a computer readable memory that is usable in a specialized computer or a programmable data processing equipment, it is also possible to create articles of manufacture that carry out functions described in the flowchart. Because the computer program instructions may be loaded on a computer or a programmable data processing equipment, when executed as processes, they may carry out operations of functions described in the flowchart.

A block of a flowchart may correspond to a module, a segment, or a code containing one or more executable instructions implementing one or more logical functions, or may correspond to a part thereof. In some cases, functions described by blocks may be executed in an order different from the listed order. For example, two blocks listed in sequence may be executed at the same time or executed in reverse order.

In this description, the words "unit", "module" or the like may refer to a software component or hardware component, such as, for example, a field-programmable gate array (FPGA) or an application-specific integrated circuit (ASIC) capable of carrying out a function or an operation. However, a "unit", or the like, is not limited to hardware or software. A unit, or the like, may be configured so as to reside in an addressable storage medium or to drive one or more processors. Units, or the like, may refer to software components, object-oriented software components, class components, task components, processes, functions, attributes, procedures, subroutines, program code segments, drivers, firmware, microcode, circuits, data, databases, data structures, tables, arrays or variables. A function provided by a component and unit may be a combination of smaller components and units, and may be combined with others to compose larger components and units. Components and units may be configured to drive a device or one or more processors in a secure multimedia card.

Prior to the detailed description, terms or definitions necessary to understand the disclosure are described. However, these terms should be construed in a non-limiting way.

The "base station" is an entity communicating with a user equipment (UE) and may be referred to as BS, base transceiver station (BTS), node B (NB), evolved NB (eNB), access point (AP), 5G NB (5GNB), or next generation node B (gNB), etc.

The "user equipment" is an entity communicating with a BS and/or another user equipment and may be referred to as the UE, device, mobile station (MS), mobile equipment (ME), or terminal.

In the recent years several broadband wireless technologies have been developed to meet the growing number of broadband subscribers and to provide more and better applications and services. The second generation wireless communication system has been developed to provide voice services while ensuring the mobility of users. Third generation wireless communication system supports not only the voice service but also data service. In recent years, the fourth wireless communication system has been developed to provide high-speed data service. However, currently, the fourth generation wireless communication system suffers from lack of resources to meet the growing demand for high speed data services. So fifth generation wireless communication system is being developed to meet the growing demand for high speed data services, support ultra-reliability and low latency applications.

The fifth generation wireless communication system will be implemented not only in lower frequency bands but also in higher frequency (mmWave) bands, e.g., 10 GHz to 100 GHz bands, so as to accomplish higher data rates. To mitigate propagation loss of the radio waves and increase the transmission distance, the beamforming, massive Multiple-Input Multiple-Output (MIMO), Full Dimensional MIMO (FD-MIMO), array antenna, an analog beam forming, large scale antenna techniques are being considered in the design of fifth generation wireless communication system. In addition, the fifth generation wireless communication system is expected to address different use cases having quite different requirements in terms of data rate, latency, reliability, mobility etc. However, it is expected that the design of the air-interface of the fifth generation wireless communication system would be flexible enough to serve the UEs having quite different capabilities depending on the use case and market segment the UE cater service to the end customer. Few example use cases the fifth generation wireless communication system wireless system is expected to address is enhanced Mobile Broadband (eMBB), massive Machine Type Communication (m-MTC), ultra-reliable low latency communication (URLL) etc. The eMBB requirements like tens of Gbps data rate, low latency, high mobility so on and so forth address the market segment representing the conventional wireless broadband subscribers needing internet connectivity everywhere, all the time and on the go. The m-MTC requirements like very high connection density, infrequent data transmission, very long battery life, low mobility address so on and so forth address the market segment representing the Internet of Things (IoT)/Internet of Everything (IoE) envisioning connectivity of billions of devices. The URLL requirements like very low latency, very high reliability and variable mobility so on and so forth address the market segment representing the Industrial automation application, vehicle-to-vehicle/vehicle-to-infrastructure communication foreseen as one of the enabler for autonomous cars.

In the fifth generation wireless communication system operating in higher frequency (mmWave) bands, the UE and the gNB communicates with each other using Beamforming. Beamforming techniques are used to mitigate the propagation path losses and to increase the propagation distance for communication at higher frequency band. Beamforming enhances the transmission and reception performance using a high-gain antenna. Beamforming can be classified into Transmission (TX) beamforming performed in a transmitting end and reception (RX) beamforming performed in a receiving end. In general, the TX beamforming increases directivity by allowing an area in which propagation reaches to be densely located in a specific direction by using a plurality of antennas.

In this situation, aggregation of the plurality of antennas can be referred to as an antenna array, and each antenna included in the array can be referred to as an array element. The antenna array can be configured in various forms such as a linear array, a planar array, etc. The use of the TX beamforming results in the increase in the directivity of a signal, thereby increasing a propagation distance. Further, since the signal is almost not transmitted in a direction other than a directivity direction, a signal interference acting on another receiving end is significantly decreased. The receiving end can perform beamforming on a RX signal by using a RX antenna array. The RX beamforming increases the RX signal strength transmitted in a specific direction by allowing propagation to be concentrated in a specific direction, and excludes a signal transmitted in a direction other than the specific direction from the RX signal, thereby providing an effect of blocking an interference signal.

By using beamforming technique, a transmitter can make plurality of transmit beam patterns of different directions. Each of these transmit beam patterns can be also referred as TX beam. Wireless communication system operating at high frequency uses plurality of narrow TX beams to transmit signals in the cell as each narrow TX beam provides coverage to a part of cell. The narrower the TX beam, higher is the antenna gain and hence the larger the propagation distance of signal transmitted using beamforming. A receiver can also make plurality of RX beam patterns of different directions. Each of these receive patterns can be also referred as RX beam.

The fifth generation wireless communication system (also referred as next generation radio or NR), supports standalone mode of operation as well dual connectivity (DC). In DC a multiple Rx/Tx UE may be configured to utilize resources provided by two different nodes (or NBs) connected via non-ideal backhaul. One node acts as the Master Node (MN) and the other as the Secondary Node (SN). The MN and SN are connected via a network interface and at least the MN is connected to the core network. NR also supports Multi-RAT Dual Connectivity (MR-DC) operation whereby a UE in radio resource control connected (RRC_CONNECTED) is configured to utilize radio resources provided by two distinct schedulers, located in two different nodes connected via a non-ideal backhaul and providing either E-UTRA (Evolved Universal Mobile Telecommunications System (UNITS) Terrestrial Radio Access) (i.e., if the node is an ng-eNB) or NR access (i.e., if the node is a gNB). In NR for a UE in RRC_CONNECTED not configured with carrier aggregation (CA)/DC there is only one serving cell comprising of the primary cell. For a UE in RRC_CONNECTED configured with CA/DC the term 'serving cells' is used to denote the set of cells comprising of the Special Cell(s) and all secondary cells. In NR the term Master Cell Group (MCG) refers to a group of serving cells associated with the Master Node, comprising of the Primary Cell (PCell) and optionally one or more Secondary Cells (SCells). In NR the term Secondary Cell Group (SCG) refers to a group of serving cells associated with the Secondary Node, comprising of the Primary SCG Cell (PSCell) and optionally one or more SCells. In NR PCell refers to a serving cell in MCG, operating on the primary frequency, in which the UE either performs the initial connection establishment procedure or initiates the connection re-establishment procedure. In NR for a UE configured with CA, SCell is a cell providing additional radio resources on top of Special Cell. PSCell refers to a serving cell in SCG in which the UE performs random access when performing the Reconfiguration with Sync procedure. For Dual Connectivity operation the term SpCell (i.e., Special Cell) refers to the PCell of the MCG or the PSCell of the SCG, otherwise the term Special Cell refers to the PCell.

In the fifth generation wireless communication system (or NR), Physical Downlink Control Channel (PDCCH) is used to schedule downlink (DL) transmissions on Physical Downlink Shared Channel (PDSCH) and uplink (UL) transmissions on Physical Uplink Shared Channel (PUSCH), where the Downlink Control Information (DCI) on the PDCCH includes: Downlink assignments containing at least modulation and coding format, resource allocation, and hybrid automatic repeat request (HARQ) information related to downlink shared channel (DL-SCH); Uplink scheduling grants containing at least modulation and coding format, resource allocation, and hybrid-ARQ information related to uplink shared channel (UL-SCH). In addition to scheduling, the PDCCH can be used to for: Activation and deactivation of configured PUSCH transmission with configured grant; Activation and deactivation of PDSCH semi-persistent transmission; Notifying one or more UEs of the slot format; Notifying one or more UEs of the physical resource block(s) (PRB(s)) and orthogonal frequency division multiplexing (OFDM) symbol(s) where the UE may assume no transmission is intended for the UE; Transmission of transmission power control (TPC) commands for Physical Uplink Control Channel (PUCCH) and PUSCH; Transmission of one or more TPC commands for sounding reference signal (SRS) transmissions by one or more UEs; Switching a UE's active bandwidth part; Initiating a random access procedure.

A UE monitors a set of PDCCH candidates in the configured monitoring occasions in one or more configured COntrol REsource SETs (CORESETs) according to the corresponding search space configurations. A CORESET consists of a set of PRBs with a time duration of 1 to 3 OFDM symbols. The resource units Resource Element Groups (REGs) and Control Channel Elements (CCEs) are defined within a CORESET with each CCE consisting a set of REGs. Control channels are formed by aggregation of CCE. Different code rates for the control channels are realized by aggregating different number of CCE. Interleaved and non-interleaved CCE-to-REG mapping are supported in a CORESET. Polar coding is used for the PDCCH. Each resource element group carrying PDCCH carries its own demodulation reference signal (DMRS). Quadrature phase shift keying (QPSK) modulation is used for the PDCCH.

In NR, a list of search space configurations are signaled by the gNB for each configured bandwidth part (BWP) wherein each search configuration is uniquely identified by an identifier. Identifier (ID) of search space configuration to be used for specific purpose such as paging reception, system information (SI) reception, random access response (RAR) reception is explicitly signaled by the gNB. In NR search space configuration comprises of parameters Monitoring-periodicity-PDCCH-slot, Monitoring-offset-PDCCH-slot, Monitoring-symbols-PDCCH-within-slot and duration. A UE determines the PDCCH monitoring occasion (s) within a slot using the parameters PDCCH monitoring periodicity (Monitoring-periodicity-PDCCH-slot), the PDCCH monitoring offset (Monitoring-offset-PDCCH-slot), and the PDCCH monitoring pattern (Monitoring-symbols-PDCCH-within-slot). The PDCCH monitoring occasions are there in slots 'x' to x+duration where the slot with number 'x' in a radio frame with number 'y' satisfies the Equation 1 below:

$$(y^*(\text{number of slots in a radio frame})+x-\text{Monitoring-offset-PDCCH-slot}) \bmod (\text{Monitoring-periodicity-PDCCH-slot})=0; \quad \text{Equation 1}$$

The starting symbol of a PDCCH monitoring occasion in each slot having the PDCCH monitoring occasion is given by Monitoring-symbols-PDCCH-within-slot. The length (in symbols) of a PDCCH monitoring occasion is given in the corset associated with the search space. Search space configuration includes the identifier of CORESET configuration associated with it. A list of CORESET configurations are signaled by the gNB for each configured BWP wherein each CORESET configuration is uniquely identified by an identifier. Note that each radio frame is of 10 ms duration. Radio frame is identified by a radio frame number or system frame number. Each radio frame comprises of several slots wherein the number of slots in a radio frame and duration of slots depends on sub carrier spacing. The number of slots in a radio frame and duration of slots depends radio frame for each supported subcarrier spacing (SCS) is pre-defined in NR. Each CORESET configuration is associated with a list of TCI (Transmission configuration indicator) states. One DL reference signal (RS) identifier (ID) (SSB or channel state information reference signal (CSI-RS)) is configured per TCI state. The list of TCI states corresponding to a CORESET configuration is signaled by the gNB via RRC signaling. One of the TCI state in TCI state list is activated and indicated to the UE by the gNB. TCI state indicates the DL TX beam (DL TX beam is quasi-collocated (QCLed) with SSB/CSI RS of TCI state) used by the gNB for transmission of the PDCCH in the PDCCH monitoring occasions of a search space.

In NR bandwidth adaptation (BA) is supported. With BA, the receive and transmit bandwidth of a UE need not be as large as the bandwidth of the cell and can be adjusted: the width can be ordered to change (e.g. to shrink during period of low activity to save power); the location can move in the frequency domain (e.g. to increase scheduling flexibility); and the subcarrier spacing can be ordered to change (e.g. to allow different services). A subset of the total cell bandwidth of a cell is referred to as a Bandwidth Part (BWP).

BA is achieved by configuring RRC connected UE with BWP(s) and telling the UE which of the configured BWPs is currently the active one. When BA is configured, the UE only has to monitor the PDCCH on the one active BWP i.e., it does not have to monitor the PDCCH on the entire DL frequency of the serving cell. In RRC connected state, the UE is configured with one or more DL and UL BWPs, for each configured Serving Cell (i.e., PCell or SCell). For an activated Serving Cell, there is always one active UL and DL BWP at any point in time. The BWP switching for a Serving Cell is used to activate an inactive BWP and deactivate an active BWP at a time. The BWP switching is controlled by the PDCCH indicating a downlink assignment or an uplink grant, by the bwp-InactivityTimer, by RRC signaling, or by the medium access control (MAC) entity itself upon initiation of Random Access procedure. Upon addition of SpCell or activation of an SCell, the DL BWP and UL BWP indicated by firstActiveDownlinkBWP-Id and firstActiveUplinkBWP-Id respectively is active without receiving the PDCCH indicating a downlink assignment or an uplink grant. The active BWP for a Serving Cell is indicated by either RRC or the PDCCH. For unpaired spectrum, a DL BWP is paired with a UL BWP, and BWP switching is common for both UL and DL. Upon expiry of BWP inactivity timer UE switch to the active DL BWP to the default DL BWP or initial DL BWP (if default DL BWP is not configured).

In the 5G wireless communication system, random access (RA) is supported. Random access (RA) is used to achieve uplink (UL) time synchronization. RA is used during initial access, handover, RRC connection re-establishment procedure, scheduling request transmission, SCG addition/modification, beam failure recovery and data or control information transmission in UL by non-synchronized UE in RRC CONNECTED state. Several types of random access procedure is supported.

Contention based random access (CBRA): This is also referred as 4 step CBRA. In this type of random access, the UE first transmits Random Access preamble (also referred as Msg1) and then waits for Random access response (RAR) in the RAR window. RAR is also referred as Msg2. Next generation node B (gNB) transmits the RAR on PDSCH. The PDCCH scheduling the PDSCH carrying RAR is addressed to RA-radio network temporary identifier (RA-RNTI). RA-RNTI identifies the time-frequency resource (also referred as physical RA channel (PRACH) occasion or PRACH transmission (TX) occasion or RA channel (RACH) occasion) in which RA preamble was detected by the gNB. The RA-RNTI is calculated as follows: RA-RNTI=1+s_id+14*t_id+14*80*f_id+14*80*8*ul_carrier_id, where s_id is the index of the first orthogonal frequency division multiplexing (OFDM) symbol of the PRACH occasion where the UE has transmitted Msg1, i.e., RA preamble; $0 \leq s\_id < 14$; t_id is the index of the first slot of the PRACH occasion ($0 \leq t\_id < 80$); f_id is the index of the PRACH occasion within the slot in the frequency domain ($0 \leq f\_id < 8$), and ul_carrier_id is the UL carrier used for Msg1 transmission (0 for normal UL (NUL) carrier and 1 for supplementary UL (SUL) carrier. Several RARs for various Random access preambles detected by the gNB can be multiplexed in the same RAR MAC protocol data unit (PDU) by the gNB. An RAR in MAC PDU corresponds to UE's RA preamble transmission if the RAR includes an RA preamble identifier (RAPID) of RA preamble transmitted by the UE. If the RAR corresponding to its RA preamble transmission is not received during the RAR window and UE has not yet transmitted the RA preamble for a configurable (configured by the gNB in RACH configuration) number of times, the UE goes back to first step i.e., select random access resource (preamble/RACH occasion) and transmits the RA preamble. A backoff may be applied before going back to first step.

If the RAR corresponding to its RA preamble transmission is received the UE transmits message 3 (Msg3) in UL grant received in RAR. Msg3 includes message such as RRC connection request, RRC connection re-establishment request, RRC handover confirm, scheduling request, SI request etc. It may include the UE identity (i.e., cell-radio network temporary identifier (C-RNTI) or system architecture evolution (SAE)-temporary mobile subscriber identity (S-TMSI) or a random number). After transmitting the Msg3, the UE starts a contention resolution timer. While the contention resolution timer is running, if the UE receives a PDCCH addressed to C-RNTI included in Msg3, contention resolution is considered successful, contention resolution timer is stopped and RA procedure is completed. While the contention resolution timer is running, if the UE receives contention resolution MAC control element (CE) including the UE's contention resolution identity (first X bits of common control channel (CCCH) service data unit (SDU) transmitted in Msg3), contention resolution is considered successful, contention resolution timer is stopped and RA procedure is completed. If the contention resolution timer expires and the UE has not yet transmitted the RA preamble for a configurable number of times, the UE goes back to first step i.e., select random access resource (preamble/RACH occasion) and transmits the RA preamble. A backoff may be applied before going back to first step.

Contention free random access (CFRA): This is also referred as legacy CFRA or 4 step CFRA. CFRA procedure is used for scenarios such as handover where low latency is required, timing advance establishment for SCell, etc. Evolved node B (eNB) assigns to the UE dedicated Random access preamble. The UE transmits the dedicated RA preamble. The eNB transmits the RAR on PDSCH addressed to RA-RNTI. RAR conveys RA preamble identifier and timing alignment information. RAR may also include UL grant. RAR is transmitted in RAR window similar to CBRA procedure. CFRA is considered successfully completed after receiving the RAR including RAPID of RA preamble transmitted by the UE. In case RA is initiated for beam failure recovery, CFRA is considered successfully completed if the PDCCH addressed to C-RNTI is received in search space for beam failure recovery. If the RAR window expires and RA is not successfully completed and the UE has not yet transmitted the RA preamble for a configurable (configured by the gNB in RACH configuration) number of times, the UE retransmits the RA preamble.

For certain events such has handover and beam failure recovery if dedicated preamble(s) are assigned to UE, during first step of random access i.e., during random access resource selection for Msg1 transmission, the UE determines whether to transmit dedicated preamble or non-dedicated preamble. Dedicated preambles are typically provided for a subset of SSBs/CSI-RSs. If there is no SSB/CSI-RS having DL reference signal received power (RSRP) above a threshold amongst the SSBs/CSI-RSs for which contention free random access resources (i.e., dedicated preambles/ROs) are provided by the gNB, the UE selects non-dedicated preamble. Otherwise, the UE selects a dedicated preamble. So during the RA procedure, one random access attempt can be CFRA while other random access attempt can be CBRA.

2 step contention based random access (2 step CBRA): In the first step, the UE transmits random access preamble on PRACH and a payload (i.e., MAC PDU) on the PUSCH. The random access preamble and payload transmission are also referred as MsgA. In the second step, after MsgA transmission, the UE monitors for a response from the network (i.e., gNB) within a configured window. The response is also referred as MsgB. Next generation node B (gNB) transmits the MsgB on PDSCH. The PDCCH scheduling the PDSCH carrying MsgB is addressed to MsgB-radio network temporary identifier (MSGB-RNTI). MSGB-RNTI identifies the time-frequency resource (also referred as physical RA channel (PRACH) occasion or PRACH transmission (TX) occasion or RA channel (RACH) occasion) in which RA preamble was detected by the gNB. The MSGB-RNTI is calculated as follows: MSGB-RNTI=1+s_id+14*t_id+14*80*f_id+14*80*8*ul_carrier_id+14*80*8*2, where s_id is the index of the first OFDM symbol of the PRACH occasion where the UE has transmitted Msg1, i.e., RA preamble; 0≤s_id<14; t_id is the index of the first slot of the PRACH occasion (0≤t_id<80); f_id is the index of the PRACH occasion within the slot in the frequency domain (0≤f_id<8), and ul_carrier_id is the UL carrier used for Msg1 transmission (0 for normal UL (NUL) carrier and 1 for supplementary UL (SUL) carrier.

If CCCH SDU was transmitted in MsgA payload, the UE performs contention resolution using the contention resolution information in MsgB. The contention resolution is successful if the contention resolution identity received in MsgB matches first 48 bits of CCCH SDU transmitted in MsgA. If C-RNTI was transmitted in MsgA payload, the contention resolution is successful if the UE receives the PDCCH addressed to C-RNTI. If contention resolution is successful, random access procedure is considered successfully completed. Instead of contention resolution information corresponding to the transmitted MsgA, MsgB may include a fallback information corresponding to the random access preamble transmitted in MsgA. If the fallback information is received, the UE transmits Msg3 and performs contention resolution using Msg4 as in CBRA procedure. If contention resolution is successful, random access procedure is considered successfully completed. If contention resolution fails upon fallback (i.e., upon transmitting Msg3), the UE retransmits MsgA. If configured window in which the UE monitors network response after transmitting MsgA expires and the UE has not received MsgB including contention resolution information or fallback information as explained above, the UE retransmits MsgA. If the random access procedure is not successfully completed even after transmitting the MsgA configurable number of times, the UE fallbacks to 4 step RACH procedure i.e., the UE only transmits the PRACH preamble.

MsgA payload may include one or more of CCCH SDU, dedicated control channel (DCCH) SDU, dedicated traffic channel (DTCH) SDU, buffer status report (BSR) MAC CE, power headroom report (PHR) MAC CE, SSB information, C-RNTI MAC CE, or padding. MsgA may include the UE ID (e.g. random ID, S-TMSI, C-RNTI, resume ID, etc.) along with preamble in first step. The UE ID may be included in the MAC PDU of the MsgA. The UE ID such as C-RNTI may be carried in MAC CE wherein MAC CE is included in MAC PDU. Other UE IDs (such random ID, S-TMSI, C-RNTI, resume ID, etc.) may be carried in CCCH SDU. The UE ID can be one of random ID, S-TMSI, C-RNTI, resume ID, IMSI, idle mode ID, inactive mode ID, etc. The UE ID can be different in different scenarios in which the UE performs the RA procedure. When the UE performs RA after power on (before it is attached to the network), then UE ID is the random ID. When the UE perform RA in IDLE state after it is attached to network, the UE ID is S-TMSI. If the UE has an assigned C-RNTI (e.g. in connected state), the UE ID is C-RNTI. In case the UE is in INACTIVE state, the UE ID is resume ID. In addition to the UE ID, some addition ctrl information can be sent in MsgA. The control information may be included in the MAC PDU of the MsgA. The control information may include one or more of connection request indication, connection resume request indication, SI request indication, buffer status indication, beam information (e.g. one or more DL TX beam ID(s) or SSB ID(s)), beam failure recovery indication/information, data indicator, cell/BS/TRP switching indication, connection re-establishment indication, reconfiguration complete or handover complete message, etc.

2 step contention free random access (2 step CFRA): In this case gNB assigns to the UE dedicated Random access preamble (s) and PUSCH resource(s) for MsgA transmission. RO(s) to be used for preamble transmission may also be indicated. In the first step, the UE transmits random access preamble on PRACH and a payload on the PUSCH using the contention free random access resources (i.e., dedicated preamble/PUSCH resource/RO). In the second step, after MsgA transmission, the UE monitors for a response from the network (i.e., gNB) within a configured window. The response is also referred as MsgB.

gNB transmits the MsgB on PDSCH. The PDCCH scheduling the PDSCH carrying MsgB is addressed to MsgB-radio network temporary identifier (MSGB-RNTI). MSGB-RNTI identifies the time-frequency resource (also referred as PRACH occasion or PRACH transmission (TX) occasion or RACH occasion) in which RA preamble was detected by the gNB. The MSGB-RNTI is calculated as follows: MSGB-RNTI=1+s_id+14*t_id+14*80*f_id+14*80*8*ul_carrier_id+14*80*8*2, where s_id is the index of the first OFDM symbol of the PRACH occasion where the UE has transmitted Msg1, i.e., RA preamble; 0≤s_id<14; t_id is the index of the first slot of the PRACH occasion (0≤t_id<80); f_id is the index of the PRACH occasion within the slot in the frequency domain (0≤f_id<8), and ul_carrier_id is the UL carrier used for Msg1 transmission (0 for normal UL (NUL) carrier and 1 for supplementary UL (SUL) carrier.

If the UE receives the PDCCH addressed to C-RNTI, random access procedure is considered successfully completed. If the UE receives fallback information corresponding to its transmitted preamble, random access procedure is considered successfully completed.

For certain events such has handover and beam failure recovery if dedicated preamble(s) and the PUSCH resource(s) are assigned to the UE, during first step of random access i.e., during random access resource selection for MsgA transmission the UE determines whether to transmit dedicated preamble or non-dedicated preamble. Dedicated preambles is typically provided for a subset of SSBs/CSI RSs. If there is no SSB/CSI RS having DL RSRP above a threshold amongst the SSBs/CSI RSs for which contention free random access resources (i.e., dedicated preambles/ROs/PUSCH resources) are provided by the gNB, the UE selects non dedicated preamble. Otherwise, the UE selects a dedicated preamble. So during the RA procedure, one random access attempt can be 2 step CFRA while other random access attempt can be 2 step CBRA.

According to the current design, SCS for PRACH can be up to 120 KHz. At 120 KHz, there are 8 slots in a subframe and 80 slots in a system frame. At higher frequency bands (e.g. from 52.6 GHz to 71 GHz), two new SCSs, 480 KHz and 960 KHz should be supported for PRACH. For SCS of 480 KHz, there are 320 slots in a system frame. For SCS of 960 KHz, there are 640 slots in a system frame. If the current RA-RNTI and MsgB-RNTI are used, in slots with slot index >79 cannot be configured with PRACH occasion. This may increase the RA latency due to unavailability of PRACH occasions from slot 79 to slot 320 (or slot 639) in a radio frame.

During the random access procedure initialization, the UE first selects the carrier (SUL or NUL). If the carrier to use for the Random Access procedure is explicitly signaled by the gNB, the UE selects the signaled carrier for performing Random Access procedure. If the carrier to use for the Random Access procedure is not explicitly signaled; and if the Serving Cell for the Random Access procedure is configured with supplementary uplink and if the RSRP of the downlink pathloss reference is less than rsrp-Threshold-SSB-SUL: the UE selects the SUL carrier for performing Random Access procedure. Otherwise, the UE selects the NUL carrier for performing Random Access procedure.

Upon selecting the UL carrier, the UE determines the UL and DL BWP for random access procedure as shown below:

For the selected carrier of the Serving Cell for the random access procedure:

```
1> if PRACH occasions are not configured for the active UL BWP; or
1> if the random access procedure is initiated by the PDCCH order
and the ra-PreambleIndex explicitly provided by the PDCCH is not
0b000000 and 4 step PRACH occasions are not configured for the active
UL BWP:
        2> switch the active UL BWP to BWP indicated by
initialUplinkBWP;
        2> if the Serving Cell is an SpCell:
            3> switch the active DL BWP to BWP indicated by
initialDownlinkBWP.
1>      else:
        2> if the Serving Cell is an SpCell:
            3> if the active DL BWP does not have the same bwp-
Id as the active UL BWP:
                4> switch the active DL BWP to the DL BWP
with the same bwp-Id as the active UL BWP.
```

UE then determine whether to perform 2 step or 4 step RACH for this random access procedure.

1> If this Random Access procedure is initiated by the PDCCH order and if the ra-PreambleIndex explicitly provided by the PDCCH is not 0b000000; or 1> if the Random Access procedure was initiated for SI request and the Random Access Resources for SI request have been explicitly provided by RRC; or 1> if the Random Access procedure was initiated for beam failure recovery and if the contention-free Random Access Resources for beam failure recovery request for 4-step random access have been explicitly provided by RRC for the BWP selected for random access procedure; or 1> if the Random Access procedure was initiated for reconfiguration with sync and if the contention-free Random Access Resources for 4-step random access have been explicitly provided in rach-ConfigDedicated for the BWP selected for random access:

UE selects 4 step RA.

1> else if the BWP selected for random access procedure is configured with both 2-step and 4-step random access resources and the RSRP of the downlink pathloss reference is above RSRP_THRESHOLD_RA_TYPE_SELECTION; or 1> if the BWP selected for random access procedure is only configured with 2-step random access resources (i.e., no 4-step RACH resources configured); or 1> if the Random Access procedure was initiated for reconfiguration with sync and if the contention-free Random Access Resources for 2-step random access have been explicitly provided in rach-ConfigDedicated for the BWP selected for random access:

```
    - UE selects 2 step RA
1> Else:
    - UE selects 4 step RA
```

UL carrier for random access procedure is explicitly signaled by the gNB during handover or reconfiguration with sync for 4 step RACH. If gNB wants the UE to select NUL for 4 step RACH, it provides 4 step contention free random access resources for NUL in reconfiguration message. If gNB wants the UE to select SUL for 4 step RACH, it provides 4 step contention free random access resources for SUL in reconfiguration message. In an embodiment, UL carrier for 2 step random access procedure is also explicitly signaled by the gNB during handover or reconfiguration with sync. If gNB want the UE to select NUL for 2 step RACH, it provides 2 step contention free random access resources for NUL in reconfiguration message. If gNB wants the UE to select SUL for 2 step RACH, it provides 2 step contention free random access resources for SUL in reconfiguration message.

If 2 step contention free random access resources for SUL is signaled by the gNB during handover or reconfiguration with sync, the UE selects SUL and RACH type selected is 2 step RACH. If 2 step contention free random access resources for NUL is signaled by the gNB during handover or reconfiguration with sync, the UE selects NUL and RACH type selected is 2 step RACH. If 4 step contention free random access resources for SUL is signaled by the gNB during handover or reconfiguration with sync, the UE selects SUL and RACH type selected is 4 step RACH. If 4 step contention free random access resources for NUL is signaled by the gNB during handover or reconfiguration with sync, the UE selects NUL and RACH type selected is 4 step RACH.

If the UE has selected 4 step RA procedure:

UE transmits MSG1. The MSG1 of the 4-step RA type consists of a preamble on PRACH. After MSG1 transmission, the UE monitors for a response from the network within a configured window. For CFRA, dedicated preamble for MSG1 transmission is assigned by the network and upon receiving random access response from the network, the UE ends the random access procedure. For CBRA, upon reception of the random access response, the UE sends MSG3 using the UL grant scheduled in the response and monitors contention resolution. If contention resolution is not successful after MSG3 (re)transmission(s), the UE goes back to MSG1 transmission.

- PDCCH monitoring for network response for 4 step RA:
  * if the contention-free Random Access Preamble for beam failure recovery request was transmitted:
    ** start the ra-ResponseWindow configured in BeamFailureRecoveryConfig at the first PDCCH occasion from the end of the Random Access Preamble transmission
    ** monitor for a PDCCH transmission on the search space indicated by recoverySearchSpaceId of the SpCell identified by the C-RNTI while ra-ResponseWindow is running.
  * else:
    ** start the ra-ResponseWindow configured in RACH-ConfigCommon at the first PDCCH occasion from the end of the Random Access Preamble transmission;
    ** monitor the PDCCH of the SpCell for Random Access Response identified by the RA-RNTI while the ra-ResponseWindow is running.
    ** The RA-RNTI is computed as explained in embodiments in this disclosure.

If the UE has selected 2 step RA procedure

UE transmits MsgA. The MSGA of the 2-step RA type includes a preamble on PRACH and a payload on the PUSCH. After MSGA transmission, the UE monitors for a response from the network within a configured window. For CFRA, dedicated preamble and the PUSCH resource are configured for MSGA transmission and upon receiving the network response, the UE ends the random access procedure. For CBRA, if contention resolution is successful upon receiving the network response, the UE ends the random access procedure. while if fallback indication is received in MSGB, the UE performs MSG3 transmission using the UL grant scheduled in the fallback indication and monitors contention resolution. If contention resolution is not successful after MSG3 (re)transmission(s), the UE goes back to MSGA transmission. If the random access procedure with 2-step RA type is not completed after a number of MSGA transmissions, the UE can be configured to switch to CBRA with 4-step RA type.

- PDCCH monitoring for network response for 2 step RA:
  * start the msgB-ResponseWindow
  * if C-RNTI MAC CE was included in the MSGA:
    ** monitor the PDCCH of the SpCell for Random Access Response identified by the C-RNTI while the msgB-ResponseWindow is running.
  * monitor the PDCCH of the SpCell for a Random Access Response identified by MSGB-RNTI while the msgB-ResponseWindow is running;
    ** The MSGB -RNTI is computed as explained in embodiments in this disclosure.

Embodiment 1 (Two RA-RNTIs)

In this embodiment of this disclosure for receiving/transmitting RAR for 4 step RA by the UE/gNB, two RA-RNTIs are defined, first RA-RNTI and second RA-RNTI, wherein the first RA-RNTI and second RA-RNTI are computed as follows:

$$\text{First RA-RNTI}=1+s\_id+14*t\_id+14*80*f\_id+14*80*8*ul\_carrier\_id,$$

where s_id is the index of the first OFDM symbol of the PRACH occasion (0≤s_id<14), t_id is the index of the first slot of the PRACH occasion in a system frame (0≤t_id<80), f_id is the index of the PRACH occasion in the frequency domain (0≤f_id<8), and ul_carrier_id is the UL carrier used for Random Access Preamble transmission (0 for NUL carrier, and 1 for SUL carrier). Slots in a system frame are indexed sequentially starting from zero. The PRACH occasion is the one in which the UE has transmitted preamble. For the gNB operation PRACH occasion is the one in which it has received preamble. The slots in system frame are indexed sequentially starting from zero.

$$\text{Second RA-RNTI}=1+s\_id+14*t\_id+14*640*f\_id+14*640*8*ul\_carrier\_id,$$

where s_id is the index of the first OFDM symbol of the PRACH occasion (0≤s_id<14), t_id is the index of the first slot of the PRACH occasion in a system frame (0≤t_id<640), f_id is the index of the PRACH occasion in the frequency domain (0≤f_id<8), and ul_carrier_id is the UL carrier used for Random Access Preamble transmission (0 for NUL carrier, and 1 for SUL carrier). Slots in a system frame are indexed sequentially starting from zero. The PRACH occasion is the one in which the UE has transmitted preamble. For the gNB operation PRACH occasion is the one in which it has received preamble. The slots in system frame are indexed sequentially starting from zero.

UE/gNB select between the first RA-RNTI and second RA-RNTI as follows:

UE/gNB first determine the SCS for PRACH corresponding to the transmitted/received preamble SCS for PRACH is signaled by the gNB in the RACH configuration (e.g., the RACH-ConfigCommon for 4 step RA.). The RACH configuration used by the UE is the RACH configuration in the BWP configuration of UL BWP selected for random access procedure. The BWP configuration is signaled by the gNB in system information or in dedicated RRC signaling message (i.e., RRCReconfiguration message). The BWP configuration in system information is typically used in RRC_IDLE/RRC_INACTIVE state. The BWP configuration in dedicated RRC signaling message is typically used in RRC_CONNECTED state.

- If SCS of PRACH > 120 KHz (or if SCS of PRACH is 480 KHz or 960 KHz):
  * UE/gNB uses second RA-RNTI for RAR reception/transmission
- Else
  * UE/gNB uses first RA-RNTI for RAR reception/transmission
- (Alternate) If SCS of PRACH > X KHz (X can be pre-defined e.g. 120 KHz, X can be signaled by the gNB in system information or dedicated RRC signaling):
  * UE/gNB uses second RA-RNTI for RAR reception/transmission
- Else
  * UE/gNB uses first RA-RNTI for RAR reception/transmission
- (Alternate) If SCS of PRACH is equals to X1 KHz (X1 can be pre-defined e.g. X1 equals 480 KHz, X1 equals 960 KHz):
  * UE/gNB uses second RA-RNTI for RAR reception/transmission
- Else
  * UE/gNB uses first RA-RNTI for RAR reception/transmission
- (Alternate) If SCS of PRACH is equals to first set of SCSs (first set of SCSs can be pre-defined or signaled by the gNB in system information or dedicated RRC signaling, e.g. first set includes 480 and 960 KHz)
  * UE/gNB uses second RA-RNTI for RAR reception/transmission
- Else If SCS of PRACH is equals to second set of SCSs (second set of SCSs can be pre-defined or signaled by the gNB in system information or dedicated RRC signaling, e.g. second set includes 1.25, 5, 15, 30, 60 and 120 KHz)
  * UE/gNB uses first RA-RNTI for RAR reception/transmission FIG. 1 illustrates an example of identifying random access associated RNTI according to an embodiment of the disclosure. FIG. 1 is an example UE operation according to this embodiment.

Referring to FIG. 1, the UE receives the RACH configuration from the gNB (105). The RACH configuration includes SCS for Msg1 transmission. If RA procedure is initiated (110), the UE selects 4step RA (115) and transmits Msg1 (120). If SCS of PRACH>120 kHz (125), the UE computes RA-RNTI according to second RA-RNTI=1+s_id+14*t_id+14*640*f_id+14*640*8*ul_carrier_id, where 0≤t_id<640 (135). The UE monitors the PDCCH addressed to the computed RA-RNTI in RAR window (140). If a downlink assignment has been received on the PDCCH for the RA-RNTI and the received TB is successfully decoded and if the random access response MAC PDU in the decoded TB contains a MAC subPDU with random access preamble identifier (RAPID) corresponding to the preamble index of the transmitted preamble, RAR is considered successfully received (145). Or, if a downlink assignment has been received on the PDCCH for the RA-RNTI and the received TB is successfully decoded and if the random access response MAC PDU in the decoded TB contains a backoff indicator (BI) subheader, the UE sets the PREAMBLE_BACKOFF to backoff value according to BI field of the MAC subPDU multiplied with SCALING_FACTOR_BI (150). If SCS of PRACH≤120 kHz (125), the UE computes RA-RNTI according to first RA-RNTI=1+s_id+14*t_id+14*80*f_id+14*80*8*ul_carrier_id, where 0≤t_id<80 (130).

Note that for PRACH SCS of 1.25 and 5 KHz, number of slots in system frame are determined according to SCS of 15 KHz ($2^u$×15, where u=0). For SCS of 15 KHz ($2^u$×15, where u=0), there are 10 slots in a system frame. For SCS of 30 KHz ($2^u$×15, where u=1), there are 20 slots in a system frame. For SCS of 60 KHz ($2^u$×15, where u=2), there are 40 slots in a system frame. For SCS of 120 KHz ($2^u$×15, where u=3), there are 80 slots in a system frame. For SCS of 480 KHz ($2^u$×15, where u=5), there are 320 slots in a system frame. For SCS of 960 KHz ($2^u$×15, where u=6), there are 640 slots in a system frame.

Embodiment 2 (Two MsgB-RNTIs)

In this embodiment of this disclosure for receiving/transmitting MsgB for 2 step RA by the UE/gNB, two MsgB-RNTIs are defined, first MsgB-RNTI and second MsgB-RNTI, wherein the first MsgB-RNTI and second MsgB-RNTI are computed as follows:

First MsgB-RNTI=1+*s*_id+14**t*_id+14*80**f*_id+14*80*8*ul_carrier_id+14*80*8*2, where s_id is the index of the first OFDM symbol of the PRACH occasion (0≤s_id<14), t_id is the index of the first slot of the PRACH occasion in a system frame (0≤t_id<80), f_id is the index of the PRACH occasion in the frequency domain (0≤f_id<8), and ul_carrier_id is the UL carrier used for Random Access Preamble transmission (0 for NUL carrier, and 1 for SUL carrier). Slots in a system frame are indexed sequentially starting from zero. The PRACH occasion is the one in which the UE has transmitted preamble. For the gNB operation PRACH occasion is the one in which it has received preamble.

Second MsgB-RNTI=1+*s*_id+14**t*_id+14*640**f*_id+14*640*8*ul_carrier_id+14*640*8*2, where s_id is the index of the first OFDM symbol of the PRACH occasion (0≤s_id<14), t_id is the index of the first slot of the PRACH occasion in a system frame (0≤t_id<640), f_id is the index of the PRACH occasion in the frequency domain (0≤f_id<8), and ul_carrier_id is the UL carrier used for Random Access Preamble transmission (0 for NUL carrier, and 1 for SUL carrier). Slots in a system frame are indexed sequentially starting from zero. The PRACH occasion is the one in which UE has transmitted preamble. For the gNB operation PRACH occasion is the one in which it has received preamble.

UE/gNB selects between the first MsgB-RNTI and second MsgB-RNTI as follows:

UE/gNB first determines the SCS for PRACH (corresponding to the transmitted/received preamble)

SCS for PRACH is signaled by the gNB in the RACH configuration (e.g., the RACH-ConfigCommon for 2 step RA.). The RACH configuration used by the UE is the RACH configuration in the BWP configuration of UL BWP selected for random access procedure. The BWP configuration is signaled by the gNB in system information or in dedicated RRC signaling message (i.e., RRCReconfiguration message). The BWP configuration in system information is typically used in RRC_IDLE/RRC_INACTIVE state. The BWP configuration in dedicated RRC signaling message is typically used in RRC_CONNECTED state.

```
- If SCS of PRACH > 120 KHz (or if SCS of PRACH is 480 KHz or 960 KHz):
    * UE/gNB uses second MsgB-RNTI for MsgB reception/transmission
  - Else
    * UE/gNB uses first MsgB-RNTI for MsgB reception/transmission
  - (Alternate) If SCS of PRACH > X KHz (X can be pre-defined e.g. 120 KHz, X can be signaled by the gNB in system information or dedicated RRC signaling):
    * UE/gNB uses second MsgB-RNTI for MsgB reception/transmission
  - Else
    * UE/gNB uses first MsgB-RNTI for MsgB reception/transmission
  - (Alternate) If SCS of PRACH is equals to X1 KHz (X1 can be pre-defined e.g. X1 equals 480 KHz, X1 equals 960 KHz):
    * UE/gNB uses second MsgB-RNTI for MsgB reception/transmission
  - Else
    * UE/gNB uses first MsgB-RNTI for MsgB reception/transmission
  - (Alternate) If SCS of PRACH is equals to first set of SCSs (first set of SCSs can be pre-defined or signaled by the gNB in system information or dedicated RRC signaling, e.g. first set includes 480 and 960 KHz)
    * UE/gNB uses second RA-RNTI for MsgB reception/transmission
  - Else If SCS of PRACH is equals to second set of SCSs (second set of SCSs can be pre-defined or signaled by the gNB in system information or dedicated RRC signaling, e.g. second set includes 1.25, 5, 15, 30, 60 and 120 KHz)
    * UE/gNB uses first MsgB-RNTI for MsgB reception/transmission
```

Note that for PRACH SCS of 1.25 and 5 KHz, number of slots in system frame are determined according to SCS of 15 KHz ($2^u$×15, where u=0). For SCS of 15 KHz ($2^u$×15, where u=0), there are 10 slots in a system frame. For SCS of 30 KHz ($2^u$×15, where u=1), there are 20 slots in a system frame. For SCS of 60 KHz ($2^u$×15, where u=2), there are 40 slots in a system frame. For SCS of 120 KHz ($2^u$×15, where u=3), there are 80 slots in a system frame. For SCS of 480 KHz ($2^u$×15, where u=5), there are 320 slots in a system frame. For SCS of 960 KHz ($2^u$×15, where u=6), there are 640 slots in a system frame.

Figure 2:
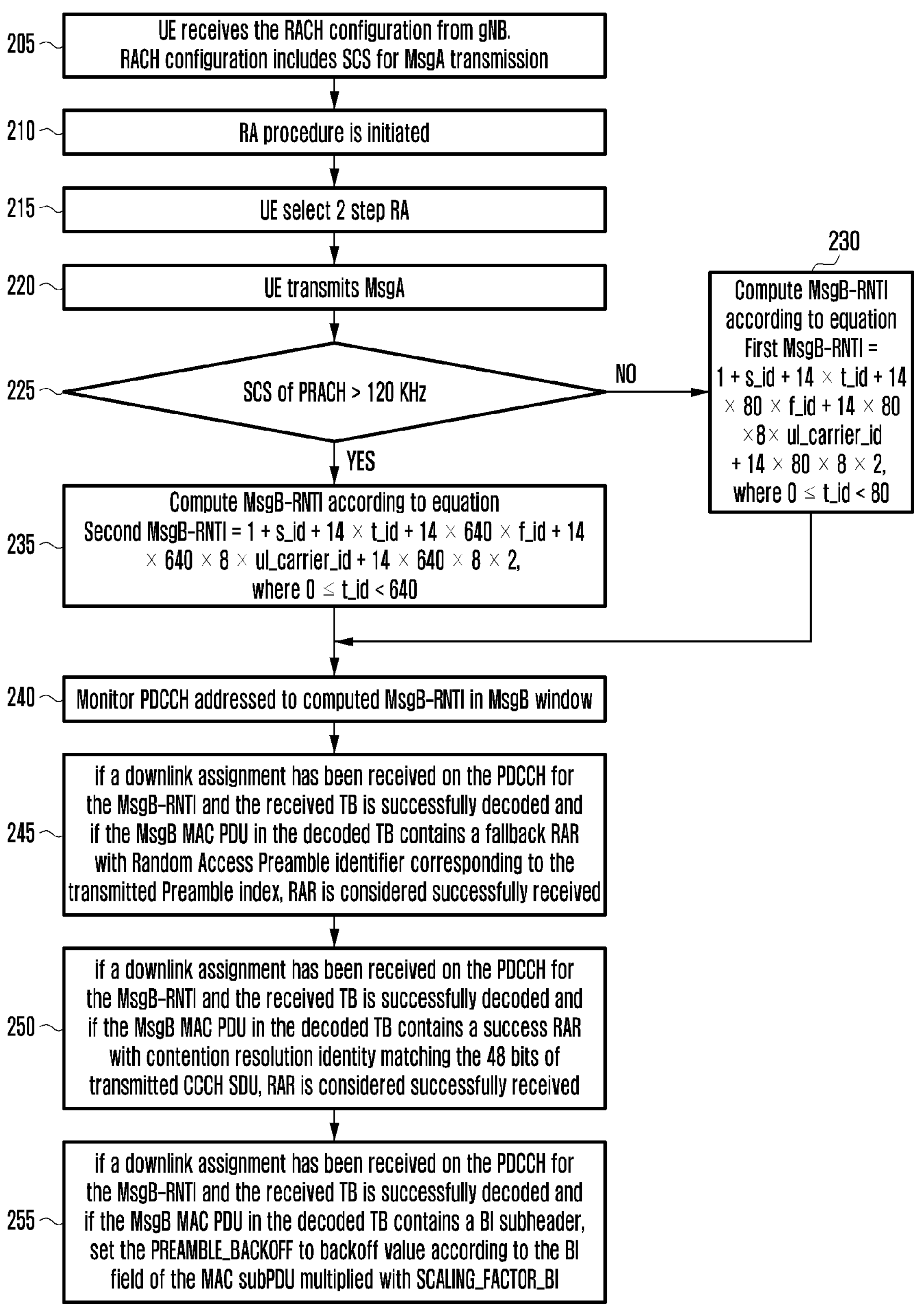
FIG. 2 illustrates another example of identifying random access associated RNTI according to an embodiment of the disclosure.

FIG. 2 illustrates another example of identifying random access associated RNTI according to an embodiment of the disclosure. FIG. 2 is an example UE operation according to this embodiment.

Referring to FIG. 2, the UE receives the RACH configuration from the gNB (205). The RACH configuration includes SCS for MsgA transmission. If RA procedure is initiated (210), the UE selects 2step RA (215) and transmits MsgA (220). If SCS of PRACH>120 kHz (125), the UE computes MSGB-RNTI according to second MSGB-RNTI=1+s_id+14*t_id+14*640*f_id+14*640*8*ul_carrier_id+14*640*8*2, where 0≤t_id<640 (235). The UE monitors the PDCCH addressed to the computed MSGB-RNTI in RAR window (240). If a downlink assignment has been received on the PDCCH for the MSGB-RNTI and the received TB is successfully decoded and if the MSGB MAC PDU in the decoded TB contains a fallback RAR with RAPID corresponding to the preamble index, RAR is considered successfully received (245). Or, if a downlink assignment has been received on the PDCCH for the MSGB-RNTI and the received TB is successfully decoded and if the MSGB MAC PDU in the decoded TB contains a success RAR with contention resolution identity matching the 48 bits of the transmitted CCCH SDU, RAR is considered successfully received (250). Or, if a downlink assignment has been received on the PDCCH for the MSGB-RNTI and the received TB is successfully decoded and if the MSGB MAC PDU in the decoded TB contains a BI subheader, the UE sets the PREAMBLE_BACKOFF to backoff value according to BI field of the MAC subPDU multiplied with SCALING_FACTOR_BI (255). If SCS of PRACH≤120 kHz (225), the UE computes MSGB-RNTI according to first MSGB-RNTI=1+s_id+14*t_id+14*80*f_id+14*80*8*ul_carrier_id+14*80*8*2, where 0≤t_id<80 (230).

Embodiment 3 (Two Parameter Sets, One RA-RNTI Equation)

In this embodiment of this disclosure for receiving/transmitting RAR for 4 step RA by UE/gNB, RA-RNTI is computed as follows:

$$RA\text{-}RNTI=1+s\_id+14*t\_id+14*A*f\_id+14*A*8*ul\_carrier\_id,$$

where s_id is the index of the first OFDM symbol of the PRACH occasion (0≤s_id<14), A is 80 (first value) or 640 (second value), t_id is the index of the first slot of the PRACH occasion in a system frame (0≤t_id<A), f_id is the index of the PRACH occasion in the frequency domain (0≤f_id<8), and ul_carrier_id is the UL carrier used for Random Access Preamble transmission (0 for NUL carrier, and 1 for SUL carrier). Slots in a system frame are indexed sequentially starting from zero. The PRACH occasion is the one in which UE has transmitted preamble. For the gNB operation PRACH occasion is the one in which it has received preamble.

$$(Alternate)RA\text{-}RNTI=1+s\_id+14*t\_id+14*80*A*f\_id+14*80*A*8*ul\_carrier\_id,$$

where s_id is the index of the first OFDM symbol of the PRACH occasion (0≤s_id<14), A is 1 (first value) or 8 (second value), t_id is the index of the first slot of the PRACH occasion in a system frame (0≤t_id<(80*A)), f_id is the index of the PRACH occasion in the frequency domain (0≤f_id<8), and ul_carrier_id is the UL carrier used for Random Access Preamble transmission (0 for NUL carrier, and 1 for SUL carrier). Slots in a system frame are indexed sequentially starting from zero. The PRACH occasion is the one in which UE has transmitted preamble. For the gNB operation PRACH occasion is the one in which it has received preamble.

UE/gNB selects between the first value of A and second value of A as follows:

- UE/gNB first determines the SCS for PRACH (corresponding to the transmitted/received preamble)
  - SCS for PRACH is signaled by the gNB in the RACH configuration (e.g., the RACH-ConfigCommon for 4 step RA.). The RACH configuration used by UE is the RACH configuration in the BWP configuration of UL BWP selected for random access procedure. The BWP configuration is signaled by the gNB in system information or in dedicated RRC signaling message (i.e., RRCReconfiguration message). The BWP configuration in system information is typically used in RRC_IDLE/RRC_INACTIVE state. The BWP configuration in dedicated RRC signaling message is typically used in RRC_CONNECTED state.

```
 - If SCS of PRACH > 120 KHz (or if SCS of PRACH is 480 KHz or 960
KHz):
     * UE/gNB uses second value of A in RA-RNTI computation for
RAR reception/transmission
  - Else
     * UE/gNB uses first value of A in RA-RNTI computation for RAR
reception/transmission or UE/gNB uses RA-RNTI = 1 + s_id + 14 * t_id + 14 * 80 *
f_id + 14 * 80 * 8 * ul_carrier_id, for RAR reception/transmission
  - (Alternate) If SCS of PRACH > X KHz (X can be pre-defined e.g. 120
KHz, X can be signaled by the gNB in system information or dedicated RRC signaling):
     * UE/gNB uses second value of A in RA-RNTI computation for
RAR reception/transmission
  - Else
     * UE/gNB uses first value of A in RA-RNTI computation for RAR
reception/transmission or UE/gNB uses RA-RNTI = 1 + s_id + 14 * t_id + 14 * 80 *
f_id + 14 * 80 * 8 * ul_carrier_id, for RAR reception/transmission
  - (Alternate) If SCS of PRACH is equals to X1 KHz (X1 can be pre-
defined e.g. X1 equals 480 KHz, X1 equals 960 KHz):
     * UE/gNB uses second value of A in RA-RNTI computation for
RAR reception/transmission
  - Else
     * UE/gNB uses first value of A in RA-RNTI computation for RAR
reception/transmission or UE/gNB uses RA-RNTI = 1 + s_id + 14 * t_id + 14 * 80 *
f_id + 14 * 80 * 8 * ul_carrier_id, for RAR reception/transmission
  - (Alternate) If SCS of PRACH is equals to first set of SCSs (first set of
SCSs can be pre-defined or signaled by the gNB in system information or dedicated
RRC signaling, e.g. first set includes 480 and 960 KHz)
```

-continued

```
     * UE/gNB uses second value of A in RA-RNTI computation for
RAR reception/transmission
  - Else If SCS of PRACH is equals to second set of SCSs (second set of
SCSs can be pre-defined or signaled by the gNB in system information or dedicated
RRC signaling, e.g. second set includes 1.25, 5, 15, 30, 60 and 120 KHz)
     * UE/gNB uses first value of A in RA-RNTI computation for RAR
reception/transmission or UE/gNB uses RA-RNTI = 1 + s_id + 14 * t_id + 14 * 80 *
f_id + 14 * 80 * 8 * ul_carrier_id, for RAR reception/transmission
```

Note that for PRACH SCS of 1.25 and 5 KHz, number of slots in system frame are determined according to SCS of 15 KHz ($2^u \times 15$, where u=0). For SCS of 15 KHz ($2^u \times 15$, where u=0), there are 10 slots in a system frame. For SCS of 30 KHz ($2^u \times 15$, where u=1), there are 20 slots in a system frame. For SCS of 60 KHz ($2^u \times 15$, where u=2), there are 40 slots in a system frame. For SCS of 120 KHz ($2^u \times 15$, where u=3), there are 80 slots in a system frame. For SCS of 480 KHz ($2^u \times 15$, where u=5), there are 320 slots in a system frame. For SCS of 960 KHz ($2^u \times 15$, where u=6), there are 640 slots in a system frame.

Embodiment 4 (Two Parameter Sets, One MsgB-RNTI Equation)

In this embodiment of this disclosure for receiving/transmitting MsgB for 2 step RA by UE/gNB, MsgB-RNTI is computed as follows:

$$\text{MsgB-RNTI}=1+s\_id+14*t\_id+14*A*f\_id+14*A*8*ul\_carrier\_id+14*A*8*2,$$

where s_id is the index of the first OFDM symbol of the PRACH occasion (0≤s_id<14), A is 80 (first value) or 640 (second value), t_id is the index of the first slot of the PRACH occasion in a system frame (0≤t_id<A), f_id is the index of the PRACH occasion in the frequency domain (0≤f_id<8), and ul_carrier_id is the UL carrier used for Random Access Preamble transmission (0 for NUL carrier, and 1 for SUL carrier). Slots in a system frame are indexed sequentially starting from zero. The PRACH occasion is the one in which UE has transmitted preamble. For the gNB operation PRACH occasion is the one in which it has received preamble.

$$\text{(Alternate)MsgB-RNTI}=1+s\_id+14*t\_id+14*80*A*f\_id+14*80*A*8*ul\_carrier\_id+14*80*A*8*2,$$

where s_id is the index of the first OFDM symbol of the PRACH occasion (0≤s_id<14), A is 1 (first value) or 8 (second value), t_id is the index of the first slot of the PRACH occasion in a system frame (0≤t_id<(A*80)), f_id is the index of the PRACH occasion in the frequency domain (0≤f_id<8), and ul_carrier_id is the UL carrier used for Random Access Preamble transmission (0 for NUL carrier, and 1 for SUL carrier). Slots in a system frame are indexed sequentially starting from zero. The PRACH occasion is the one in which UE has transmitted preamble. For the gNB operation PRACH occasion is the one in which it has received preamble.

UE/gNB selects between the first value of A and second value of A as follows:

- UE/gNB first determine the SCS for PRACH (corresponding to the transmitted/received preamble)
  - SCS for PRACH is signaled by the gNB in the RACH configuration (e.g., the RACH-ConfigCommon for 2 step RA.). The RACH configuration used by UE is the RACH configuration in the BWP configuration of UL BWP selected for random access procedure. The BWP configuration is signaled by the gNB in system information or in dedicated RRC signaling message (i.e., RRCReconfiguration message). The BWP configuration in system information is typically used in RRC_IDLE/RRC_INACTIVE state. The BWP configuration in dedicated RRC signaling message is typically used in RRC_CONNECTED state.

```
  - If SCS of PRACH > 120 KHz (or if SCS of PRACH is 480 KHz or 960
KHz):
     * UE/gNB uses second value of A in MsgB-RNTI computation for
MsgB reception/transmission
  - Else
     * UE/gNB uses first value of A in MsgB -RNTI computation for
MsgB reception/transmission or UE/gNB uses MsgB -RNTI = 1 + s_id + 14 * t_id + 14
* 80 * f_id + 14 * 80 * 8 * ul_carrier_id +14 * 80 * 8 * 2, for MsgB
reception/transmission
  - (Alternate) If SCS of PRACH > X KHz (X can be pre-defined e.g. 120
KHz, X can be signaled by the gNB in system information or dedicated RRC signaling):
     * UE/gNB uses second value of A in MsgB-RNTI computation for
MsgB reception/transmission
  - Else
     * UE/gNB uses first value of A in MsgB -RNTI computation for
MsgB reception/transmission or UE/gNB uses MsgB -RNTI = 1 + s_id + 14 * t_id + 14
* 80 * f_id + 14 * 80 * 8 * ul_carrier_id +14 * 80 * 8 * 2, for MsgB
reception/transmission
  - (Alternate) If SCS of PRACH is equals to X1 KHz (X1 can be pre-
defined e.g. X1 equals 480 KHz, X1 equals 960 KHz):
     * UE/gNB uses second value of A in MsgB-RNTI computation for
MsgB reception/transmission
```

-continued

```
  - Else
      * UE/gNB uses first value of A in MsgB -RNTI computation for
MsgB reception/transmission or UE/gNB uses MsgB -RNTI = 1 + s_id + 14 * t_id + 14
* 80 * f_id + 14 * 80 * 8 * ul_carrier_id +14 * 80 * 8 * 2, for MsgB
reception/transmission
  - (Alternate) If SCS of PRACH is equals to first set of SCSs (first set of
SCSs can be pre-defined or signaled by the gNB in system information or dedicated
RRC signaling, e.g. first set includes 480 and 960 KHz)
      * UE/gNB uses second value of A in MsgB-RNTI computation for
MsgB reception/transmission
  - Else If SCS of PRACH is equals to second set of SCSs (second set of
SCSs can be pre-defined or signaled by the gNB in system information or dedicated
RRC signaling, e.g. second set includes 1.25, 5, 15, 30, 60 and 120 KHz)
      * UE/gNB uses first value of A in MsgB -RNTI computation for
MsgB reception/transmission or UE/gNB uses MsgB -RNTI = 1 + s_id + 14 * t_id + 14
* 80 * f_id + 14 * 80 * 8 * ul_carrier_id +14 * 80 * 8 * 2, for MsgB
reception/transmission
```

Note that for PRACH SCS of 1.25 and 5 KHz, number of slots in system frame are determined according to SCS of 15 KHz ($2^u \times 15$, where u=0). For SCS of 15 KHz ($2^u \times 15$, where u=0), there are 10 slots in a system frame. For SCS of 30 KHz ($2^u \times 15$, where u=1), there are 20 slots in a system frame. For SCS of 60 KHz ($2^u \times 15$, where u=2), there are 40 slots in a system frame. For SCS of 120 KHz ($2^u \times 15$, where u=3), there are 80 slots in a system frame. For SCS of 480 KHz ($2^u \times 15$, where u=5), there are 320 slots in a system frame. For SCS of 960 KHz ($2^u \times 15$, where u=6), there are 640 slots in a system frame.

Embodiment 5 (Three RA-RNTIs)

In this embodiment of this disclosure for receiving/transmitting RAR for 4 step RA by UE/gNB, three RA-RNTIs are defined, first RA-RNTI, second RA-RNTI and third RA-RNTI, wherein the first RA-RNTI, second RA-RNTI and third RA-RNTI are computed as follows:

$$\text{First RA-RNTI}=1+s\_id+14*t\_id+14*80*f\_id+14*80*8*ul\_carrier\_id,$$

where s_id is the index of the first OFDM symbol of the PRACH occasion (0≤s_id<14), t_id is the index of the first slot of the PRACH occasion in a system frame (0≤t_id<80), f_id is the index of the PRACH occasion in the frequency domain (0≤f_id<8), and ul_carrier_id is the UL carrier used for Random Access Preamble transmission (0 for NUL carrier, and 1 for SUL carrier). Slots in a system frame are indexed sequentially starting from zero. The PRACH occasion is the one in which UE has transmitted preamble. For the gNB operation PRACH occasion is the one in which it has received preamble.

$$\text{Second RA-RNTI}=1+s\_id+14*t\_id+14*320*f\_id+14*320*8*ul\_carrier\_id,$$

where s_id is the index of the first OFDM symbol of the PRACH occasion (0≤s_id<14), t_id is the index of the first slot of the PRACH occasion in a system frame (0≤t_id<320), f_id is the index of the PRACH occasion in the frequency domain (0≤f_id<8), and ul_carrier_id is the UL carrier used for Random Access Preamble transmission (0 for NUL carrier, and 1 for SUL carrier). Slots in a system frame are indexed sequentially starting from zero. The PRACH occasion is the one in which UE has transmitted preamble. For the gNB operation PRACH occasion is the one in which it has received preamble.

$$\text{Third RA-RNTI}=1+s\_id+14*t\_id+14*640*f\_id+14*640*8*ul\_carrier\_id,$$

where s_id is the index of the first OFDM symbol of the PRACH occasion (0≤s_id<14), t_id is the index of the first slot of the PRACH occasion in a system frame (0≤t_id<640), f_id is the index of the PRACH occasion in the frequency domain (0≤f_id<8), and ul_carrier_id is the UL carrier used for Random Access Preamble transmission (0 for NUL carrier, and 1 for SUL carrier). Slots in a system frame are indexed sequentially starting from zero. The PRACH occasion is the one in which UE has transmitted preamble. For the gNB operation PRACH occasion is the one in which it has received preamble.

UE/gNB selects between the first RA-RNTI, second RA-RNTI and third RA-RNTI as follows:

- UE/gNB first determine the SCS for PRACH (corresponding to the transmitted/received preamble)
  - SCS for PRACH is signaled by the gNB in the RACH configuration (e.g., the RACH-ConfigCommon for 4 step RA.). The RACH configuration used by UE is the RACH configuration in the BWP configuration of UL BWP selected for random access procedure. The BWP configuration is signaled by the gNB in system information or in dedicated RRC signaling message (i.e., RRCReconfiguration message). The BWP configuration in system information is typically used in RRC_IDLE/RRC_INACTIVE state. The BWP configuration in dedicated RRC signaling message is typically used in RRC_CONNECTED state.

```
- If SCS of PRACH = 480 KHz
   * UE/gNB uses second RA-RNTI for RAR reception/transmission
- Else If SCS of PRACH = 960 KHz
   * UE/gNB uses third RA-RNTI for RAR reception/transmission
- Else (if SCS of PRACH equals 1.25, 5, 15, 30, 60 and 120 KHz)
   * UE/gNB uses first RA-RNTI for RAR reception/transmission
```

Note that for PRACH SCS of 1.25 and 5 KHz, number of slots in system frame are determined according to SCS of 15 KHz ($2^u \times 15$, where u=0). For SCS of 15 KHz ($2^u \times 15$, where u=0), there are 10 slots in a system frame. For SCS of 30 KHz ($2^u \times 15$, where u=1), there are 20 slots in a system frame. For SCS of 60 KHz ($2^u \times 15$, where u=2), there are 40 slots in a system frame. For SCS of 120 KHz ($2^u \times 15$, where u=3), there are 80 slots in a system frame. For SCS of 480 KHz ($2^u \times 15$, where u=5), there are 320 slots in a system frame. For SCS of 960 KHz ($2^u \times 15$, where u=6), there are 640 slots in a system frame.

Embodiment 6 (Three MsgB-RNTIs)

In this embodiment of this disclosure for receiving/transmitting MsgB for 2 step RA by UE/gNB, three MsgB-RNTIs are defined, first MsgB-RNTI, second MsgB-RNTI and third MsgB-RNTI, wherein the first MsgB-RNTI, second MsgB-RNTI and third MsgB-RNTI are computed as follows:

$$\text{First MsgB-RNTI}=1+s\_id+14*t\_id+14*80*f\_id+14*80*8*ul\_carrier\_id+14*80*8*2,$$

where s_id is the index of the first OFDM symbol of the PRACH occasion (0≤s_id<14), t_id is the index of the first slot of the PRACH occasion in a system frame (0≤t_id<80), f_id is the index of the PRACH occasion in the frequency domain (0≤f_id<8), and ul_carrier_id is the UL carrier used for Random Access Preamble transmission (0 for NUL carrier, and 1 for SUL carrier). Slots in a system frame are indexed sequentially starting from zero. The PRACH occasion is the one in which UE has transmitted preamble. For the gNB operation PRACH occasion is the one in which it has received preamble.

$$\text{Second MsgB-RNTI}=1+s\_id+14*t\_id+14*320*f\_id+14*320*8*ul\_carrier\_id+14*320*8*2,$$

where s_id is the index of the first OFDM symbol of the PRACH occasion (0≤s_id<14), t_id is the index of the first slot of the PRACH occasion in a system frame (0≤t_id<320), f_id is the index of the PRACH occasion in the frequency domain (0≤f_id<8), and ul_carrier_id is the UL carrier used for Random Access Preamble transmission (0 for NUL carrier, and 1 for SUL carrier). Slots in a system frame are indexed sequentially starting from zero. The PRACH occasion is the one in which UE has transmitted preamble. For the gNB operation PRACH occasion is the one in which it has received preamble.

$$\text{Third MsgB-RNTI}=1+s\_id+14*t\_id+14*640*f\_id+14*640*8*ul\_carrier\_id+14*640*8*2,$$

where s_id is the index of the first OFDM symbol of the PRACH occasion (0≤s_id<14), t_id is the index of the first slot of the PRACH occasion in a system frame (0≤t_id<640), f_id is the index of the PRACH occasion in the frequency domain (0≤f_id<8), and ul_carrier_id is the UL carrier used for Random Access Preamble transmission (0 for NUL carrier, and 1 for SUL carrier). Slots in a system frame are indexed sequentially starting from zero. The PRACH occasion is the one in which UE has transmitted preamble. For the gNB operation PRACH occasion is the one in which it has received preamble.

UE/gNB select between the first MsgB-RNTI, second MsgB-RNTI and third MsgB-RNTI as follows:

UE/gNB first determine the SCS for PRACH (corresponding to the transmitted/received preamble)

SCS for PRACH is signaled by the gNB in the RACH configuration (e.g., the RACH-ConfigCommon for 2 step RA.). The RACH configuration used by UE is the RACH configuration in the BWP configuration of UL BWP selected for random access procedure. The BWP configuration is signaled by the gNB in system information or in dedicated RRC signaling message (i.e., RRCReconfiguration message). The BWP configuration in system information is typically used in RRC_IDLE/RRC_INACTIVE state. The BWP configuration in dedicated RRC signaling message is typically used in RRC_CONNECTED state.

```
- If SCS of PRACH = 480 KHz
    * UE/gNB uses second MsgB-RNTI for MsgB
reception/transmission
- Else If SCS of PRACH = 960 KHz
    * UE/gNB uses third MsgB-RNTI for MsgB
reception/transmission
- Else (if SCS of PRACH equals 1.25, 5, 15, 30, 60 and 120 KHz)
    * UE/gNB uses first MsgB-RNTI for MsgB
reception/transmission
```

Note that for PRACH SCS of 1.25 and 5 KHz, number of slots in system frame are determined according to SCS of 15 KHz ($2^u$×15, where u=0). For SCS of 15 KHz ($2^u$×15, where u=0), there are 10 slots in a system frame. For SCS of 30 KHz ($2^u$×15, where u=1), there are 20 slots in a system frame. For SCS of 60 KHz ($2^u$×15, where u=2), there are 40 slots in a system frame. For SCS of 120 KHz ($2^u$×15, where u=3), there are 80 slots in a system frame. For SCS of 480 KHz ($2^u$×15, where u=5), there are 320 slots in a system frame. For SCS of 960 KHz ($2^u$×15, where u=6), there are 640 slots in a system frame.

Embodiment 7 (Three Parameter Sets, Same RA-RNTI Equation)

In this embodiment of this disclosure for receiving/transmitting RAR for 4 step RA by UE/gNB, RA-RNTI is computed as follows:

$$\text{RA-RNTI}=1+s\_id+14*t\_id+14*A*f\_id+14*A*\mathbf{8}*ul\_carrier\_id,$$

where s_id is the index of the first OFDM symbol of the PRACH occasion (0≤s_id<14), A is 80 (first value) or 320 (second value) and 640 (third value), t_id is the index of the first slot of the PRACH occasion in a system frame (0≤t_id<A), f_id is the index of the PRACH occasion in the frequency domain (0≤f_id<8), and ul_carrier_id is the UL carrier used for Random Access Preamble transmission (0 for NUL carrier, and 1 for SUL carrier). Slots in a system frame are indexed sequentially starting from zero. The PRACH occasion is the one in which UE has transmitted preamble. For the gNB operation PRACH occasion is the one in which it has received preamble.

$$\text{(Alternate)RA-RNTI}=1+s\_id+14*t\_id+14*80*A*f\_id+14*80*A*8*ul\_carrier\_id,$$

where s_id is the index of the first OFDM symbol of the PRACH occasion (0≤s_id<14), A is 1 (first value) or 4 (second value) or 8 (third value), t_id is the index of the first slot of the PRACH occasion in a system frame (0≤t_id<(80*A)), f_id is the index of the PRACH occasion in the frequency domain (0≤f_id<8), and ul_carrier_id is the UL carrier used for Random Access Preamble transmission (0 for NUL carrier, and 1 for SUL carrier). Slots in a system frame are indexed sequentially starting from zero. The PRACH occasion is the one in which UE has transmitted preamble. For the gNB operation PRACH occasion is the one in which it has received preamble.

UE/gNB selects between the first value of A, second value of A and third value of A as follows:

UE/gNB first determine the SCS for PRACH (corresponding to the transmitted/received preamble)

SCS for PRACH is signaled by the gNB in the RACH configuration (e.g., the RACH-ConfigCommon for 4 step RA.). The RACH configuration used by UE is the RACH configuration in the BWP configuration of UL BWP selected for random access procedure. The BWP configuration is signaled by the gNB in system information or in dedicated RRC signaling message (i.e., RRCReconfiguration message). The BWP configuration in system information is typically used in RRC_IDLE/RRC_INACTIVE state. The BWP configuration in dedicated RRC signaling message is typically used in RRC_CONNECTED state.

```
- If SCS of PRACH = 480 KHz
    * UE/gNB uses second value of A in RA-RNTI computation for
RAR reception/transmission
  - Else If SCS of PRACH = 960 KHz
    * UE/gNB uses third value of A in RA-RNTI computation for
RAR reception/transmission
  - Else (if SCS of PRACH equals 1.25, 5, 15, 30, 60 and 120 KHz)
    * UE/gNB uses first value of A in RA-RNTI computation for RAR
reception/transmission or UE/gNB uses RA-RNTI = 1 + s_id + 14 *
t_id + 14 * 80 * f_id + 14 * 80 * 8 * ul_carrier_id for RAR
reception/transmission
```

Note that for PRACH SCS of 1.25 and 5 KHz, number of slots in system frame are determined according to SCS of 15 KHz ($2^u \times 15$, where u=0). For SCS of 15 KHz ($2^u \times 15$, where u=0), there are 10 slots in a system frame. For SCS of 30 KHz ($2^u \times 15$, where u=1), there are 20 slots in a system frame. For SCS of 60 KHz ($2^u \times 15$, where u=2), there are 40 slots in a system frame. For SCS of 120 KHz ($2^u \times 15$, where u=3), there are 80 slots in a system frame. For SCS of 480 KHz ($2^u \times 15$, where u=5), there are 320 slots in a system frame. For SCS of 960 KHz ($2^u \times 15$, where u=6), there are 640 slots in a system frame.

Embodiment 8 (Three Parameter Sets, Same MsgB-RNTI Equation)

In this embodiment of this disclosure for receiving/transmitting MsgB for 2 step RA by UE/gNB, MsgB-RNTI is computed as follows:

$$\text{MsgB-RNTI}=1+s\_id+14*t\_id+14*A*f\_id+14*A*8*ul\_carrier\_id+14*A*8*2,$$

where s_id is the index of the first OFDM symbol of the PRACH occasion (0≤s_id<14), A is 80 (first value) or 320 (second value) or 640 (third value), t_id is the index of the first slot of the PRACH occasion in a system frame (0≤t_id<A), f_id is the index of the PRACH occasion in the frequency domain (0≤f_id<8), and ul_carrier_id is the UL carrier used for Random Access Preamble transmission (0 for NUL carrier, and 1 for SUL carrier). Slots in a system frame are indexed sequentially starting from zero. The PRACH occasion is the one in which UE has transmitted preamble. For the gNB operation PRACH occasion is the one in which it has received preamble.

$$\text{(Alternate)MsgB-RNTI}=1+s\_id+14*t\_id+14*80*A*f\_id+14*80*A*8*ul\_carrier\_id+14*80*A*8*2,$$

where s_id is the index of the first OFDM symbol of the PRACH occasion (0≤s_id<14), A is 1 (first value) or 4 (second value) or 8 (third value), t_id is the index of the first slot of the PRACH occasion in a system frame (0≤t_id<(A*80)), f_id is the index of the PRACH occasion in the frequency domain (0≤f_id<8), and ul_carrier_id is the UL carrier used for Random Access Preamble transmission (0 for NUL carrier, and 1 for SUL carrier). Slots in a system frame are indexed sequentially starting from zero. The PRACH occasion is the one in which UE has transmitted preamble. For the gNB operation PRACH occasion is the one in which it has received preamble.

UE/gNB selects between the first value of A, second value of A and third value of as follows:

- UE/gNB first determine the SCS for PRACH (corresponding to the transmitted/received preamble)
  - SCS for PRACH is signaled by the gNB in the RACH configuration (e.g., the RACH-ConfigCommon for 2 step RA.). The RACH configuration used by UE is the RACH configuration in the BWP configuration of UL BWP selected for random access procedure. The BWP configuration is signaled by the gNB in system information or in dedicated RRC signaling message (i.e., RRCReconfiguration message). The BWP configuration in system information is typically used in RRC_IDLE/RRC_INACTIVE state. The BWP configuration in dedicated RRC signaling message is typically used in RRC_CONNECTED state.

```
- If SCS of PRACH = 480 KHz
    * UE/gNB uses second value of A in MsgB-RNTI computation for
MsgB reception/transmission
  - Else If SCS of PRACH = 960 KHz
    * UE/gNB uses third value of A in MsgB-RNTI computation for
MsgB reception/transmission
  - Else (if SCS of PRACH equals 1.25, 5, 15, 30, 60 and 120 KHz)
    * UE/gNB uses first value of A in MsgB-RNTI computation for
MsgB reception/transmission or UE/gNB uses MsgB -RNTI = 1 + s_id +
14 * t_id + 14 * 80 * f_id + 14 * 80 * 8 * ul_carrier_id + 14 * 80 * 8
*
2 for MsgB reception/transmission
```

Note that for PRACH SCS of 1.25 and 5 KHz, number of slots in system frame are determined according to SCS of 15 KHz ($2^u \times 15$, where u=0). For SCS of 15 KHz ($2^u \times 15$, where u=0), there are 10 slots in a system frame. For SCS of 30 KHz ($2^u \times 15$, where u=1), there are 20 slots in a system frame. For SCS of 60 KHz ($2^u \times 15$, where u=2), there are 40 slots in a system frame. For SCS of 120 KHz ($2^u \times 15$, where u=3), there are 80 slots in a system frame. For SCS of 480 KHz ($2^u \times 15$, where u=5), there are 320 slots in a system frame. For SCS of 960 KHz ($2^u \times 15$, where u=6), there are 640 slots in a system frame.

Embodiment 9 (Same RA-RNTI Equation, Different t_id Indexing, Scheme 1)

In this embodiment of this disclosure for receiving/transmitting RAR for 4 step RA by UE/gNB, RA-RNTI is computed as follows:

$$\text{RA-RNTI}=1+s\_id+14*t\_id+14*80*f\_id+14*80*8*ul\_carrier\_id,$$

where s_id is the index of the first OFDM symbol of the PRACH occasion (0≤s_id<14), f_id is the index of the PRACH occasion in the frequency domain (0 ≤f_id<8), and ul_carrier_id is the UL carrier used for Random Access Preamble transmission (0 for NUL carrier, and 1 for SUL carrier). The PRACH occasion is the one in which UE has transmitted preamble. For the gNB operation PRACH occasion is the one in which it has received preamble.

- UE/gNB first determine the SCS for PRACH (corresponding to the transmitted/received preamble)
  - SCS for PRACH is signaled by the gNB in the RACH configuration (e.g., the RACH-ConfigCommon for 4 step RA.). The RACH configuration used by UE is the RACH configuration in the BWP configuration of UL BWP selected for random access procedure. The BWP configuration is signaled by the gNB in system information or in dedicated RRC signaling message (i.e., RRCReconfiguration message). The BWP configuration in system information is typically used in RRC_IDLE/RRC_INACTIVE state. The BWP configuration in dedicated RRC signaling message is typically used in RRC_CONNECTED state.

- If SCS of PRACH > 120 KHz (or if SCS of PRACH is 480 KHz or 960 KHz)
    * t_id = slot index/8; In other words, t_id is equal to remaining bits (other than 3 least significant bits (LSBs)) of slot index; for example, if slot index is 10 bits, t_id is equal to value of 7 most significant bits (MSBs).
    * slot index mod 8 is included in DCI (of the PDCCH addressed to RA-RNTI) or RAR MAC PDU (scheduled by the PDCCH addressed to RA-RNTI). In other words, 3 LSBs of slot index are included in DCI (of the PDCCH addressed to RA-RNTI) or RAR MAC PDU (scheduled by the PDCCH addressed to RA-RNTI).
    * slots in a system frame are indexed sequentially from 0

Figure 3:
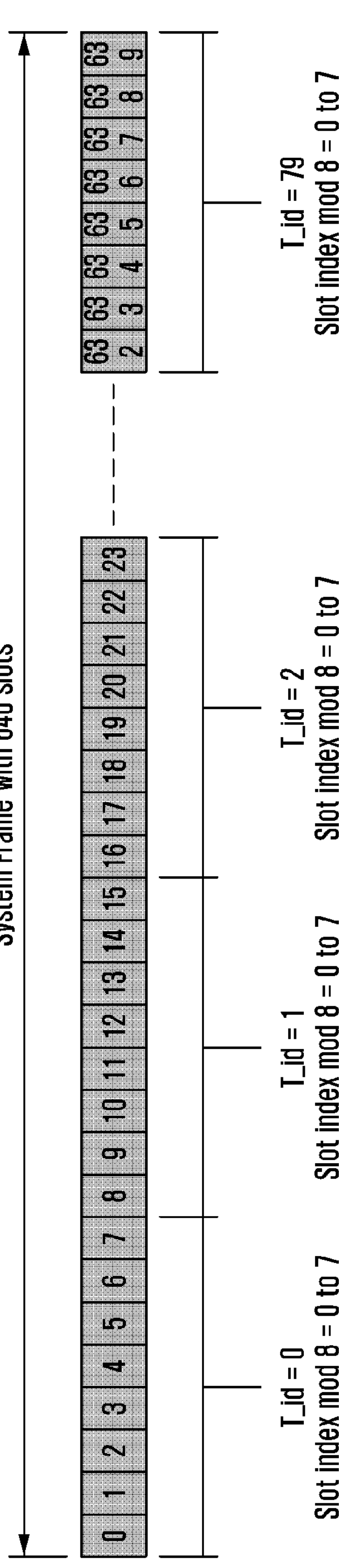
FIG. 3 illustrates an example of system frame structure in according to an embodiment of the disclosure.

FIG. 3 illustrates an example of system frame structure according to an embodiment of the disclosure.

Referring to FIG. 3, there are 640 slots in a system frame. The t_id for each of the slot is in the range 0 to 79. By the combination of t_id and slot index mod 8, a slot can be uniquely identified in a system frame.

Else (if SCS of PRACH equals 1.25, 5, 15, 30, 60 and 120 KHz)

t_id=slot index; Slots in a system frame are indexed sequentially from 0

Figure 4A:
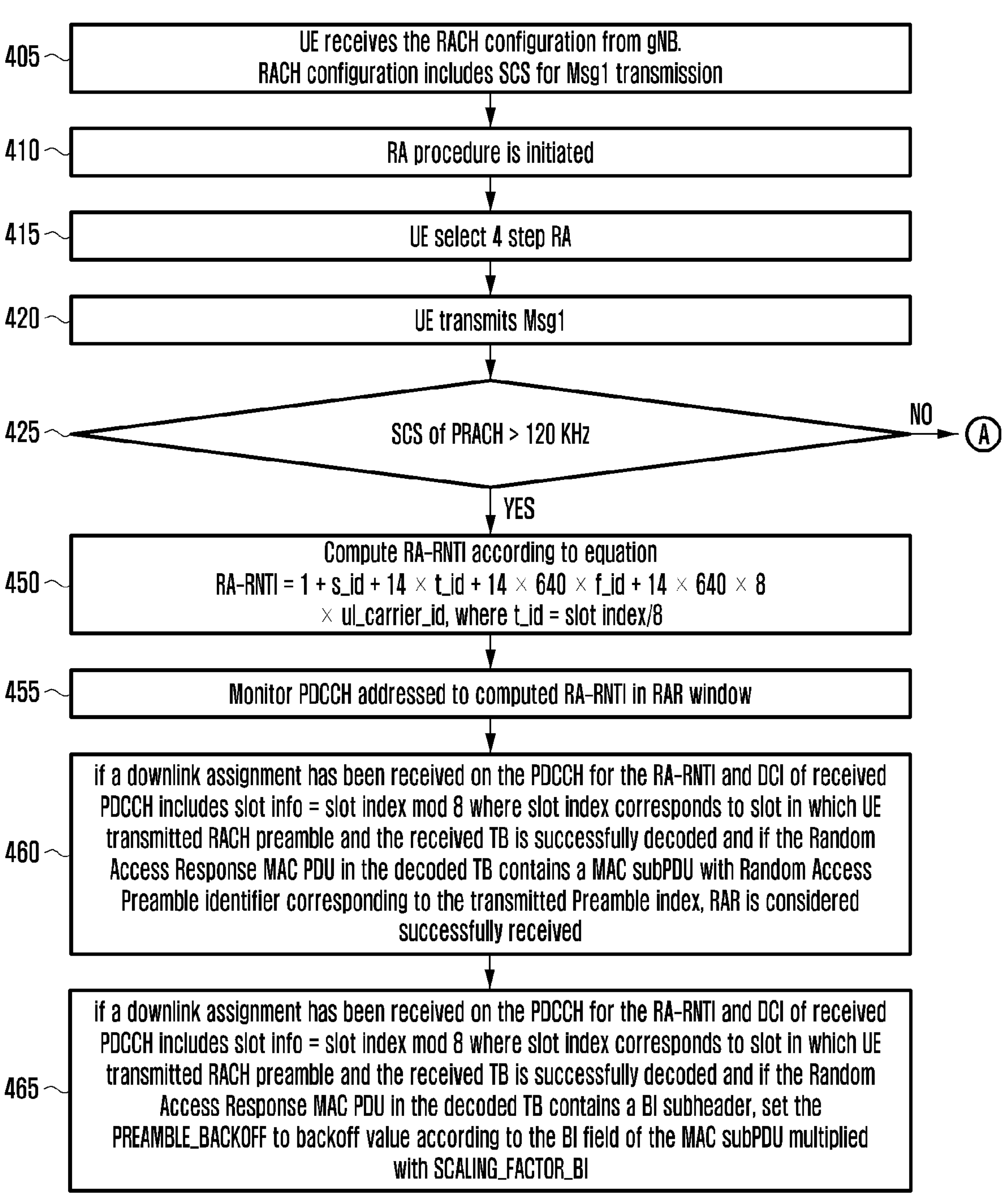
FIG. 4A illustrates another example of identifying random access associated RNTI according to an embodiment of the disclosure.
Figure 4B:
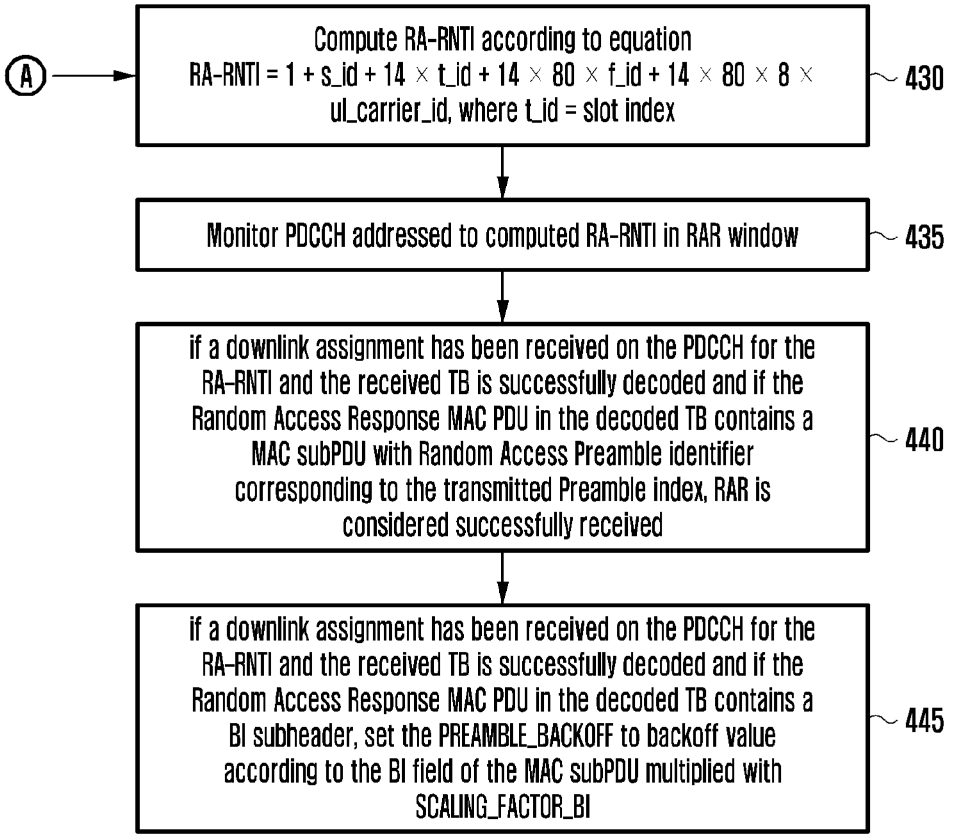
FIG. 4B illustrates another example of identifying random access associated RNTI according to an embodiment of the disclosure.
Figure 5A:
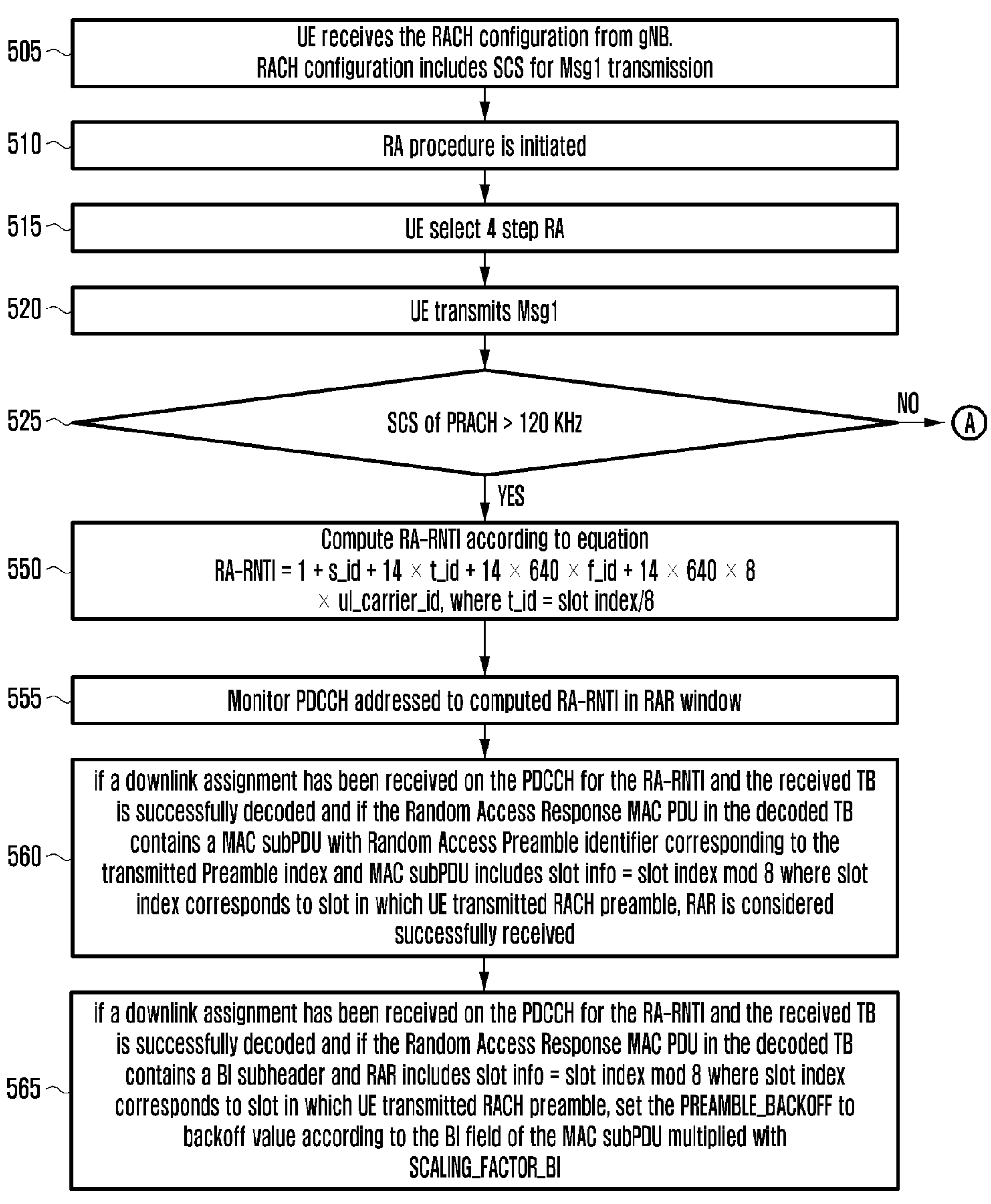
FIG. 5A illustrates another example of identifying random access associated RNTI according to an embodiment of the disclosure.
Figure 5B:
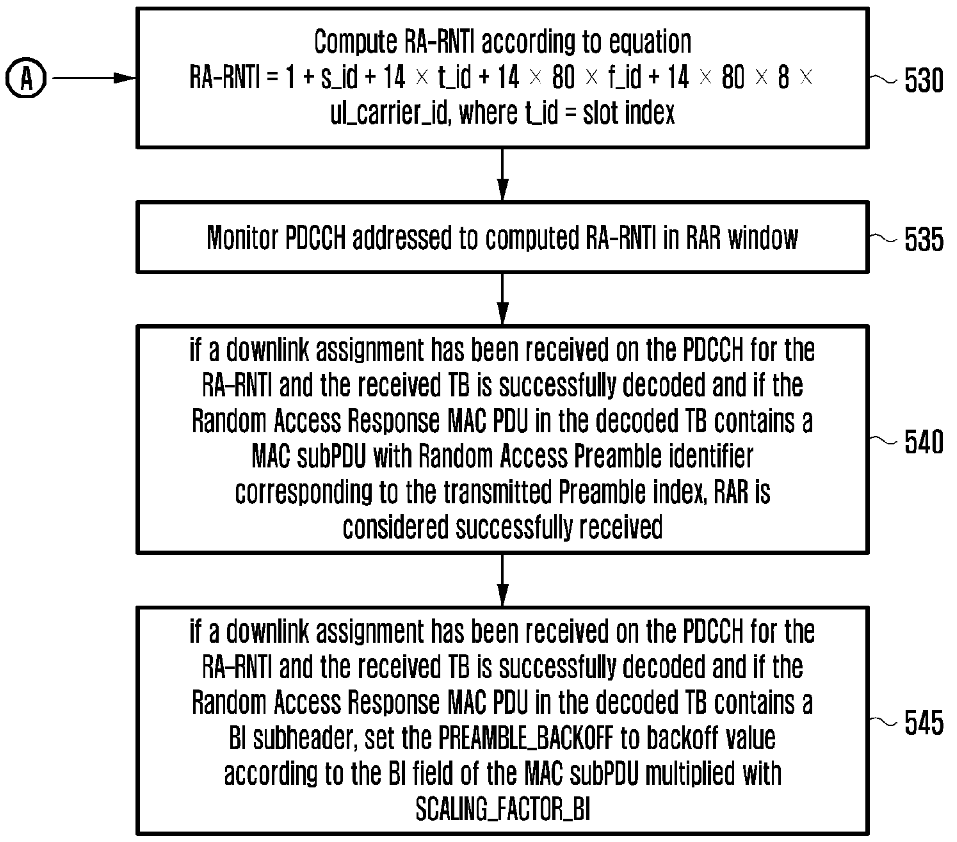
FIG. 5B illustrates another example of identifying random access associated RNTI according to an embodiment of the disclosure.

FIGS. 4A, 4B, 5A, and 5B illustrate other examples of identifying random access associated RNTI according to various embodiments of the disclosure. FIGS. 4A and 4B show an embodiment wherein slot index mod 8 is included in DCI. FIGS. 5A and 5B show another embodiment wherein slot index mod 8 is included in RAR MAC PDU.

Referring to FIGS. 4A and 4B, the UE receives RACH configuration from the gNB (405). The RACH configuration includes SCS for Msg1 transmission. If RA procedure is initiated (410), the UE selects 4step RA (415) and transmits Msg1 (420). If SCS of PRACH≤120 kHz (425), the UE computes RA-RNTI according to RA-RNTI=1+s_id+14*t_id+14*80*f_id+14*80*8*ul_carrier_id, where t_id=slot index (430). Then, the UE monitors the PDCCH addressed to the computed RA-RNTI in RAR window (435). If a downlink assignment has been received on the PDCCH for the RA-RNTI and the received TB is successfully decoded and if the random access response MAC PDU in the decoded TB contains a MAC subPDU with RAPID corresponding to the transmitted preamble index, RAR is considered successfully received (440). If a downlink assignment has been received on the PDCCH for the RA-RNTI and the received TB is successfully decoded and if the random access response MAC PDU in the decoded TB contains a BI subheader, the UE sets the PREAMBLE_BACKOFF to backoff value according to the BI field of the MAC subPDU multiplied with SCALING_FACTOR_BI (445). Or, If SCS of PRACH>120 kHz (425), the UE computes RA-RNTI according to RA-RNTI=1+s_id+14*t_id+14*640*f_id+14*640*8*ul_carrier_id, where t_id=slot index/8 (450). The UE monitors the PDCCH addressed to the computed RA-RNTI in RAR window (455). If a downlink assignment has been received on the PDCCH for the RA-RNTI and DCI of the received PDCCH includes slot info=slot index mod 8 where slot index corresponds to slot in which the UE transmitted RACH preamble and the received TB is successfully decoded and if the random access response MAC PDU in the decoded TB contains a MAC subPDU with RAPID corresponding to the transmitted preamble index, RAR is considered successfully received (460). If a downlink assignment has been received on the PDCCH for the RA-RNTI and DCI of the received PDCCH includes slot info=slot index mod 8 where slot index corresponds to slot in which the UE transmitted RACH preamble and the received TB is successfully decoded and if the random access response MAC PDU in the decoded TB contains a BI subheader, the UE sets the PREAMBLE_BACKOFF to backoff value according to BI field of the MAC subPDU multiplied with SCALING_FACTOR_BI (465).

Referring to FIGS. 5A and 5B, the UE receives RACH configuration from the gNB (505). The RACH configuration includes SCS for Msg1 transmission. If RA procedure is initiated (510), the UE selects 4step RA (515) and transmits Msg1 (520). If SCS of PRACH≤120 kHz (525), the UE computes RA-RNTI according to RA-RNTI=1+s_id+14*t_id+14*80*f_id+14*80*8*ul_carrier_id, where t_id=slot index (530). Then, the UE monitors the PDCCH addressed to the computed RA-RNTI in RAR window (535). If a downlink assignment has been received on the PDCCH for the RA-RNTI and the received TB is successfully decoded and if the random access response MAC PDU in the decoded TB contains a MAC subPDU with RAPID corresponding to the transmitted preamble index, RAR is considered successfully received (540). If a downlink assignment has been received on the PDCCH for the RA-RNTI and the received TB is successfully decoded and if the random access response MAC PDU in the decoded TB contains a BI subheader, the UE sets the PREAMBLE_BACKOFF to backoff value according to the BI field of the MAC subPDU multiplied with SCALING_FACTOR_BI (545). Or, If SCS of PRACH>120 kHz (525), the UE computes RA-RNTI according to RA-RNTI=1+s_id+14*t_id+14*640*f_id+14*640*8*ul_carrier_id, where t_id=slot index/8 (550). The UE monitors the PDCCH addressed to the computed RA-RNTI in RAR window (555). If a downlink assignment has been received on the PDCCH for the RA-RNTI and the received TB is successfully decoded and if the random access response MAC PDU in the decoded TB contains a MAC subPDU with RAPID corresponding to the transmitted preamble index and MAC subPDU includes slot info=slot index mod 8 where slot index corresponds to slot in which the UE transmitted RACH preamble, RAR is considered successfully received (560). If a downlink assignment has been received on the PDCCH for the RA-RNTI and the received TB is successfully decoded and if the random access response MAC PDU in the decoded TB contains a BI subheader and RAR includes slot info=slot index mod 8 where slot index corresponds to slot in which the UE transmitted RACH preamble, the UE sets the PREAMBLE_BACKOFF to backoff value according to BI field of the MAC subPDU multiplied with SCALING_FACTOR_BI (565).

(Alternate)
- If SCS of PRACH is 480 KHz
  * t_id = slot index/4; In other words, t_id is equal to remaining bits (other than 2 LSBs) of slot index; for example, if slot index is 10 bits, t_id is equal to value of 8 MSBs.
  * slot index mod 4 is included in DCI (of the PDCCH addressed to RA-RNTI) or RAR MAC PDU (scheduled by the PDCCH addressed to RA-RNTI). In other words, 2 LSBs of slot index are included in DCI (of the PDCCH addressed to RA-RNTI) or RAR MAC PDU (scheduled by the PDCCH addressed to RA-RNTI).
  * slots in a system frame are indexed sequentially from 0
- else If SCS of PRACH is 960 KHz
  * t_id = slot index/8; In other words, t_id is equal to remaining bits (other than 3 LSBs) of slot index; for example, if slot index is 10 bits, t_id is equal to value of 7 MSBs.
  * slot index mod 8 is included in DCI (of the PDCCH addressed to RA-RNTI) or RAR MAC PDU (scheduled by the PDCCH addressed to RA-RNTI). In other words, 3 LSBs of slot index are included in DCI (of the PDCCH addressed to RA-RNTI) or RAR MAC PDU (scheduled by the PDCCH addressed to RA-RNTI).
  * slots in a system frame are indexed sequentially from 0
- Else (if SCS of PRACH equals 1.25, 5, 15, 30, 60 and 120 KHz)
  * t_id = slot index; Slots in a system frame are indexed sequentially from 0

Note that for PRACH SCS of 1.25 and 5 KHz, number of slots in system frame are determined according to SCS of 15 KHz ($2^u$×15, where u=0). For SCS of 15 KHz ($2^u$×15, where u=0), there are 10 slots in a system frame. For SCS of 30 KHz ($2^u$×15, where u=1), there are 20 slots in a system frame. For SCS of 60 KHz ($2^u$× 15, where u=2), there are 40 slots in a system frame. For SCS of 120 KHz ($2^u$×15, where u=3), there are 80 slots in a system frame. For SCS of 480 KHz ($2^u$×15, where u=5), there are 320 slots in a system frame. For SCS of 960 KHz ($2^u$×15, where u=6), there are 640 slots in a system frame.

Embodiment 10 (Same MsgB-RNTI Equation, Different t_id Indexing, Scheme 1)

In this embodiment of this disclosure for receiving/transmitting MsgB for 2 step RA by UE/gNB, MsgB-RNTI is computed as follows:

$$\text{MsgB-RNTI}=1+s\_id+14*t\_id+14*80*f\_id+14*80*8*ul\_carrier\_id+14*80*8*2,$$

where s_id is the index of the first OFDM symbol of the PRACH occasion (0≤s_id<14), f_id is the index of the PRACH occasion in the frequency domain (0≤f_id<8), and ul_carrier_id is the UL carrier used for Random Access Preamble transmission (0 for NUL carrier, and 1 for SUL carrier). The PRACH occasion is the one in which the UE has transmitted preamble. For the gNB operation PRACH occasion is the one in which it has received preamble.

UE/gNB first determine the SCS for PRACH (corresponding to the transmitted/received preamble)

SCS for PRACH is signaled by the gNB in the RACH configuration (e.g., the RACH-ConfigCommon for 2 step RA.). The RACH configuration used by the UE is the RACH configuration in the BWP configuration of UL BWP selected for random access procedure. The BWP configuration is signaled by the gNB in system information or in dedicated RRC signaling message (i.e., RRCReconfiguration message). The BWP configuration in system information is typically used in RRC_IDLE/RRC_INACTIVE state. The BWP configuration in dedicated RRC signaling message is typically used in RRC_CONNECTED state.

- If SCS of PRACH > 120 KHz (or if SCS of PRACH is 480 KHz or 960 KHz)
  * t_id = slot index/8; In other words, t_id is equal to remaining bits (other than 3 LSBs) of slot index; for example, if slot index is 10 bits, t_id is equal to value of 7 MSBs.
  * slot index mod 8 is included in DCI (of the PDCCH addressed to MsgB -RNTI) or MsgB MAC PDU (scheduled by the PDCCH addressed to MsgB-RNTI). In other words, 3 LSBs of slot index are included in DCI (of the PDCCH addressed to MsgB-RNTI) or MsgB MAC PDU (scheduled by the PDCCH addressed to MsgB-RNTI).
  * slots in a system frame are indexed sequentially from 0

As described in FIG. 3 before, there are 640 slots in a system frame. The t_id for each of the slot is in the range 0 to 79. By the combination of t_id and slot index mod 8, a slot can be uniquely identified in a system frame.
- Else (if SCS of PRACH equals 1.25, 5, 15, 30, 60 and 120 KHz)
  * t_id = slot index; Slots in a system frame are indexed sequentially from 0
- (Alternate)
- If SCS of PRACH = 480 KHz
  * t_id = slot index/4; In other words, t_id is equal to remaining bits (other than 2 LSBs) of slot index; for example, if slot index is 10 bits, t_id is equal to value of 8 MSBs.
  * slot index mod 4 is included in DCI (of the PDCCH addressed to MsgB -RNTI) or MsgB MAC PDU (scheduled by the PDCCH addressed to MsgB-RNTI). In other words, 2 LSBs of slot index are included in DCI (of the PDCCH -continued

```
addressed to MsgB-RNTI) or MsgB MAC PDU (scheduled by the PDCCH addressed
to MsgB-RNTI).
    * slots in a system frame are indexed sequentially from 0
  - else If SCS of PRACH = 960 KHz
    * t_id = slot index/8; In other words, t_id is equal to remaining bits
(other than 3 LSBs) of slot index; for example, if slot index is 10 bits, t_id is equal to
value of 7 MSBs.
    * slot index mod 8 is included in DCI (of the PDCCH addressed to
MsgB -RNTI) or MsgB MAC PDU (scheduled by the PDCCH addressed to MsgB-
RNTI). In other words, 3 LSBs of slot index are included in DCI (of the PDCCH
addressed to MsgB-RNTI) or MsgB MAC PDU (scheduled by the PDCCH addressed
to MsgB-RNTI).
    * slots in a system frame are indexed sequentially from 0
  - Else (if SCS of PRACH equals 1.25, 5, 15, 30, 60 and 120 KHz)
    * t_id = slot index; Slots in a system frame are indexed sequentially
from 0
```

Note that for PRACH SCS of 1.25 and 5 KHz, number of slots in system frame are determined according to SCS of 15 KHz ($2^u\times15$, where u=0). For SCS of 15 KHz ($2^u\times15$, where u=0), there are 10 slots in a system frame. For SCS of 30 KHz ($2^u\times15$, where u=1), there are 20 slots in a system frame. For SCS of 60 KHz ($2^u\times15$, where u=2), there are 40 slots in a system frame. For SCS of 120 KHz ($2^u\times15$, where u=3), there are 80 slots in a system frame. For SCS of 480 KHz ($2^u\times15$, where u=5), there are 320 slots in a system frame. For SCS of 960 KHz ($2^u\times15$, where u=6), there are 640 slots in a system frame.

Figure 6A:
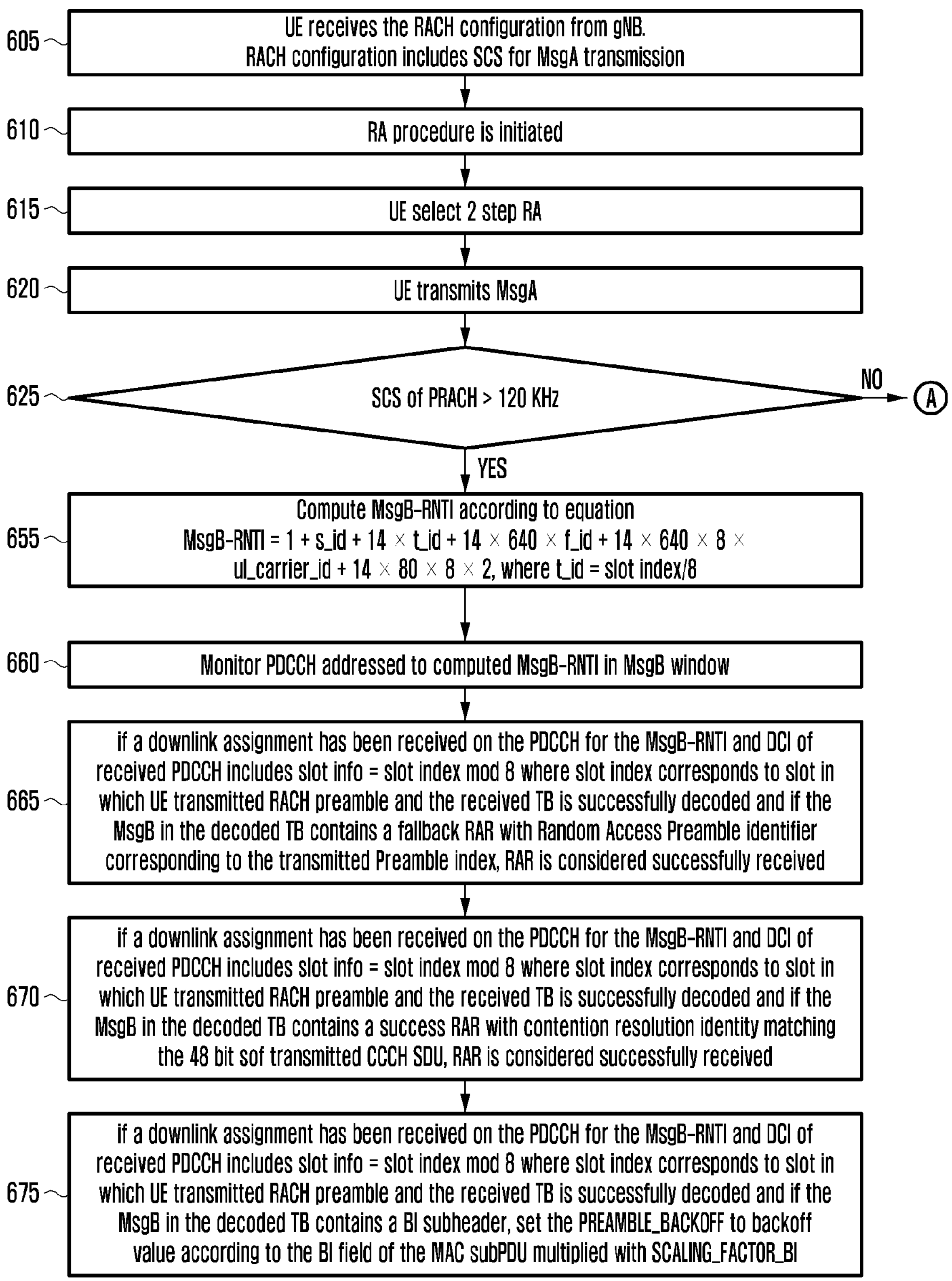
FIG. 6A illustrates another example of identifying random access associated RNTI according to an embodiment of the disclosure.
Figure 6B:
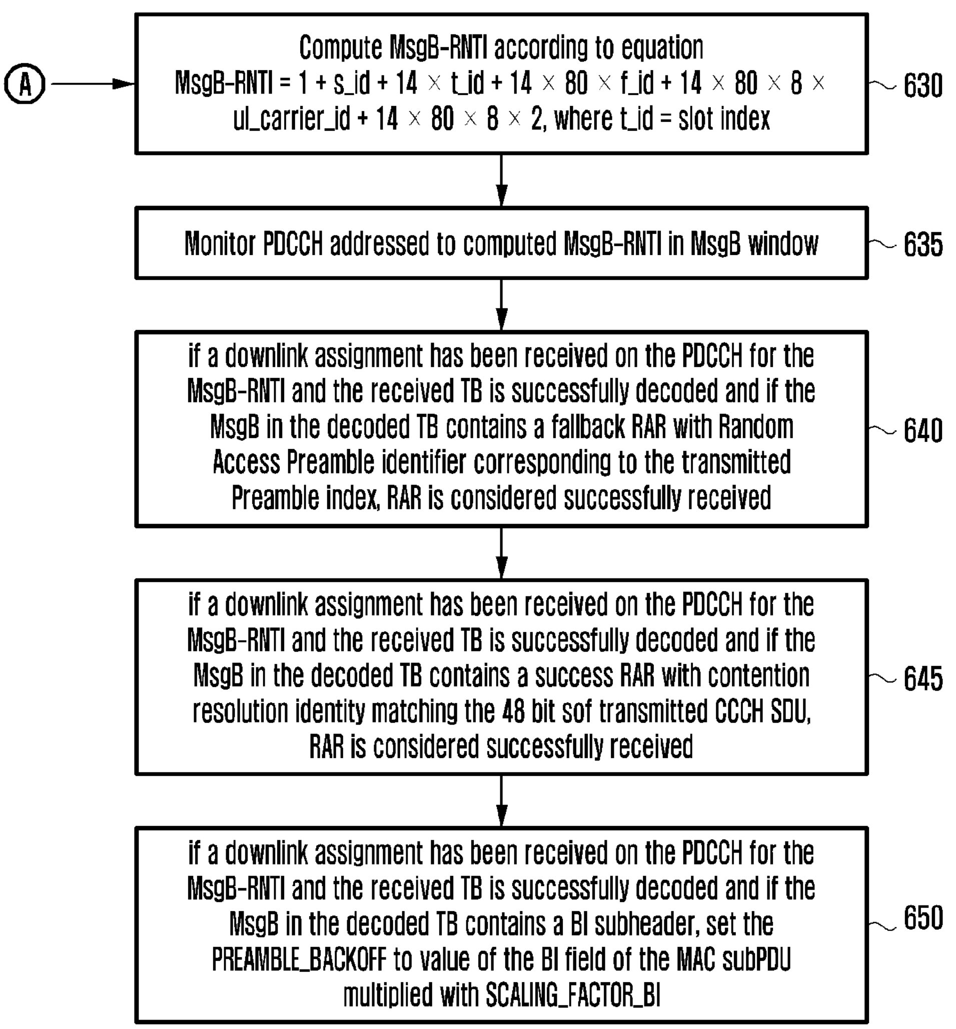
FIG. 6B illustrates another example of identifying random access associated RNTI according to an embodiment of the disclosure.
Figure 7A:
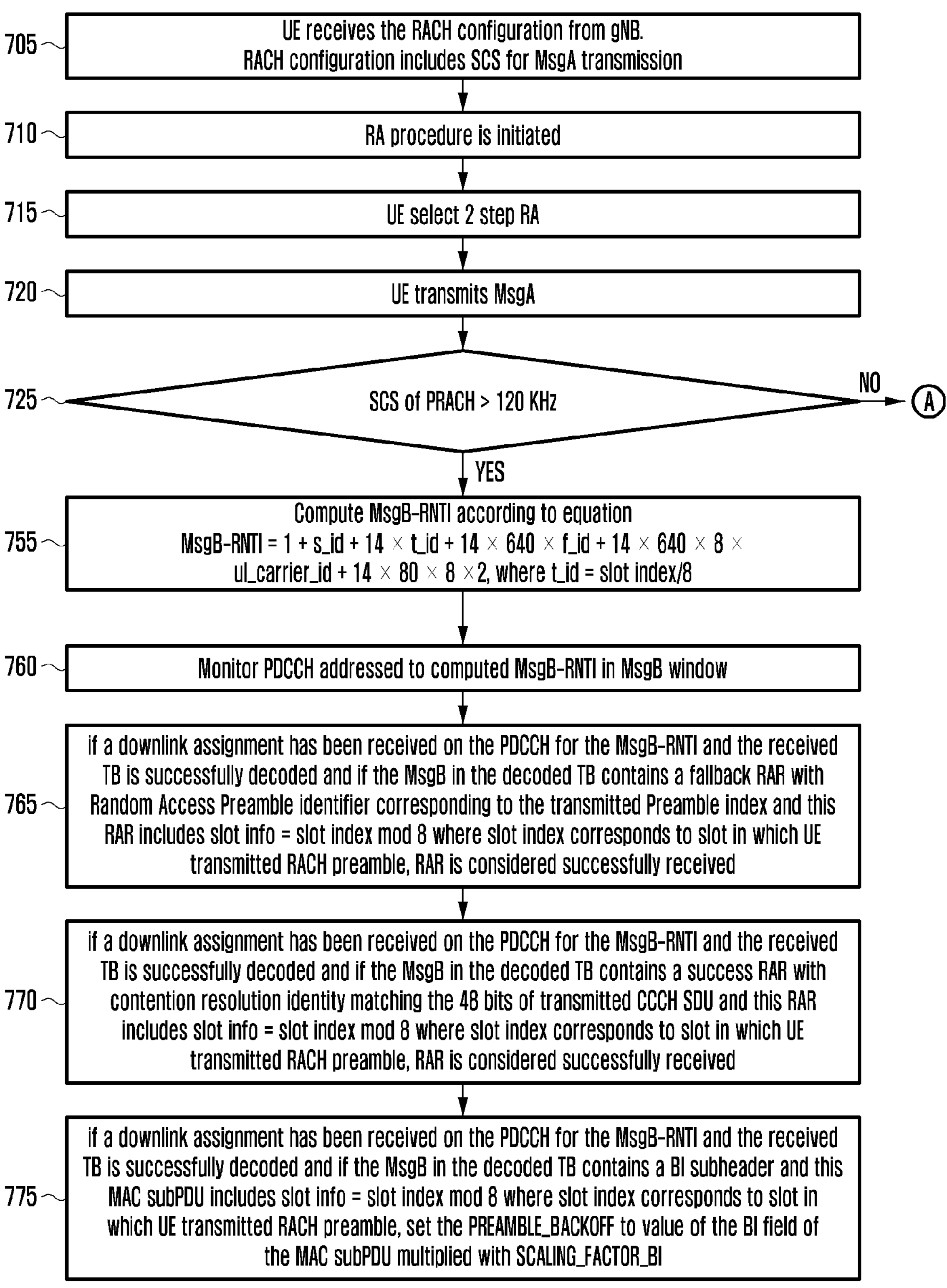
FIG. 7A illustrates another example of identifying random access associated RNTI according to an embodiment of the disclosure.
Figure 7B:
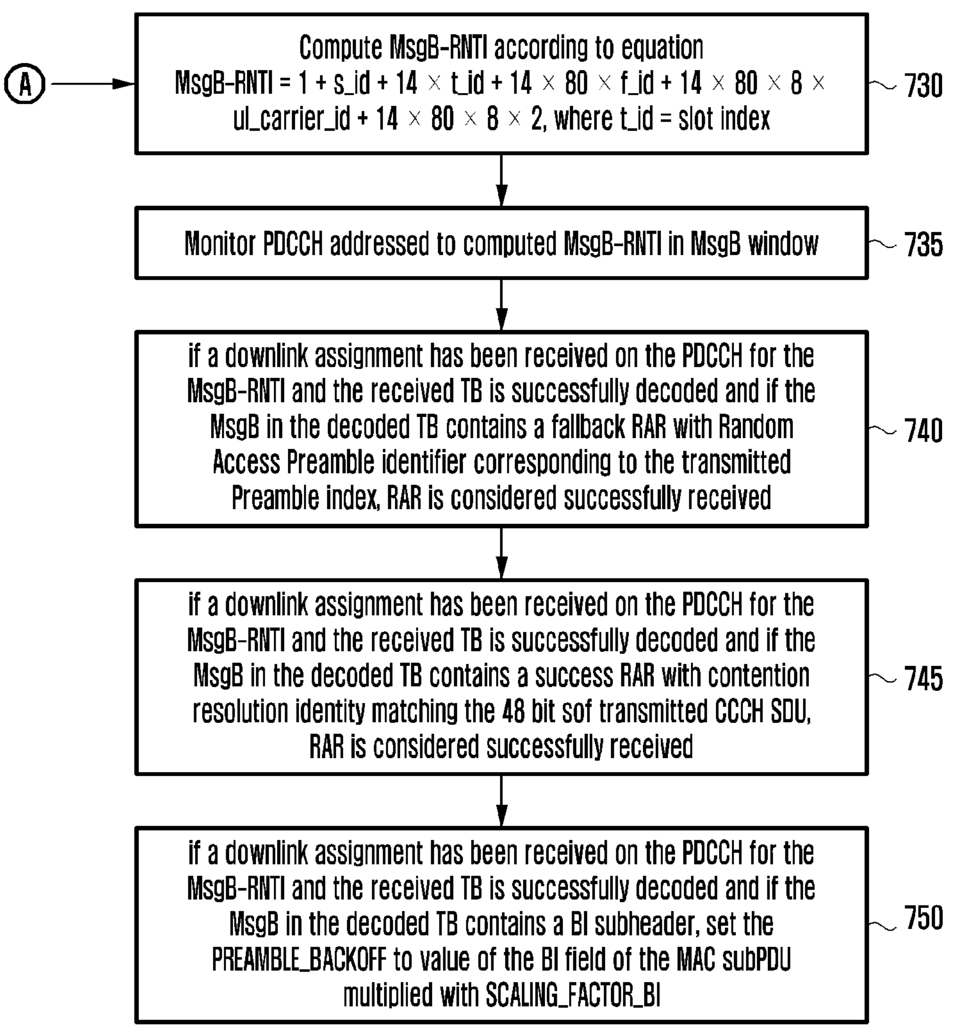
FIG. 7B illustrates another example of identifying random access associated RNTI according to an embodiment of the disclosure.

FIGS. 6A, 6B, 7A, and 7B illustrate examples of identifying random access associated RNTI according to various embodiments of the disclosure. FIGS. 6A and 6B show an embodiment wherein slot index mod 8 is included in DCI. FIGS. 7A and 7B show another embodiment wherein slot index mod 8 is included in MsgB MAC PDU.

Referring to FIGS. 6A and 6B, the UE receives RACH configuration from the gNB (605). The RACH configuration includes SCS for MsgA transmission. If RA procedure is initiated (610), the UE selects 2step RA (615) and transmits MsgA (620). If SCS of PRACH≤120 kHz (625), the UE computes MSGB-RNTI according to MSGB-RNTI=1+s_id+14*t_id+14*80*f_id+14*80*8*ul_carrier_id+14*80*8*2, where t_id=slot index (630). Then, the UE monitors the PDCCH addressed to the computed MSGB-RNTI in RAR window (635). If a downlink assignment has been received on the PDCCH for the MSGB-RNTI and the received TB is successfully decoded and if the MSGB in the decoded TB contains a fallback RAR with RAPID corresponding to the transmitted preamble index, RAR is considered successfully received (640). If a downlink assignment has been received on the PDCCH for the MSGB-RNTI and the received TB is successfully decoded and if the MSGB in the decoded TB contains a success RAR with contention resolution identity matching the 48 bits of transmitted CCCH SDU, RAR is considered successfully received (645). If a downlink assignment has been received on the PDCCH for the MSGB-RNTI and the received TB is successfully decoded and if the MSGB in the decoded TB contains a BI subheader, the UE sets the PREAMBLE_BACKOFF to value of the BI field of the MAC subPDU multiplied with SCALING_FACTOR_BI (650). Or, If SCS of PRACH>120 kHz (625), the UE computes MSGB-RNTI according to MSGB-RNTI=1+s_id+14*t_id+14*640*f_id+14*640*8*ul_carrier_id+14*80*8*2, where t_id=slot index/8 (655). The UE monitors the PDCCH addressed to the computed MSGB-RNTI in RAR window (660). If a downlink assignment has been received on the PDCCH for the MSGB-RNTI and DCI of the received PDCCH includes slot info=slot index mod 8 where slot index corresponds to slot in which the UE transmitted RACH preamble and the received TB is successfully decoded and if the MSGB in the decoded TB contains a fallback RAR with RAPID corresponding to the transmitted preamble index, RAR is considered successfully received (665). If a downlink assignment has been received on the PDCCH for the MSGB-RNTI and DCI of the received PDCCH includes slot info=slot index mod 8 where slot index corresponds to slot in which the UE transmitted RACH preamble and the received TB is successfully decoded and if the MSGB in the decoded TB contains a success RAR with contention resolution identity matching the 48 bits of transmitted CCCH SDU, RAR is considered successfully received (670). If a downlink assignment has been received on the PDCCH for the MSGB-RNTI and DCI of the received PDCCH includes slot info=slot index mod 8 where slot index corresponds to slot in which the UE transmitted RACH preamble and the received TB is successfully decoded and if the MSGB in the decoded TB contains a BI subheader, the UE sets the PREAMBLE_BACKOFF to value of the BI field of the MAC subPDU multiplied with SCALING_FACTOR_BI (675).

Referring to FIGS. 7A and 7B, the UE receives RACH configuration from the gNB (705). The RACH configuration includes SCS for MsgA transmission. If RA procedure is initiated (710), the UE selects 2step RA (715) and transmits MsgA (720). If SCS of PRACH≤120 kHz (725), the UE computes MSGB-RNTI according to MSGB-RNTI=1+s_id+14*t_id+14*80*f_id+14*80*8*ul_carrier_id+14*80*8*2, where t_id=slot index (730). Then, the UE monitors the PDCCH addressed to the computed MSGB-RNTI in RAR window (735). If a downlink assignment has been received on the PDCCH for the MSGB-RNTI and the received TB is successfully decoded and if the MSGB in the decoded TB contains a fallback RAR with RAPID corresponding to the transmitted preamble index, RAR is considered successfully received (740). If a downlink assignment has been received on the PDCCH for the MSGB-RNTI and the received TB is successfully decoded and if the MSGB in the decoded TB contains a success RAR with contention resolution identity matching the 48 bits of transmitted CCCH SDU, RAR is considered successfully received (745). If a downlink assignment has been received on the PDCCH for the MSGB-RNTI and the received TB is successfully decoded and if the MSGB in the decoded TB contains a BI subheader, the UE sets the PREAMBLE_BACKOFF to value of the BI field of the MAC subPDU multiplied with SCALING_FACTOR_BI (750). Or, If SCS of PRACH>120 kHz (725), the UE computes MSGB-RNTI according to MSGB-RNTI=1+s_id+14*t_id+14*640*f_id+14*640*8*ul_carrier_id+14*80*8*2, where t_id=slot index/8 (755). The UE monitors the PDCCH addressed to the computed MSGB-RNTI in RAR window (760). If a downlink assignment has been received on the PDCCH for the MSGB-RNTI and the received TB is successfully decoded and if the MSGB in the decoded TB contains a fallback RAR with RAPID corresponding to the transmitted preamble index and this RAR includes slot info=slot index mod 8 where slot index corresponds to slot in which the UE transmitted RACH preamble, RAR is considered successfully received (765). If a downlink assignment has been received on the PDCCH for the MSGB-RNTI and the received TB is successfully decoded and if the MSGB in the decoded TB contains a success RAR with contention resolution identity matching the 48 bits of transmitted CCCH SDU and this RAR includes slot info=slot index mod 8 where slot index corresponds to slot in which the UE transmitted RACH preamble, RAR is considered successfully received (770). If a downlink assignment has been received on the PDCCH for the MSGB-RNTI and the received TB is successfully decoded and if the MSGB in the decoded TB contains a BI subheader and this RAR includes slot info=slot index mod 8 where slot index corresponds to slot in which the UE transmitted RACH preamble, the UE sets the PREAMBLE_BACKOFF to value of the BI field of the MAC subPDU multiplied with SCALING_FACTOR_BI (775).

Embodiment 11 (Same RA-RNTI Equation, Different t_id Indexing, Scheme 2)

In this embodiment of this disclosure for receiving/transmitting RAR for 4 step RA by UE/gNB, RA-RNTI is computed as follows:

$$\text{RA-RNTI}=1+s\_\text{id}+14*t\_\text{id}+14*80*f\_\text{id}+14*80*8*\text{ul\_carrier\_id},$$

where s_id is the index of the first OFDM symbol of the PRACH occasion (0≤s_id<14), f_id is the index of the PRACH occasion in the frequency domain (0≤f_id<8), and ul_carrier_id is the UL carrier used for Random Access Preamble transmission (0 for NUL carrier, and 1 for SUL carrier). The PRACH occasion is the one in which the UE has transmitted preamble. For the gNB operation PRACH occasion is the one in which it has received preamble.

UE/gNB first determine the SCS for PRACH (corresponding to the transmitted/received preamble)

SCS for PRACH is signaled by the gNB in the RACH configuration (e.g., the RACH-ConfigCommon for 4 step RA.). The RACH configuration used by the UE is the RACH configuration in the BWP configuration of UL BWP selected for random access procedure. The BWP configuration is signaled by the gNB in system information or in dedicated RRC signaling message (i.e., RRCReconfiguration message). The BWP configuration in system information is typically used in RRC_IDLE/RRC_INACTIVE state. The BWP configuration in dedicated RRC signaling message is typically used in RRC_CONNECTED state.

```
- If SCS of PRACH > 120 KHz (or if SCS of PRACH is 480 KHz or 960 KHz)
    * t_id = slot index mod 80;
    * slot index/80 is included in DCI (of the PDCCH addressed to RA-RNTI) or RAR MAC PDU (scheduled by the PDCCH addressed to RA-RNTI).
    * slots in a system frame are indexed sequentially from 0
```

Figure 8:
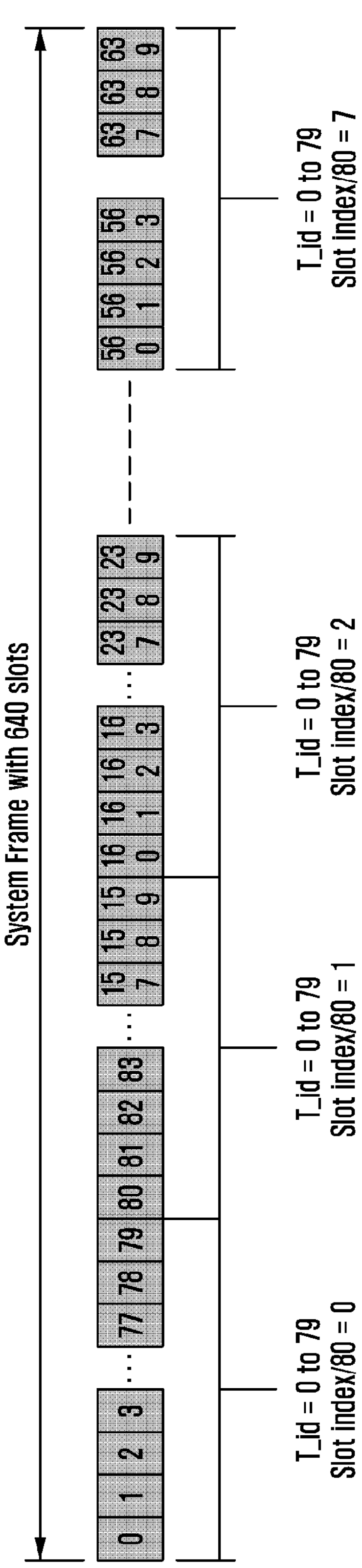
FIG. 8 illustrates another example of system frame structure in according to an embodiment of the disclosure.

FIG. 8 illustrates another example of system frame structure according to an embodiment of the disclosure. As shown in FIG. 8, there are 640 slots in a system frame. The t_id for each of the slot is in the range 0 to 79. By the combination of t_id and slot index/80, a slot can be uniquely identified in a system frame.

```
- Else (if SCS of PRACH equals 1.25, 5, 15, 30, 60 and 120 KHz)
    * t_id = slot index; Slots in a system frame are indexed sequentially from 0
- (Alternate)
- If SCS of PRACH is 480 KHz
    * t_id = slot index mod 40;
    * slot index/40 is included in DCI (of the PDCCH addressed to RA-RNTI) or RAR MAC PDU (scheduled by the PDCCH addressed to RA-RNTI).
    * slots in a system frame are indexed sequentially from 0
- else If SCS of PRACH is 960 KHz
    * t_id = slot index mod 80;
    * slot index/80 is included in DCI (of the PDCCH addressed to RA-RNTI) or RAR MAC PDU (scheduled by the PDCCH addressed to RA-RNTI).
    * slots in a system frame are indexed sequentially from 0
- Else (if SCS of PRACH equals 1.25, 5, 15, 30, 60 and 120 KHz)
    * t_id = slot index; Slots in a system frame are indexed sequentially from 0
```

Note that for PRACH SCS of 1.25 and 5 KHz, number of slots in system frame are determined according to SCS of 15 KHz ($2^u\times15$, where u=0). For SCS of 15 KHz ($2^u\times15$, where u=0), there are 10 slots in a system frame. For SCS of 30 KHz ($2^u\times15$, where u=1), there are 20 slots in a system frame. For SCS of 60 KHz ($2^u\times15$, where u=2), there are 40 slots in a system frame. For SCS of 120 KHz ($2^u\times15$, where u=3), there are 80 slots in a system frame. For SCS of 480 KHz ($2^u\times15$, where u=5), there are 320 slots in a system frame. For SCS of 960 KHz ($2^u\times15$, where u=6), there are 640 slots in a system frame.

Figure 9A:
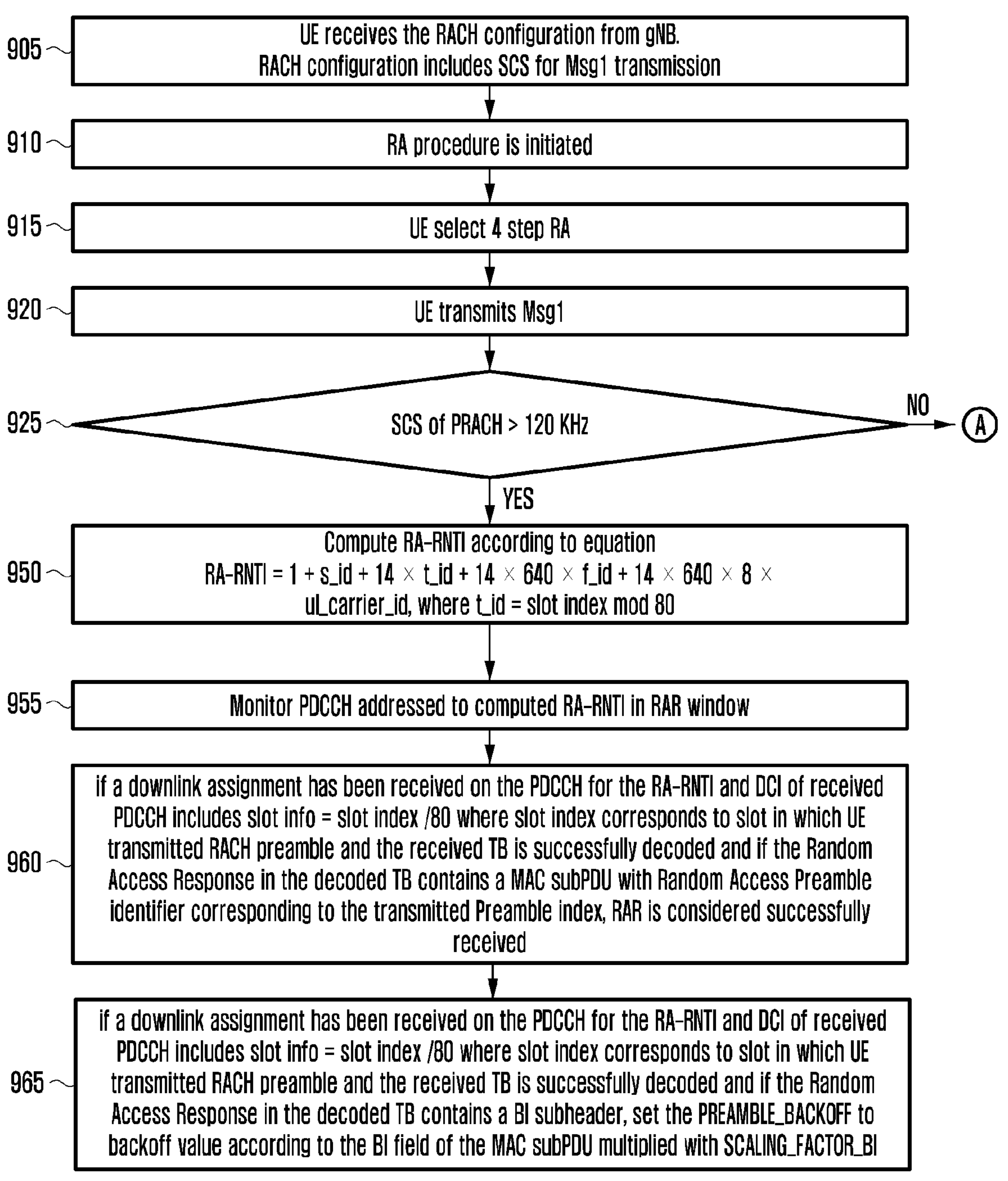
FIG. 9A illustrates another example of identifying random access associated RNTI according to an embodiment of the disclosure.
Figure 9B:
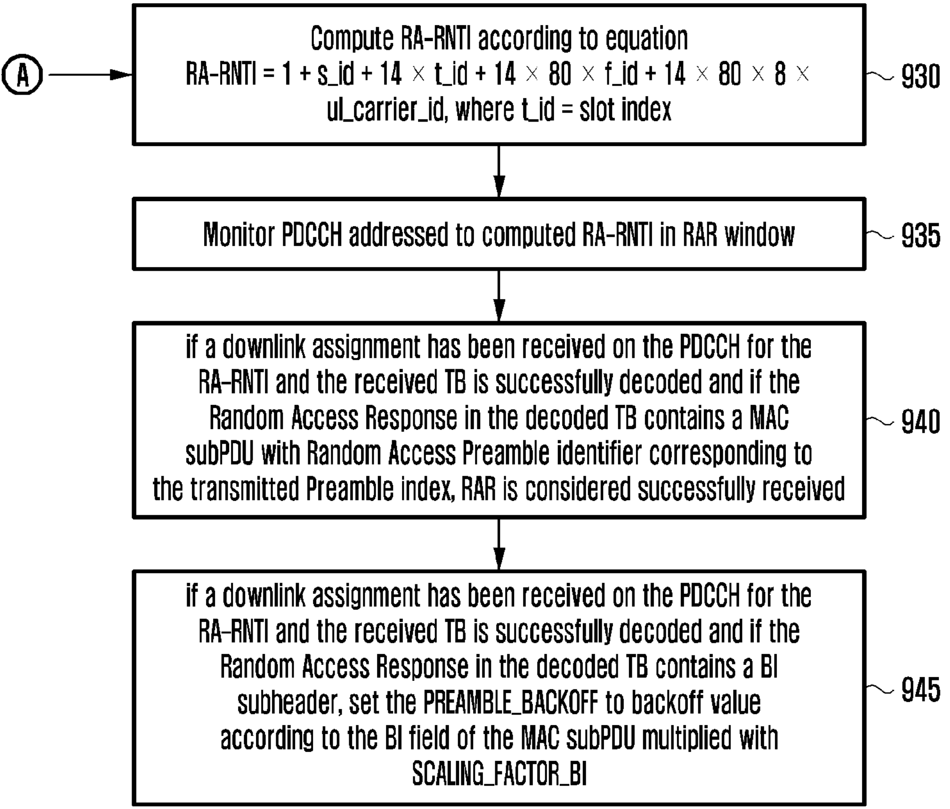
FIG. 9B illustrates another example of identifying random access associated RNTI according to an embodiment of the disclosure.
Figure 10A:
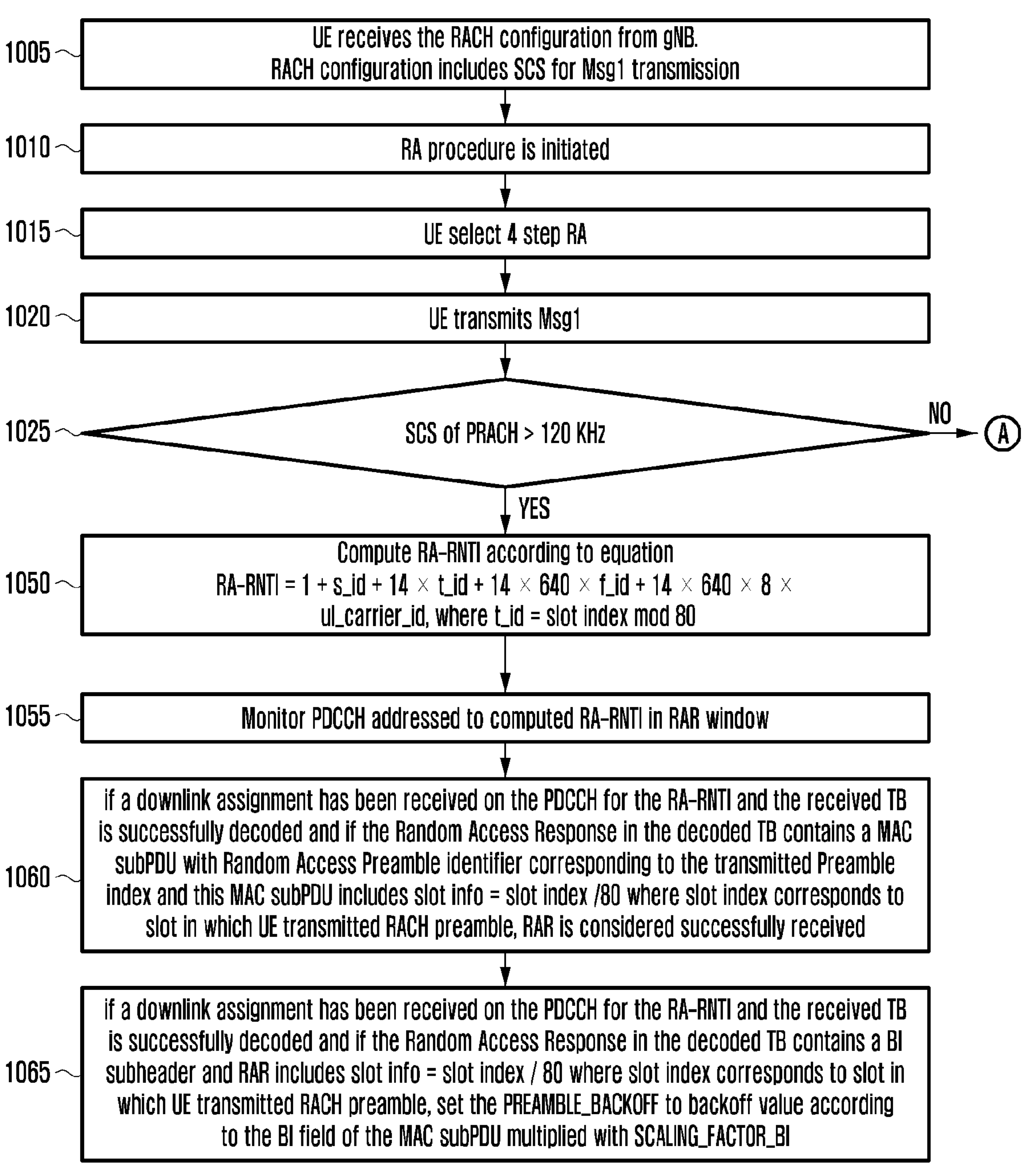
FIG. 10A illustrates another example of identifying random access associated RNTI according to an embodiment of the disclosure.
Figure 10B:
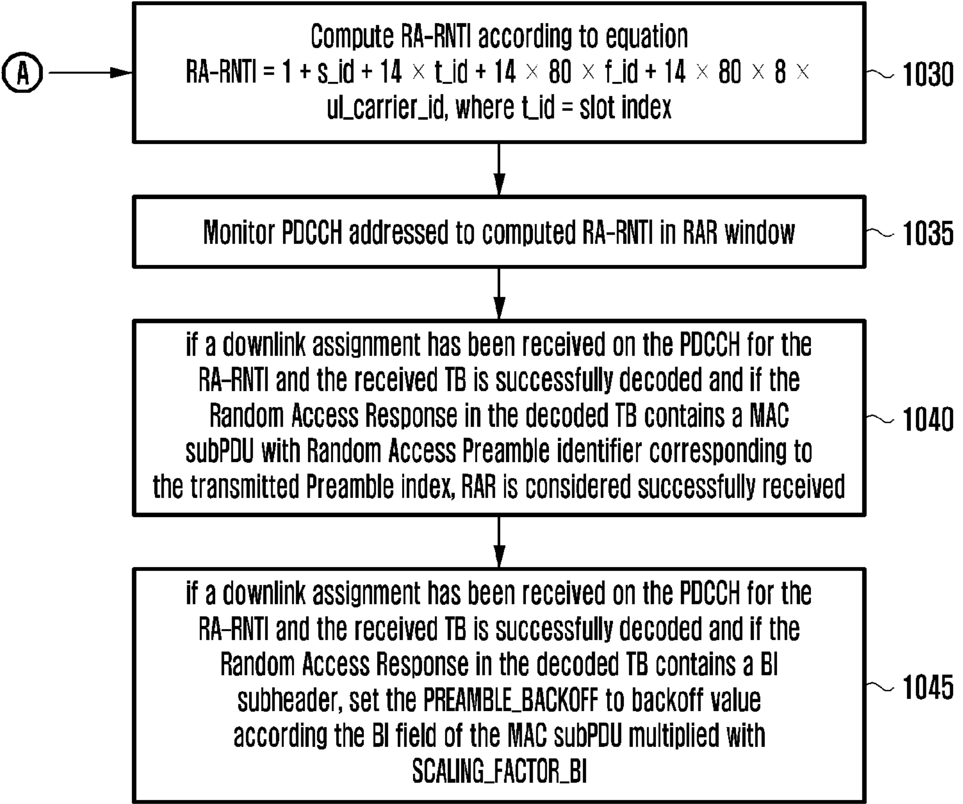
FIG. 10B illustrates another example of identifying random access associated RNTI according to an embodiment of the disclosure.

FIGS. 9A, 9B, 10A, and 10B illustrate examples of identifying random access associated RNTI according to various embodiments of the disclosure. FIGS. 9A and 9B show an embodiment wherein slot index/80 is included in DCI. FIGS. 10A and 10B shows another embodiment wherein slot index/80 is included in RAR MAC PDU.

Referring to FIGS. 9A and 9B, the UE receives RACH configuration from the gNB (905). The RACH configuration includes SCS for Msg1 transmission. If RA procedure is initiated (910), the UE selects 4step RA (915) and transmits Msg1 (920). If SCS of PRACH≤120 kHz (925), the UE computes RA-RNTI according to RA-RNTI=1+s_id+14*t_id+14*80*f_id+14*80*8*ul_carrier_id, where t_id=slot index (930). Then, the UE monitors the PDCCH addressed to the computed RA-RNTI in RAR window (935). If a downlink assignment has been received on the PDCCH for the RA-RNTI and the received TB is successfully decoded and if the random access response MAC PDU in the decoded TB contains a MAC subPDU with RAPID corresponding to the transmitted preamble index, RAR is considered successfully received (940). If a downlink assignment has been received on the PDCCH for the RA- RNTI and the received TB is successfully decoded and if the random access response in the decoded TB contains a BI subheader, the UE sets the PREAMBLE_BACKOFF to backoff value according to the BI field of the MAC subPDU multiplied with SCALING_FACTOR_BI (945). Or, If SCS of PRACH>120 kHz (925), the UE computes RA-RNTI according to RA-RNTI=1+s_id+14*t_id+14*640*f_id+14*640*8*ul_carrier_id, where t_id=slot index mod 80 (950). The UE monitors the PDCCH addressed to the computed RA-RNTI in RAR window (955). If a downlink assignment has been received on the PDCCH for the RA-RNTI and DCI of the received PDCCH includes slot info=slot index/80 where slot index corresponds to slot in which the UE transmitted RACH preamble and the received TB is successfully decoded and if the random access response in the decoded TB contains a MAC subPDU with RAPID corresponding to the transmitted preamble index, RAR is considered successfully received (960). If a downlink assignment has been received on the PDCCH for the RA-RNTI and DCI of the received PDCCH includes slot info=slot index/80 where slot index corresponds to slot in which the UE transmitted RACH preamble and the received TB is successfully decoded and if the random access response MAC PDU in the decoded TB contains a BI subheader, the UE sets the PREAMBLE_BACKOFF to backoff value according to BI field of the MAC subPDU multiplied with SCALING_FACTOR_BI (965).

Referring to FIGS. 10A and 10B, the UE receives RACH configuration from the gNB (1005). The RACH configuration includes SCS for Msg1 transmission. If RA procedure is initiated (1010), the UE selects 4step RA (1015) and transmits Msg1 (1020). If SCS of PRACH≤120 kHz (1025), the UE computes RA-RNTI according to RA-RNTI=1+s_id+14*t_id+14*80*f_id+14*80*8*ul_carrier_id, where t_id=slot index (1030). Then, the UE monitors the PDCCH addressed to the computed RA-RNTI in RAR window (1035). If a downlink assignment has been received on the PDCCH for the RA-RNTI and the received TB is successfully decoded and if the random access response MAC PDU in the decoded TB contains a MAC subPDU with RAPID corresponding to the transmitted preamble index, RAR is considered successfully received (1040). If a downlink assignment has been received on the PDCCH for the RA-RNTI and the received TB is successfully decoded and if the random access response MAC PDU in the decoded TB contains a BI subheader, the UE sets the PREAMBLE_BACKOFF to backoff value according to the BI field of the MAC subPDU multiplied with SCALING_FACTOR_BI (1045). Or, If SCS of PRACH>120 kHz (1025), the UE computes RA-RNTI according to RA-RNTI=1+s_id+14*t_id+14*640*f_id+14*640*8*ul_carrier_id, where t_id=slot index mod 80 (1050). The UE monitors the PDCCH addressed to the computed RA-RNTI in RAR window (1055). If a downlink assignment has been received on the PDCCH for the RA-RNTI and the received TB is successfully decoded and if the random access response MAC PDU in the decoded TB contains a MAC subPDU with RAPID corresponding to the transmitted preamble index and this MAC subPDU includes slot info=slot index/80 where slot index corresponds to slot in which the UE transmitted RACH preamble, RAR is considered successfully received (1060). If a downlink assignment has been received on the PDCCH for the RA-RNTI and the received TB is successfully decoded and if the random access response MAC PDU in the decoded TB contains a BI subheader and RAR includes slot info=slot index/80 where slot index corresponds to slot in which the UE transmitted RACH preamble, the UE sets the PREAMBLE_BACKOFF to backoff value according to BI field of the MAC subPDU multiplied with SCALING_FACTOR_BI (1065).

Embodiment 12 (Same MsgB-RNTI Equation, Different t_id Indexing, Scheme 2)

In this embodiment of this disclosure for receiving/transmitting MsgB for 2 step RA by UE/gNB, MsgB-RNTI is computed as follows:

MsgB-RNTI=1+*s*_id+14*t_id+14*80*f_id+14*80*8*ul_carrier_id+14*80*8*2, where s_id is the index of the first OFDM symbol of the PRACH occasion (0≤s_id<14), f_id is the index of the PRACH occasion in the frequency domain (0≤f_id<8), and ul_carrier_id is the UL carrier used for Random Access Preamble transmission (0 for NUL carrier, and 1 for SUL carrier). The PRACH occasion is the one in which the UE has transmitted preamble. For the gNB operation PRACH occasion is the one in which it has received preamble.

UE/gNB first determine the SCS for PRACH (corresponding to the transmitted/received preamble)

SCS for PRACH is signaled by the gNB in the RACH configuration (e.g., the RACH-ConfigCommon for 2 step RA.). The RACH configuration used by the UE is the RACH configuration in the BWP configuration of UL BWP selected for random access procedure. The BWP configuration is signaled by the gNB in system information or in dedicated RRC signaling message (i.e., RRCReconfiguration message). The BWP configuration in system information is typically used in RRC_IDLE/RRC_INACTIVE state. The BWP configuration in dedicated RRC signaling message is typically used in RRC_CONNECTED state.

```
- If SCS of PRACH > 120 KHz (or if SCS of PRACH is 480 KHz or 960 KHz)
    * t_id = slot index mod 80;
    * slot index/80 is included in DCI (of the PDCCH addressed to MsgB -RNTI) or MsgB MAC PDU (scheduled by the PDCCH addressed to MsgB-RNTI).
    * slots in a system frame are indexed sequentially from 0
```

As described in FIG. 3 before, there are 640 slots in a system frame. The t_id for each of the slot is in the range 0 to 79. By the combination oft id and slot index/80, a slot can be uniquely identified in a system frame.

```
- Else (if SCS of PRACH equals 1.25, 5, 15, 30, 60 and 120 KHz)
    * t_id = slot index; Slots in a system frame are indexed sequentially from 0
  (Alternate)
- If SCS of PRACH is 480 KHz
    * t_id = slot index mod 40;
    * slot index/40 is included in DCI (of the PDCCH addressed to MsgB -RNTI) or MsgB MAC PDU (scheduled by the PDCCH addressed to MsgB-RNTI).
    * slots in a system frame are indexed sequentially from 0
- else If SCS of PRACH is 960 KHz
    * t_id = slot index mod 80;
    * slot index/80 is included in DCI (of the PDCCH addressed to MsgB -RNTI) or MsgB MAC PDU (scheduled by the PDCCH addressed to MsgB-RNTI).
    * slots in a system frame are indexed sequentially from 0
```

-continued

- Else (if SCS of PRACH equals 1.25, 5, 15, 30, 60 and 120 KHz)
  * t_id = slot index; Slots in a system frame are indexed sequentially from 0

Note that for PRACH SCS of 1.25 and 5 KHz, number of slots in system frame are determined according to SCS of 15 KHz ($2^u \times 15$, where u=0). For SCS of 15 KHz ($2^u \times 15$, where u=0), there are 10 slots in a system frame. For SCS of 30 KHz ($2^u \times 15$, where u=1), there are 20 slots in a system frame. For SCS of 60 KHz ($2^u \times 15$, where u=2), there are 40 slots in a system frame. For SCS of 120 KHz ($2^u \times 15$, where u=3), there are 80 slots in a system frame. For SCS of 480 KHz ($2^u \times 15$, where u=5), there are 320 slots in a system frame. For SCS of 960 KHz ($2^u \times 15$, where u=6), there are 640 slots in a system frame.

Figure 11A:
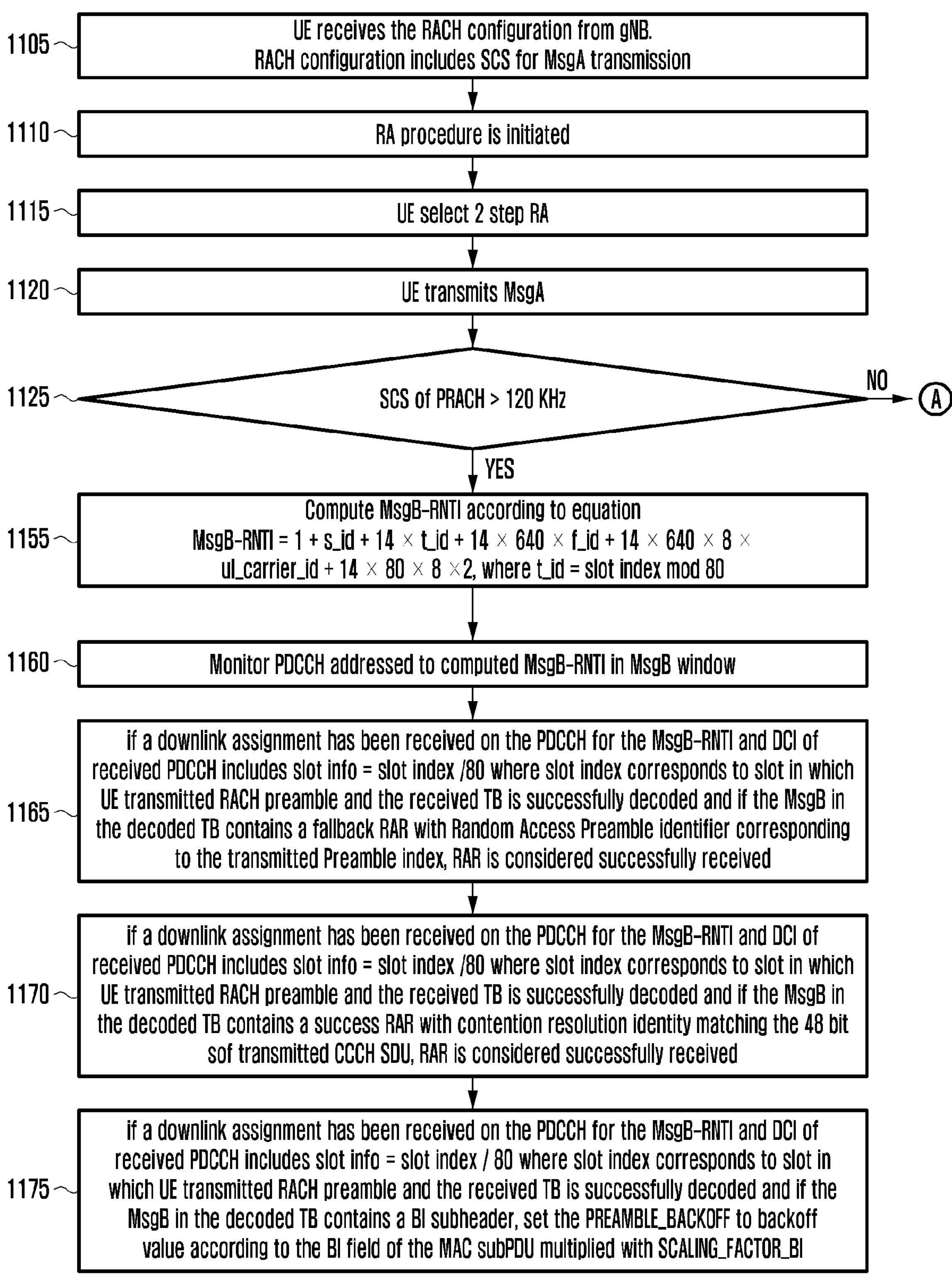
FIG. 11A illustrates another example of identifying random access associated RNTI according to an embodiment of the disclosure.
Figure 11B:
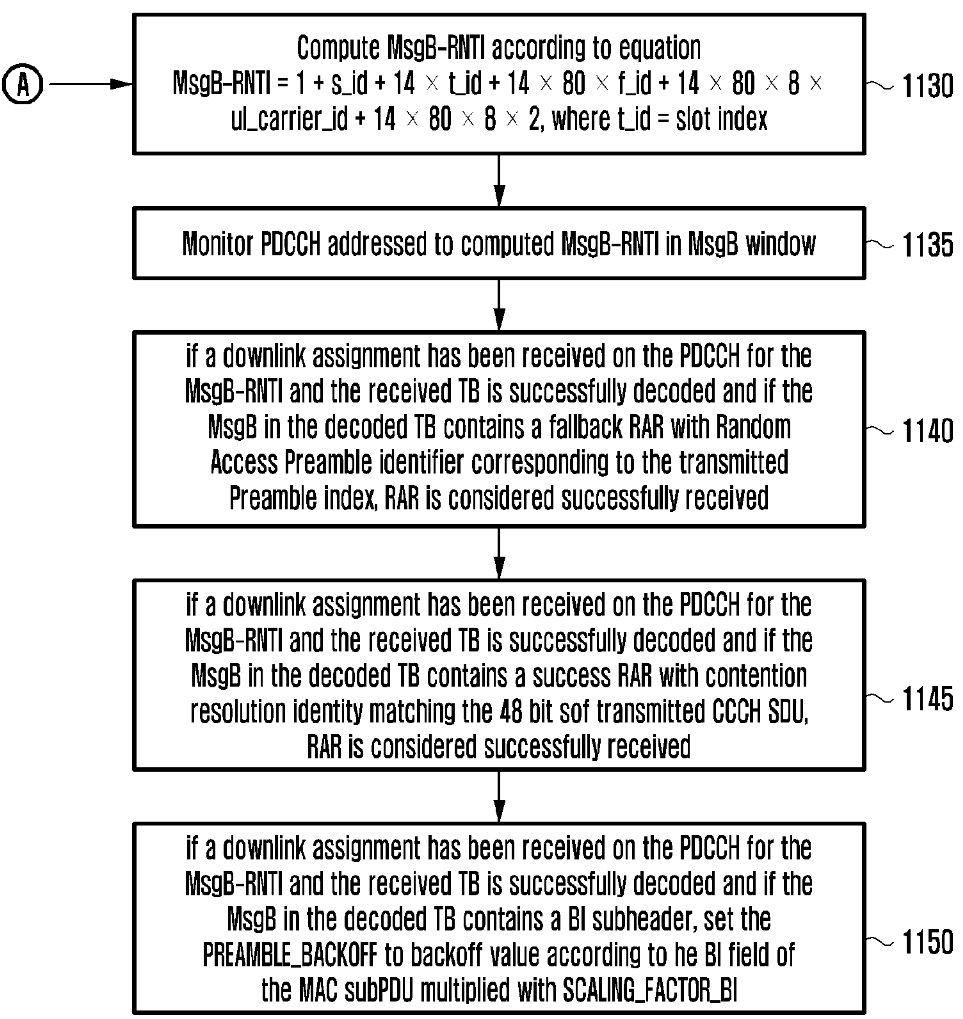
FIG. 11B illustrates another example of identifying random access associated RNTI according to an embodiment of the disclosure.
Figure 12A:
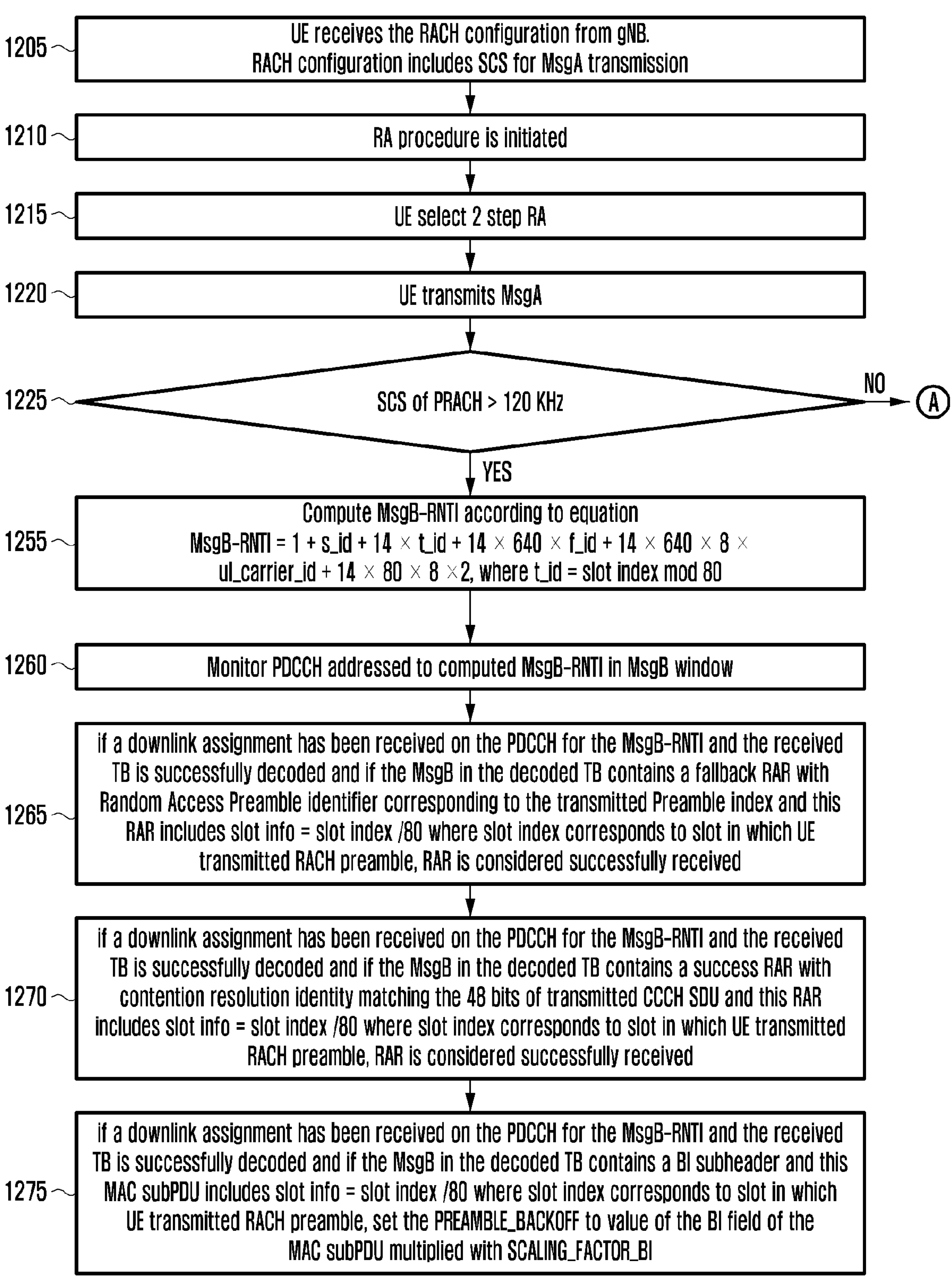
FIG. 12A illustrates another example of identifying random access associated RNTI according to an embodiment of the disclosure.
Figure 12B:
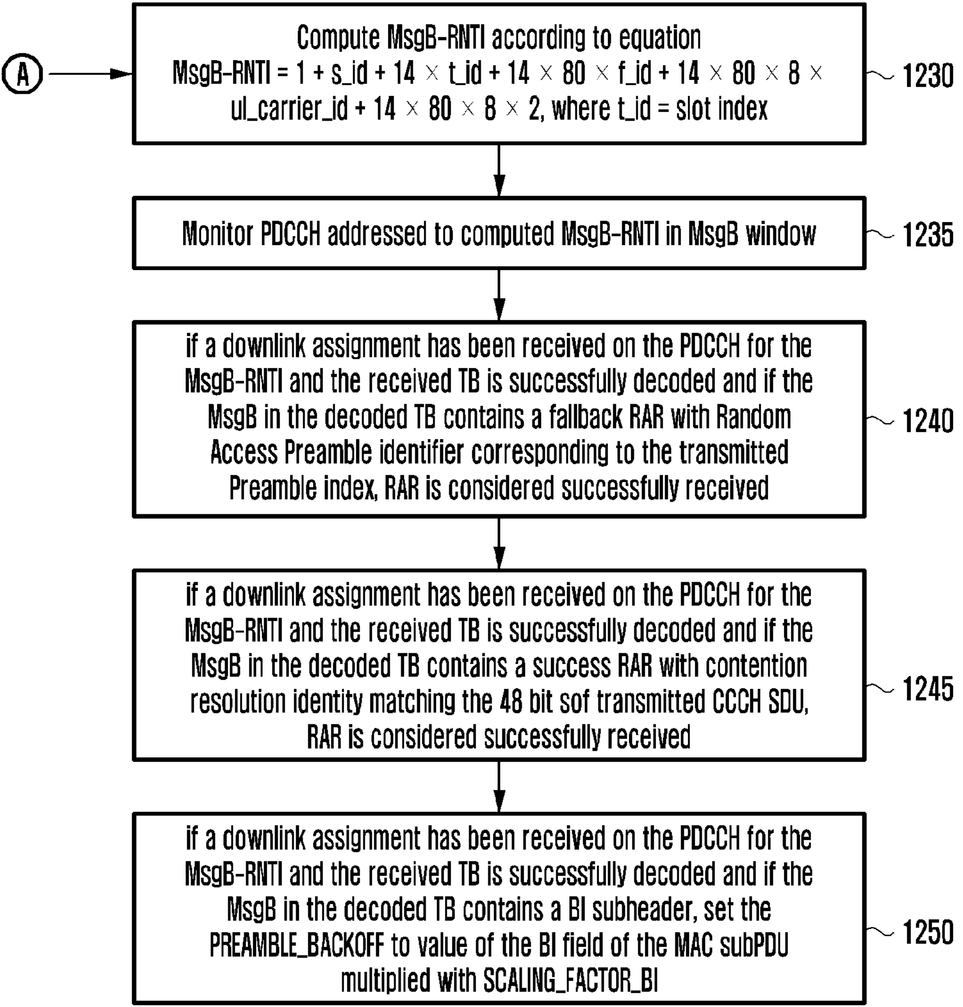
FIG. 12B illustrates another example of identifying random access associated RNTI according to an embodiment of the disclosure.

FIGS. 11A, 11B, 12A, and 12B illustrate examples of identifying random access associated RNTI according to various embodiments of the disclosure. FIGS. 11A and 11B show an embodiment wherein slot index/80 is included in DCI. FIGS. 12A and 12B show another embodiment wherein slot index/80 is included in MsgB.

Referring to FIGS. 11A and 11B, the UE receives RACH configuration from the gNB (1105). The RACH configuration includes SCS for MsgA transmission. If RA procedure is initiated (1110), the UE selects 2step RA (1115) and transmits MsgA (1120). If SCS of PRACH≤120 kHz (1125), the UE computes MSGB-RNTI according to MSGB-RNTI=1+s_id+14*t_id+14*80*f_id+14*80*8*ul_carrier_id+14*80*8*2, where t_id=slot index (1130). Then, the UE monitors the PDCCH addressed to the computed MSGB-RNTI in RAR window (1135). If a downlink assignment has been received on the PDCCH for the MSGB-RNTI and the received TB is successfully decoded and if the MSGB in the decoded TB contains a fallback RAR with RAPID corresponding to the transmitted preamble index, RAR is considered successfully received (1140). If a downlink assignment has been received on the PDCCH for the MSGB-RNTI and the received TB is successfully decoded and if the MSGB in the decoded TB contains a success RAR with contention resolution identity matching the 48 bits of transmitted CCCH SDU, RAR is considered successfully received (1145). If a downlink assignment has been received on the PDCCH for the MSGB-RNTI and the received TB is successfully decoded and if the MSGB in the decoded TB contains a BI subheader, the UE sets the PREAMBLE_BACKOFF to value of the BI field of the MAC subPDU multiplied with SCALING_FACTOR_BI (1150). Or, If SCS of PRACH>120 kHz (1125), the UE computes MSGB-RNTI according to MSGB-RNTI=1+s_id+14*t_id+14*640*f_id+14*640*8*ul_carrier_id+14*80*8*2, where t_id=slot index mod 80 (1155). The UE monitors the PDCCH addressed to the computed MSGB-RNTI in RAR window (1160). If a downlink assignment has been received on the PDCCH for the MSGB-RNTI and DCI of the received PDCCH includes slot info=slot index/80 where slot index corresponds to slot in which the UE transmitted RACH preamble and the received TB is successfully decoded and if the MSGB in the decoded TB contains a fallback RAR with RAPID corresponding to the transmitted preamble index, RAR is considered successfully received (1165). If a downlink assignment has been received on the PDCCH for the MSGB-RNTI and DCI of the received PDCCH includes slot info=slot index/80 where slot index corresponds to slot in which the UE transmitted RACH preamble and the received TB is successfully decoded and if the MSGB in the decoded TB contains a success RAR with contention resolution identity matching the 48 bits of transmitted CCCH SDU, RAR is considered successfully received (1170). If a downlink assignment has been received on the PDCCH for the MSGB-RNTI and DCI of the received PDCCH includes slot info=slot index/80 where slot index corresponds to slot in which the UE transmitted RACH preamble and the received TB is successfully decoded and if the MSGB in the decoded TB contains a BI subheader, the UE sets the PREAMBLE_BACKOFF to value of the BI field of the MAC subPDU multiplied with SCALING_FACTOR_BI (1175).

Referring to FIGS. 12A and 12B, the UE receives RACH configuration from the gNB (1205). The RACH configuration includes SCS for MsgA transmission. If RA procedure is initiated (1210), the UE selects 2step RA (1215) and transmits MsgA (1220). If SCS of PRACH≤120 kHz (1225), the UE computes MSGB-RNTI according to MSGB-RNTI=1+s_id+14*t_id+14*80*f_id+14*80*8*ul_carrier_id+14*80*8*2, where t_id=slot index (1230). Then, the UE monitors the PDCCH addressed to the computed MSGB-RNTI in RAR window (1235). If a downlink assignment has been received on the PDCCH for the MSGB-RNTI and the received TB is successfully decoded and if the MSGB in the decoded TB contains a fallback RAR with RAPID corresponding to the transmitted preamble index, RAR is considered successfully received (1240). If a downlink assignment has been received on the PDCCH for the MSGB-RNTI and the received TB is successfully decoded and if the MSGB in the decoded TB contains a success RAR with contention resolution identity matching the 48 bits of transmitted CCCH SDU, RAR is considered successfully received (1245). If a downlink assignment has been received on the PDCCH for the MSGB-RNTI and the received TB is successfully decoded and if the MSGB in the decoded TB contains a BI subheader, the UE sets the PREAMBLE_BACKOFF to value of the BI field of the MAC subPDU multiplied with SCALING_FACTOR_BI (1250). Or, If SCS of PRACH>120 kHz (1225), the UE computes MSGB-RNTI according to MSGB-RNTI=1+s_id+14*t_id+14*640*f_id+14*640*8*ul_carrier_id+14*80*8*2, where t_id=slot index mod 80 (1255). The UE monitors the PDCCH addressed to the computed MSGB-RNTI in RAR window (1260). If a downlink assignment has been received on the PDCCH for the MSGB-RNTI and the received TB is successfully decoded and if the MSGB in the decoded TB contains a fallback RAR with RAPID corresponding to the transmitted preamble index and this RAR includes slot info=slot index/80 where slot index corresponds to slot in which the UE transmitted RACH preamble, RAR is considered successfully received (1265). If a downlink assignment has been received on the PDCCH for the MSGB-RNTI and the received TB is successfully decoded and if the MSGB in the decoded TB contains a success RAR with contention resolution identity matching the 48 bits of transmitted CCCH SDU and this RAR includes slot info=slot index/80 where slot index corresponds to slot in which the UE transmitted RACH preamble, RAR is considered successfully received (1270). If a downlink assignment has been received on the PDCCH for the MSGB-RNTI and the received TB is successfully decoded and if the MSGB in the decoded TB contains a BI subheader and this RAR includes slot info=slot index/80 where slot index corresponds to slot in which UE transmitted RACH preamble, the UE sets the PREAMBLE_BACKOFF to value of the BI field of the MAC subPDU multiplied with SCALING_FACTOR_BI (1275).

Embodiment 13 (Same RA-RNTI Equation, Different t_id Indexing, Scheme 3)

In this embodiment of this disclosure for receiving/transmitting RAR for 4 step RA by UE/gNB, RA-RNTI is computed as follows:

$$RA\text{-}RNTI=1+s\_id+14*t\_id+14*80*f\_id+14*80*8*ul\_carrier\_id,$$

where s_id is the index of the first OFDM symbol of the PRACH occasion (0≤s_id<14), f_id is the index of the PRACH occasion in the frequency domain (0≤f_id<8), and ul_carrier_id is the UL carrier used for Random Access Preamble transmission (0 for NUL carrier, and 1 for SUL carrier). The PRACH occasion is the one in which the UE has transmitted preamble. For the gNB operation PRACH occasion is the one in which it has received preamble.

- UE/gNB first determine the SCS for PRACH (corresponding to the transmitted/received preamble)
  - SCS for PRACH is signaled by the gNB in the RACH configuration (e.g., the RACH-ConfigCommon for 4 step RA.). The RACH configuration used by the UE is the RACH configuration in the BWP configuration of UL BWP selected for random access procedure. The BWP configuration is signaled by the gNB in system information or in dedicated RRC signaling message (i.e., RRCReconfiguration message). The BWP configuration in system information is typically used in RRC_IDLE/RRC_INACTIVE state. The BWP configuration in dedicated RRC signaling message is typically used in RRC_CONNECTED state.

---

- If SCS of PRACH > 120 KHz (or if SCS of PRACH is 480 KHz or 960 KHz)
    * t_id = slot index within a subframe; one system frame has 10 sub frames. slots in each subframe are indexed sequentially from 0
    * Sub frame number in which PRACH occasion start is included in DCI (of the PDCCH addressed to RA-RNTI) or RAR MAC PDU (scheduled by the PDCCH addressed to RA-RNTI). Sub frames in a system frame are sequentially numbered from 0
- Else (if SCS of PRACH equals 1.25, 5, 15, 30, 60 and 120 KHz)
    * t_id = slot index; Slots in a system frame are indexed sequentially from 0

---

Figure 13A:
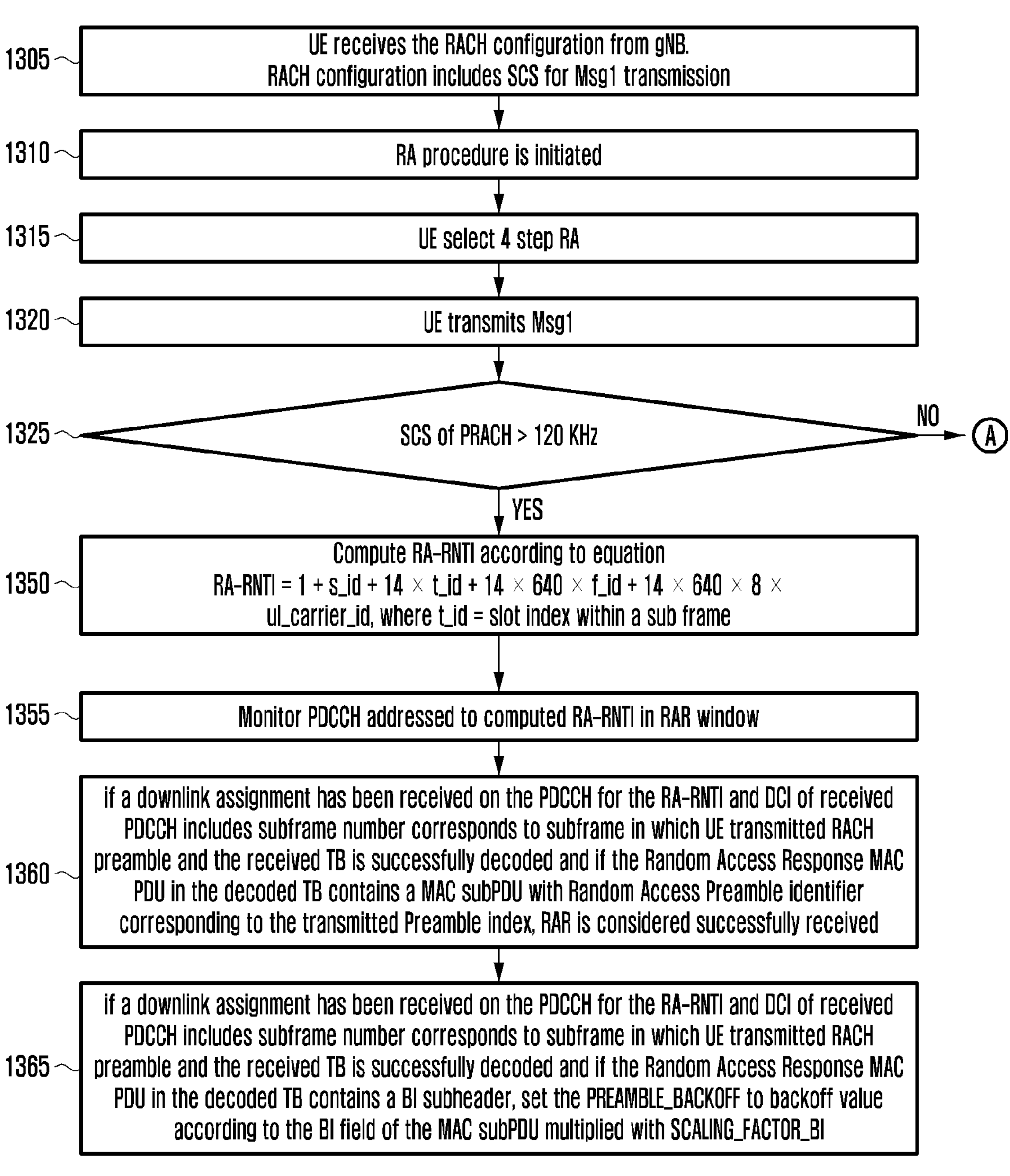
FIG. 13A illustrates another example of identifying random access associated RNTI in according to an embodiment of the disclosure.
Figure 13B:
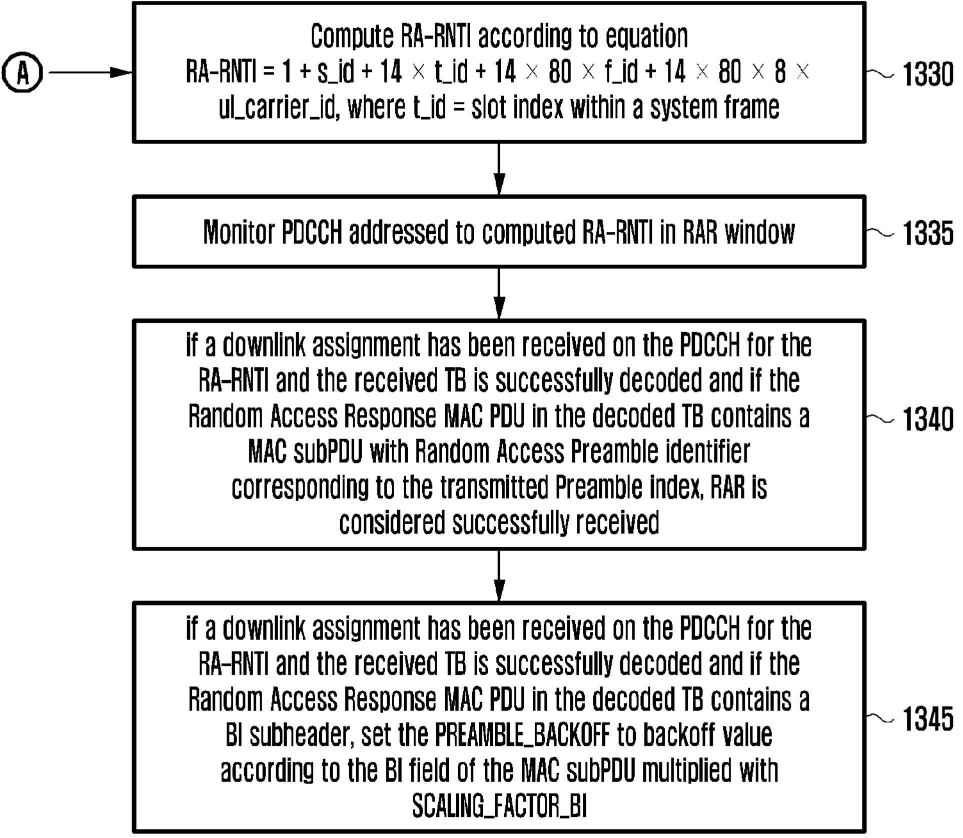
FIG. 13B illustrates another example of identifying random access associated RNTI according to an embodiment of the disclosure.
Figure 14A:
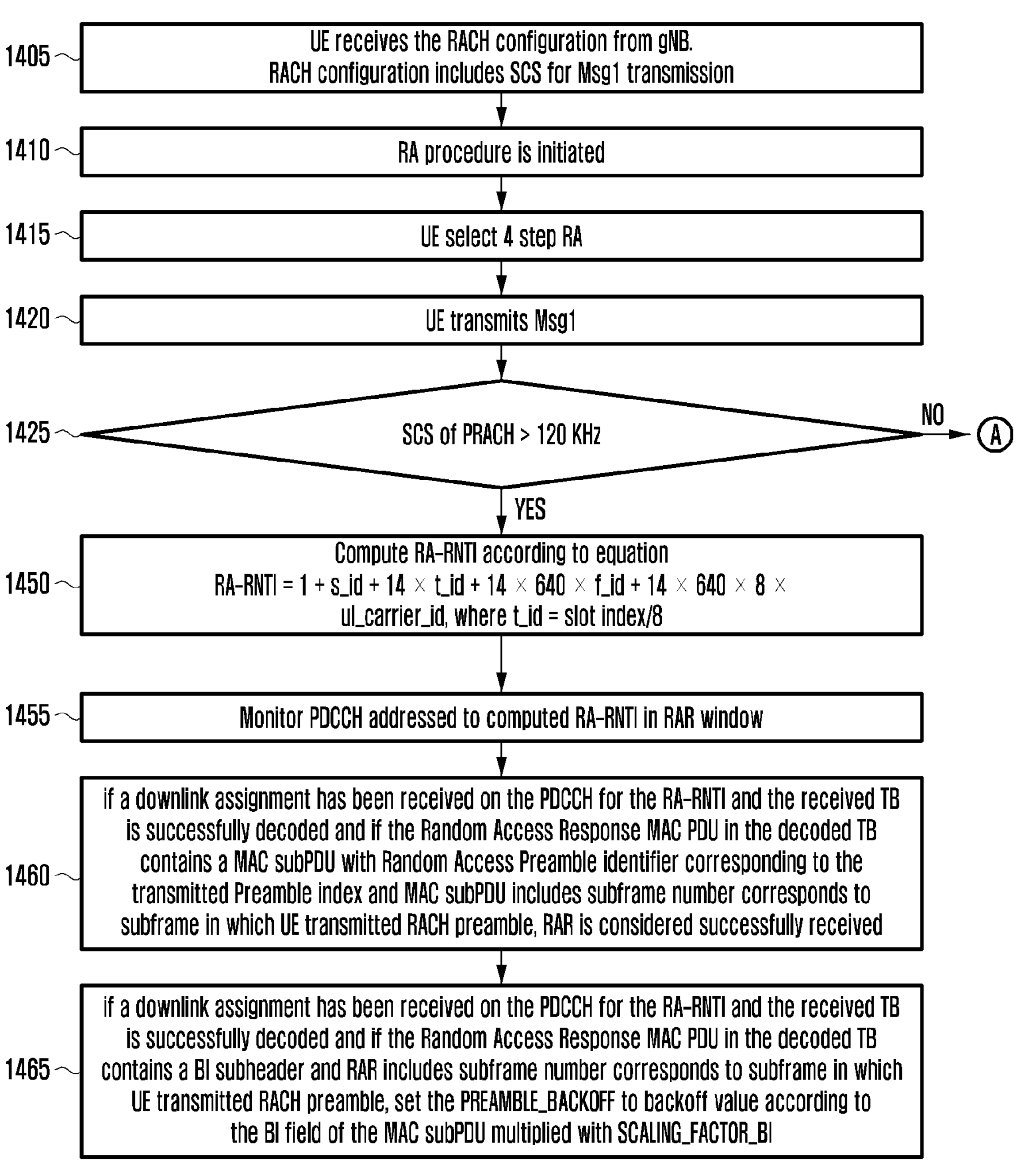
FIG. 14A illustrates another example of identifying random access associated RNTI according to an embodiment of the disclosure.
Figure 14B:
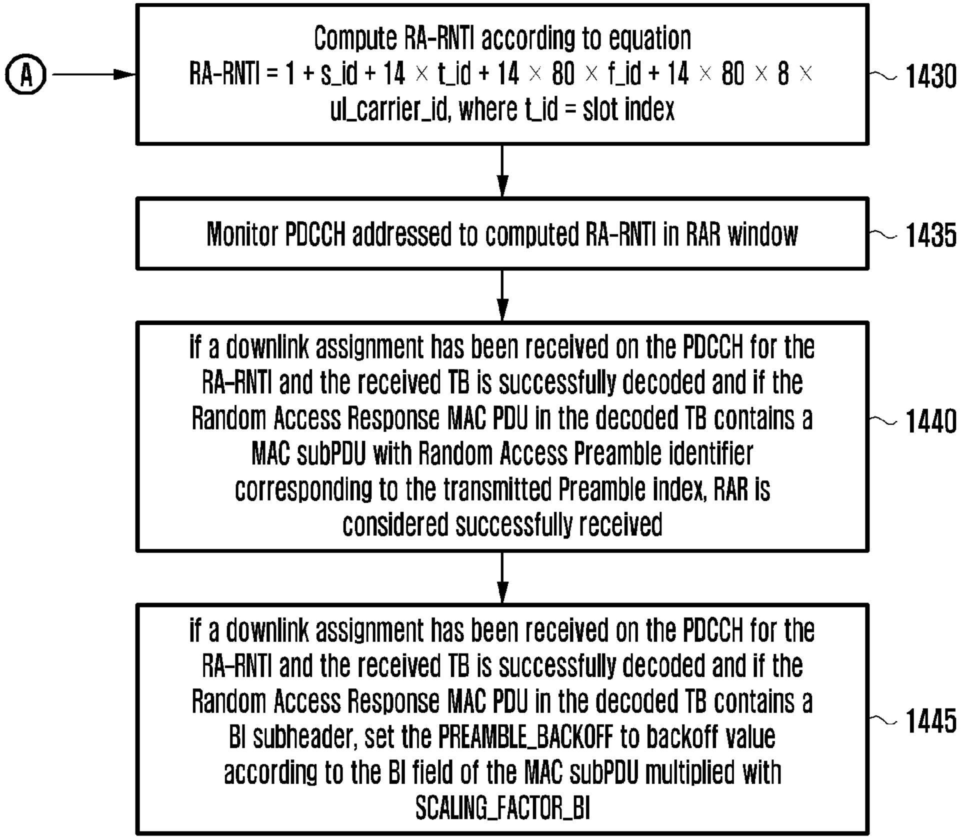
FIG. 14B illustrates another example of identifying random access associated RNTI according to an embodiment of the disclosure.

FIGS. 13A, 13B, 14A, and 14B illustrate examples of identifying random access associated RNTI according to various embodiments of the disclosure. FIGS. 13A and 13B show an embodiment wherein subframe number is included in DCI. FIGS. 14A and 14B shows another embodiment wherein subframe number is included in RAR MAC PDU.

Referring to FIGS. 13A and 13B, the UE receives RACH configuration from the gNB (1305). The RACH configuration includes SCS for Msg1 transmission. If RA procedure is initiated (1310), the UE selects 4step RA (1315) and transmits Msg1 (1320). If SCS of PRACH≤120 kHz (1325), the UE computes RA-RNTI according to RA-RNTI=1+s_id+14*t_id+14*80*f_id+14*80*8*ul_carrier_id, where t_id=slot index within a system frame (1330). Then, the UE monitors the PDCCH addressed to the computed RA-RNTI in RAR window (1335). If a downlink assignment has been received on the PDCCH for the RA-RNTI and the received TB is successfully decoded and if the random access response MAC PDU in the decoded TB contains a MAC subPDU with RAPID corresponding to the transmitted preamble index, RAR is considered successfully received (1340). If a downlink assignment has been received on the PDCCH for the RA-RNTI and the received TB is successfully decoded and if the random access response in the decoded TB contains a BI subheader, the UE sets the PREAMBLE_BACKOFF to backoff value according to the BI field of the MAC subPDU multiplied with SCALING_FACTOR_BI (1345). Or, If SCS of PRACH>120 kHz (1325), the UE computes RA-RNTI according to RA-RNTI=1+s_id+14*t_id+14*640*f_id+14*640*8*ul_carrier_id, where t_id=slot index within a subframe (1350). The UE monitors the PDCCH addressed to the computed RA-RNTI in RAR window (1355). If a downlink assignment has been received on the PDCCH for the RA-RNTI and DCI of the received PDCCH includes subframe number corresponds to a subframe in which the UE transmitted RACH preamble and the received TB is successfully decoded and if the random access response MAC PDU in the decoded TB contains a MAC subPDU with RAPID corresponding to the transmitted preamble index, RAR is considered successfully received (1360). If a downlink assignment has been received on the PDCCH for the RA-RNTI and DCI of the received PDCCH includes subframe number corresponds to a subframe in which the UE transmitted RACH preamble and the received TB is successfully decoded and if the random access response MAC PDU in the decoded TB contains a BI subheader, the UE sets the PREAMBLE_BACKOFF to backoff value according to BI field of the MAC subPDU multiplied with SCALING_FACTOR_BI (1365).

Referring to FIGS. 14A and 14B, the UE receives RACH configuration from the gNB (1405). The RACH configuration includes SCS for Msg1 transmission. If RA procedure is initiated (1410), the UE selects 4step RA (1415) and transmits Msg1 (1420). If SCS of PRACH≤120 kHz (1425), the UE computes RA-RNTI according to RA-RNTI=1+s_id+14*t_id+14*80*f_id+14*80*8*ul_carrier_id, where t_id=slot index (1430). Then, the UE monitors the PDCCH addressed to the computed RA-RNTI in RAR window (1435). If a downlink assignment has been received on the PDCCH for the RA-RNTI and the received TB is successfully decoded and if the random access response MAC PDU in the decoded TB contains a MAC subPDU with RAPID corresponding to the transmitted preamble index, RAR is considered successfully received (1440). If a downlink assignment has been received on the PDCCH for the RA-RNTI and the received TB is successfully decoded and if the random access response MAC PDU in the decoded TB contains a BI subheader, the UE sets the PREAMBLE_BACKOFF to backoff value according to the BI field of the MAC subPDU multiplied with SCALING_FACTOR_BI (1445). Or, If SCS of PRACH>120 kHz (1425), the UE computes RA-RNTI according to RA-RNTI=1+s_id+14*t_id+14*640*f_id+14*640*8*ul_carrier_id, where t_id=slot index/8 (1450). The UE monitors the PDCCH addressed to the computed RA-RNTI in RAR window (1455). If a downlink assignment has been received on the PDCCH for the RA-RNTI and the received TB is successfully decoded and if the random access response MAC PDU in the decoded TB contains a MAC subPDU with RAPID corresponding to the transmitted preamble index and MAC subPDU includes subframe number corresponds to a subframe in which the UE transmitted RACH preamble, RAR is considered successfully received (1460). If a downlink assignment has been received on the PDCCH for the RA-RNTI and the received TB is successfully decoded and if the random access response MAC PDU in the decoded TB contains a BI subheader and RAR includes subframe number corresponds to a subframe in which the UE transmitted RACH preamble, the UE sets the PREAMBLE_BACKOFF to backoff value according to BI field of the MAC subPDU multiplied with SCALING_FACTOR_BI (1465).

Embodiment 14 (Same MsgB-RNTI Equation, Different t_id Indexing, Scheme 3)

In this embodiment of this disclosure for receiving/transmitting MsgB for 2 step RA by UE/gNB, MsgB-RNTI is computed as follows:

MsgB-RNTI=1+*s*_id+14**t*_id+14*80**f*_id+14*80*8*ul_carrier_id+14*80*8*2, where s_id is the index of the first OFDM symbol of the PRACH occasion (0≤s_id<14), f_id is the index of the PRACH occasion in the frequency domain (0 ≤f_id<8), and ul_carrier_id is the UL carrier used for Random Access Preamble transmission (0 for NUL carrier, and 1 for SUL carrier). The PRACH occasion is the one in which the UE has transmitted preamble. For the gNB operation PRACH occasion is the one in which it has received preamble.

- UE/gNB first determine the SCS for PRACH (corresponding to the transmitted/received preamble)
  - SCS for PRACH is signaled by the gNB in the RACH configuration (e.g., the RACH-ConfigCommon for 2 step RA.). The RACH configuration used by the UE is the RACH configuration in the BWP configuration of UL BWP selected for random access procedure. The BWP configuration is signaled by the gNB in system information or in dedicated RRC signaling message (i.e., RRCReconfiguration message). The BWP configuration in system information is typically used in RRC_IDLE/RRC_INACTIVE state. The BWP configuration in dedicated RRC signaling message is typically used in RRC_CONNECTED state.

---

- If SCS of PRACH > 120 KHz (or if SCS of PRACH is 480 KHz or 960 KHz)
  * t_id = slot index within a subframe; one system frame has 10 sub frames. slots in each subframe are indexed sequentially from 0
  * Sub frame number in which PRACH occasion start is included in DCI (of the PDCCH addressed to MsgB-RNTI) or MsgB MAC PDU (scheduled by the PDCCH addressed to MsgB -RNTI). Sub frames in a system frame are sequentially numbered from 0
- Else (if SCS of PRACH equals 1.25, 5, 15, 30, 60 and 120 KHz)
  * t_id = slot index; Slots in a system frame are indexed sequentially from 0

---

Figure 15A:
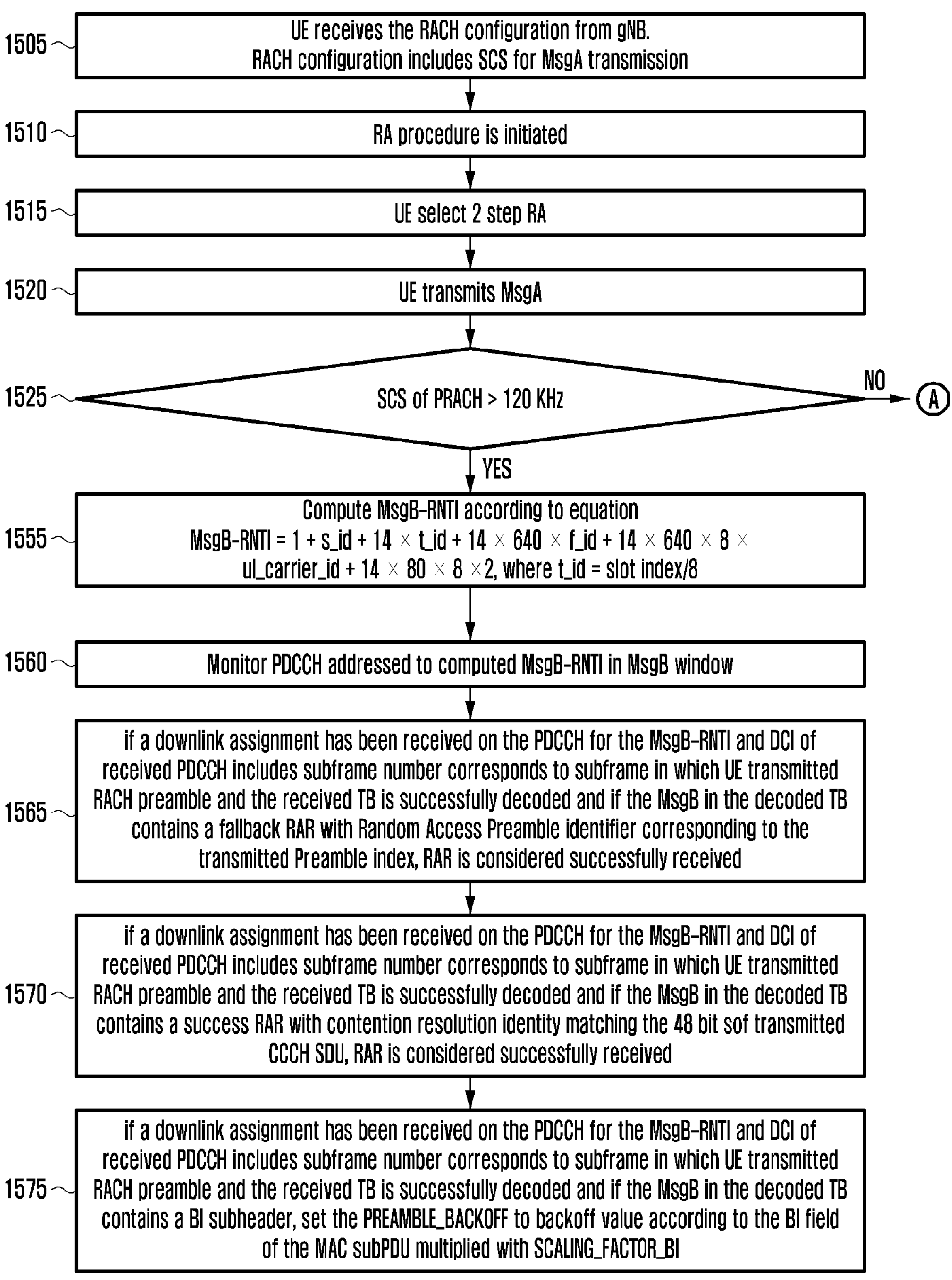
FIG. 15A illustrates another example of identifying random access associated RNTI according to an embodiment of the disclosure.
Figure 15B:
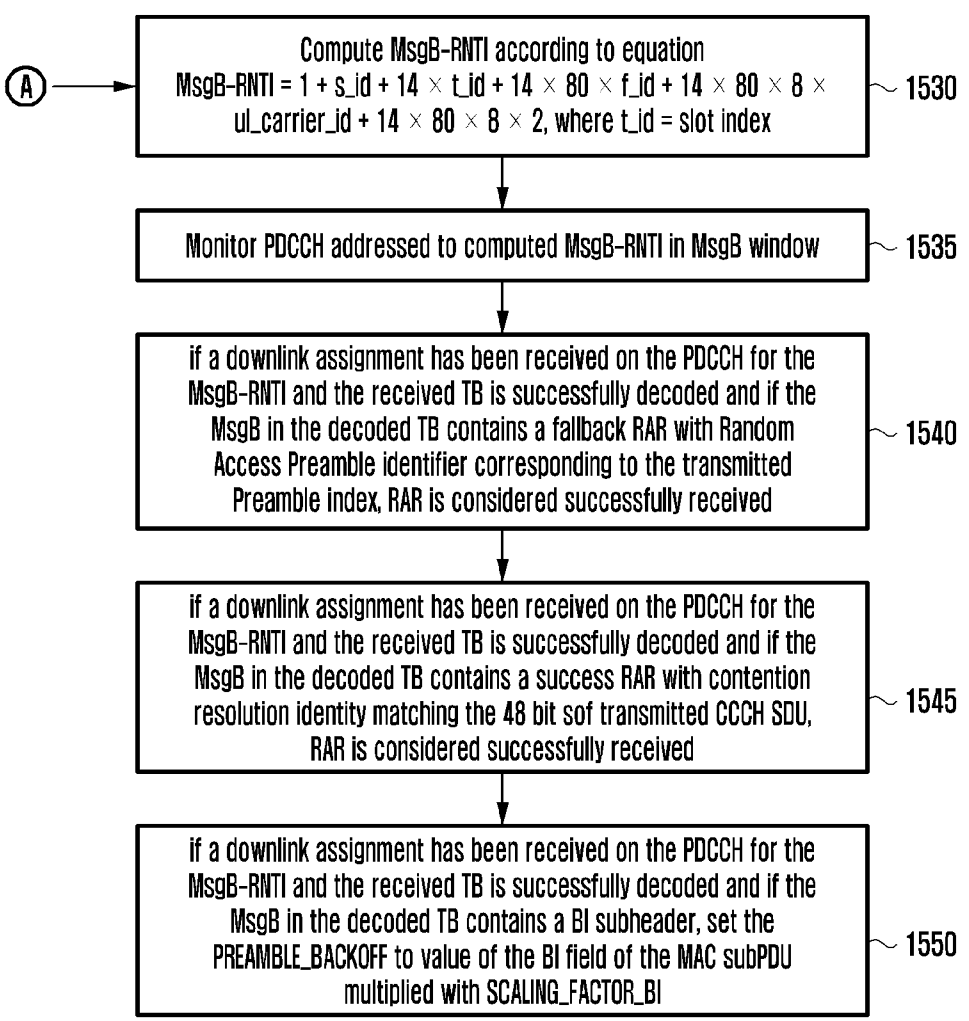
FIG. 15B illustrates another example of identifying random access associated RNTI according to an embodiment of the disclosure.
Figure 16A:
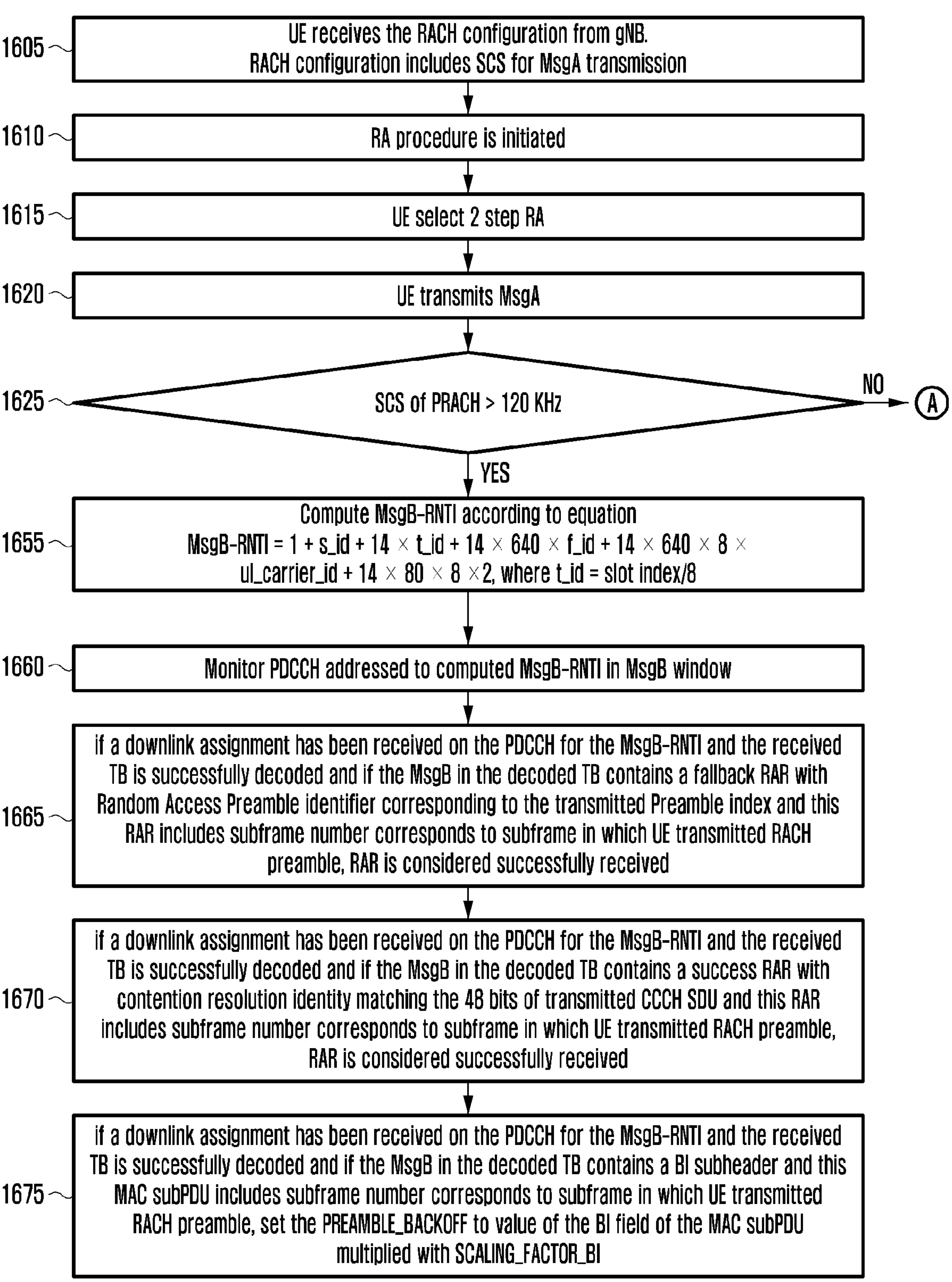
FIG. 16A illustrates another example of identifying random access associated RNTI according to an embodiment of the disclosure.
Figure 16B:
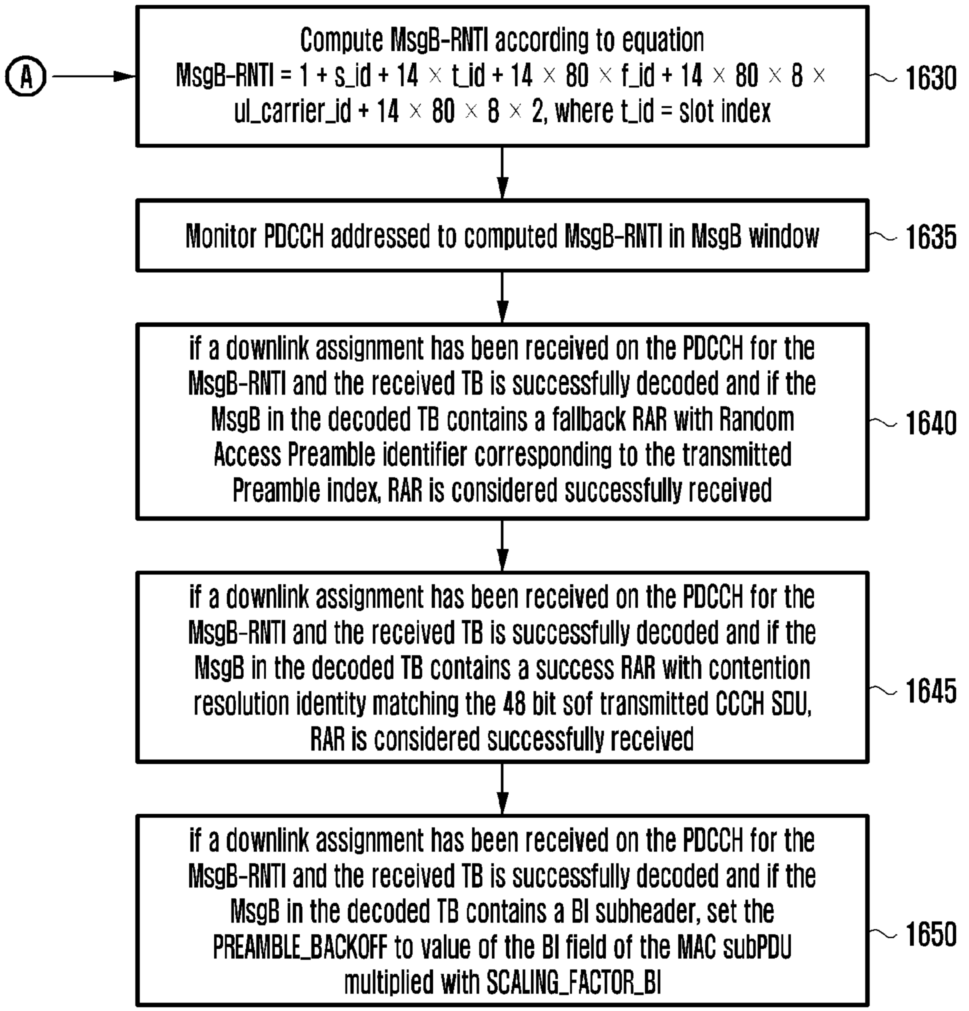
FIG. 16B illustrates another example of identifying random access associated RNTI according to an embodiment of the disclosure.

FIGS. 15A, 15B, 16A, and 16B illustrate examples of identifying random access associated RNTI according to various embodiments of the disclosure. FIGS. 15A and 15B show an embodiment wherein subframe number is included in DCI. FIGS. 16A and 16B show another embodiment wherein subframe number is included in MsgB MAC PDU.

Referring to FIGS. 15A and 15B, the UE receives RACH configuration from the gNB (1505). The RACH configuration includes SCS for MsgA transmission. If RA procedure is initiated (1510), the UE selects 2step RA (1515) and transmits MsgA (1520). If SCS of PRACH≤120 kHz (1525), the UE computes MSGB-RNTI according to MSGB-RNTI=1+s_id+14*t_id+14*80*f_id+14*80*8*ul_carrier_id+14*80*8*2, where t_id=slot index (1530). Then, the UE monitors the PDCCH addressed to the computed MSGB-RNTI in RAR window (1535). If a downlink assignment has been received on the PDCCH for the MSGB-RNTI and the received TB is successfully decoded and if the MSGB in the decoded TB contains a fallback RAR with RAPID corresponding to the transmitted preamble index, RAR is considered successfully received (1540). If a downlink assignment has been received on the PDCCH for the MSGB-RNTI and the received TB is successfully decoded and if the MSGB in the decoded TB contains a success RAR with contention resolution identity matching the 48 bits of transmitted CCCH SDU, RAR is considered successfully received (1545). If a downlink assignment has been received on the PDCCH for the MSGB-RNTI and the received TB is successfully decoded and if the MSGB in the decoded TB contains a BI subheader, the UE sets the PREAMBLE_BACKOFF to value of the BI field of the MAC subPDU multiplied with SCALING_FACTOR_BI (1550). Or, If SCS of PRACH>120 kHz (1525), the UE computes MSGB-RNTI according to MSGB-RNTI=1+s_id+14*t_id+14*640*f_id+14*640*8*ul_carrier_id+14*80*8*2, where t_id=slot index/8 (1555). The UE monitors the PDCCH addressed to the computed MSGB-RNTI in RAR window (1560). If a downlink assignment has been received on the PDCCH for the MSGB-RNTI and DCI of the received PDCCH includes subframe number corresponds to a subframe in which the UE transmitted RACH preamble and the received TB is successfully decoded and if the MSGB in the decoded TB contains a fallback RAR with RAPID corresponding to the transmitted preamble index, RAR is considered successfully received (1565). If a downlink assignment has been received on the PDCCH for the MSGB-RNTI and DCI of the received PDCCH includes subframe number corresponds to a subframe in which the UE transmitted RACH preamble and the received TB is successfully decoded and if the MSGB in the decoded TB contains a success RAR with contention resolution identity matching the 48 bits of transmitted CCCH SDU, RAR is considered successfully received (1570). If a downlink assignment has been received on the PDCCH for the MSGB-RNTI and DCI of the received PDCCH includes subframe number corresponds to a subframe in which UE transmitted RACH preamble and the received TB is successfully decoded and if the MSGB in the decoded TB contains a BI subheader, the UE sets the PREAMBLE_BACKOFF to value of the BI field of the MAC subPDU multiplied with SCALING_FACTOR_BI (1575).

Referring to FIGS. 16A and 16B, the UE receives RACH configuration from the gNB (1605). The RACH configuration includes SCS for MsgA transmission. If RA procedure is initiated (1610), the UE selects 2step RA (1615) and transmits MsgA (1620). If SCS of PRACH≤120 kHz (1625), the UE computes MSGB-RNTI according to MSGB-RNTI=1+s_id+14*t_id+14*80*f_id+14*80*8*ul_carrier_id+14*80*8*2, where t_id=slot index (1630). Then, the UE monitors the PDCCH addressed to the computed MSGB-RNTI in RAR window (1635). If a downlink assignment has been received on the PDCCH for the MSGB-RNTI and the received TB is successfully decoded and if the MSGB in the decoded TB contains a fallback RAR with RAPID corresponding to the transmitted preamble index, RAR is considered successfully received (1640). If a downlink assignment has been received on the PDCCH for the MSGB-RNTI and the received TB is successfully decoded and if the MSGB in the decoded TB contains a success RAR with contention resolution identity matching the 48 bits of transmitted CCCH SDU, RAR is considered successfully received (1645). If a downlink assignment has been received on the PDCCH for the MSGB-RNTI and the received TB is successfully decoded and if the MSGB in the decoded TB contains a BI subheader, the UE sets the PREAMBLE_BACKOFF to value of the BI field of the MAC subPDU multiplied with SCALING_FACTOR_BI (1650). Or, If SCS of PRACH>120 kHz (1625), the UE computes MSGB-RNTI according to MSGB-RNTI=1+s_id+14*t_id+14*640*f_id+14*640*8*ul_carrier_id+14*80*8*2, where t_id=slot index/8 (1655). The UE monitors PDCCH addressed to the computed MSGB-RNTI in RAR window (1660). If a downlink assignment has been received on the PDCCH for the MSGB-RNTI and the received TB is successfully decoded and if the MSGB in the decoded TB contains a fallback RAR with RAPID corresponding to the transmitted preamble index and this RAR includes subframe number corresponds to a subframe in which the UE transmitted RACH preamble, RAR is considered successfully received (1665). If a downlink assignment has been received on the PDCCH for the MSGB-RNTI and the received TB is successfully decoded and if the MSGB in the decoded TB contains a success RAR with contention resolution identity matching the 48 bits of transmitted CCCH SDU and this RAR includes subframe number corresponds to a subframe in which the UE transmitted RACH preamble, RAR is considered successfully received (1670). If a downlink assignment has been received on the PDCCH for the MSGB-RNTI and the received TB is successfully decoded and if the MSGB in the decoded TB contains a BI subheader and this MAC subPDU includes subframe number corresponds to a subframe in which the UE transmitted RACH preamble, the UE sets the PREAMBLE_BACKOFF to value of the BI field of the MAC subPDU multiplied with SCALING_FACTOR_BI (1675).

Embodiment 15 (Three RA-RNTIs, Scheme 2)

In this embodiment, number of frequency division multiplexed (FDMed) RACH occasions for 480 KHz and 960 KHz are limited to 2 and 1 respectively.

---

- If SCS of PRACH in PRACH configuration of 4 step RA is set to 960 KHz,
    * gnB shall set the parameter msg1-FDM to 1
- else If SCS of PRACH in PRACH configuration of 4 step RA is set to 480 KHz
    * gnB shall set the parameter msg1-FDM to one of 1, 2
- Else If SCS of PRACH in PRACH configuration of 4 step RA is set to
one of 1.25, 5, 15, 30, 60 and 120 KHz
    * gnB shall set the parameter msg1-FDM to one of 1, 2, 4, 8
- If SCS of PRACH in PRACH configuration of 2 step RA is set to 960 KHz,
    * gnB shall set the parameter msgA-RO-FDM to 1
- else If SCS of PRACH in PRACH configuration of 2 step RA is set to 480 KHz
    * gnB shall set the parameter msgA-RO-FDM to one of 1, 2
- Else If SCS of PRACH in PRACH configuration of 2 step RA is set to
one of 1.25, 5, 15, 30, 60 and 120 KHz
    * gnB shall set the parameter msgA-RO-FDM to one of 1, 2, 4, 8

---

The parameter msg1-FDM is the number of PRACH transmission occasions FDMed in one-time instance. The parameter msgA-RO-FDM is the number of msgA PRACH transmission occasions Frequency-Division Multiplexed in one-time instance In this embodiment of this disclosure for receiving/transmitting RAR for 4 step RA by UE/gNB, three RA-RNTIs are defined, first RA-RNTI, second RA-RNTI and third RA-RNTI, wherein the first RA-RNTI, second RA-RNTI and third RA-RNTI are computed as follows:

First RA-RNTI=1+*s*_id+14**t*_id+14*80**f*_id+14*80*8*ul_carrier_id, where s_id is the index of the first OFDM symbol of the PRACH occasion (0≤s_id<14), t_id is the index of the first slot of the PRACH occasion in a system frame (0≤t_id<80), f_id is the index of the PRACH occasion in the frequency domain (0≤f_id<8), and ul_carrier_id is the UL carrier used for Random Access Preamble transmission (0 for NUL carrier, and 1 for SUL carrier). Slots in a system frame are indexed sequentially starting from zero. The PRACH occasion is the one in which the UE has transmitted preamble. For the gNB operation PRACH occasion is the one in which it has received preamble.

Second RA-RNTI=1+*s*_id+14**t*_id+14*320**f*_id+14*320*2*ul_carrier_id, where s_id is the index of the first OFDM symbol of the PRACH occasion (0≤s_id<14), t_id is the index of the first slot of the PRACH occasion in a system frame (0≤t_id<320), f_id is the index of the PRACH occasion in the frequency domain (0≤f_id<2), and ul_carrier_id is the UL carrier used for Random Access Preamble transmission (0 for NUL carrier, and 1 for SUL carrier). Slots in a system frame are indexed sequentially starting from zero. The PRACH occasion is the one in which the UE has transmitted preamble. For the gNB operation PRACH occasion is the one in which it has received preamble.

Third RA-RNTI=1+*s*_id+14**t*_id+14*640**f*_id+14*640*1*ul_carrier_id, where s_id is the index of the first OFDM symbol of the PRACH occasion (0≤s_id<14), t_id is the index of the first slot of the PRACH occasion in a system frame (0≤t_id<640), f_id is the index of the PRACH occasion in the frequency domain (0≤f_id<1), and ul_carrier_id is the UL carrier used for Random Access Preamble transmission (0 for NUL carrier, and 1 for SUL carrier). Slots in a system frame are indexed sequentially starting from zero. The PRACH occasion is the one in which the UE has transmitted preamble. For the gNB operation PRACH occasion is the one in which it has received preamble.

UE/gNB selects between the first RA-RNTI, second RA-RNTI and third RA-RNTI as follows:

UE/gNB first determine the SCS for PRACH (corresponding to the transmitted/received preamble)

SCS for PRACH is signaled by the gNB in the RACH configuration (e.g., the RACH-ConfigCommon for 4 step RA.). The RACH configuration used by the UE is the RACH configuration in the BWP configuration of UL BWP selected for random access procedure. The BWP configuration is signaled by the gNB in system information or in dedicated RRC signaling message (i.e., RRCReconfiguration message). The BWP configuration in system information is typically used in RRC_IDLE/RRC_INACTIVE state. The BWP configuration in dedicated RRC signaling message is typically used in RRC_CONNECTED state.

---

- If SCS of PRACH = 480 KHz
    * UE/gNB uses second RA-RNTI for RAR reception/transmission
- Else If SCS of PRACH = 960 KHz
    * UE/gNB uses third RA-RNTI for RAR reception/transmission
- Else (if SCS of PRACH equals 1.25, 5, 15, 30, 60 and 120 KHz)
    * UE/gNB uses first RA-RNTI for RAR reception/transmission
(Alternate)
- RA-RNTI = 1 + s__id + 14 * t__id + 14 * A1 * f__id + 14 * A1 * A2 *
ul__carrier__id,

--- where s_id is the index of the first OFDM symbol of the PRACH occasion (0≤s_id<14), A1 is equal to 80 (first value), 320 (second value) and 640 (third value), A2 is equal to 1 or 2 or 8, t_id is the index of the first slot of the PRACH occasion in a system frame (0≤t_id<A1), f_id is the index of the PRACH occasion in the frequency domain (0≤f_id<A2), and ul_carrier_id is the UL carrier used for Random Access Preamble transmission (0 for NUL carrier, and 1 for SUL carrier). Slots in a system frame are indexed sequentially starting from zero. The PRACH occasion is the one in which the UE has transmitted preamble. For the gNB operation PRACH occasion is the one in which it has received preamble.

UE/gNB selects between the first value, second value and third value of A1 and A2 as follows:

- UE/gNB first determine the SCS for PRACH (corresponding to the transmitted/received preamble)
  - SCS for PRACH is signaled by the gNB in the RACH configuration (e.g., the RACH-ConfigCommon for 4 step RA.). The RACH configuration used by the UE is the RACH configuration in the BWP configuration of UL BWP selected for random access procedure. The BWP configuration is signaled by the gNB in system information or in dedicated RRC signaling message (i.e., RRCReconfiguration message). The BWP configuration in system information is typically used in RRC_IDLE/RRC_INACTIVE state. The BWP configuration in dedicated RRC signaling message is typically used in RRC_CONNECTED state.

```
- If SCS of PRACH = 480 KHz
    * UE/gNB uses second value of A1 and A2 i.e., A1 = 320, A2 = 2;
for RA-RNTI for RAR reception/transmission
  - Else If SCS of PRACH = 960 KHz
    * UE/gNB uses third value of A1 and A2 i.e., A1 = 640, A2 = 1;
for RA-RNTI for RAR reception/transmission
  - Else (if SCS of PRACH equals 1.25, 5, 15, 30, 60 and 120 KHz)
    * UE/gNB uses first value of A1 and A2 i.e., A1 = 80, A2 = 8; for
RA-RNTI for RAR reception/transmission
```

Note that for PRACH SCS of 1.25 and 5 KHz, number of slots in system frame are determined according to SCS of 15 KHz ($2^u$×15, where u=0). For SCS of 15 KHz ($2^u$×15, where u=0), there are 10 slots in a system frame. For SCS of 30 KHz ($2^u$×15, where u=1), there are 20 slots in a system frame. For SCS of 60 KHz ($2^u$×15, where u=2), there are 40 slots in a system frame. For SCS of 120 KHz ($2^u$×15, where u=3), there are 80 slots in a system frame. For SCS of 480 KHz ($2^u$×15, where u=5), there are 320 slots in a system frame. For SCS of 960 KHz ($2^u$×15, where u=6), there are 640 slots in a system frame.

Embodiment 16 (Three MsgB-RNTIs, Scheme 2)

In this embodiment, number of FDMed RACH occasions for 480 KHz and 960 KHz are limited to 2 and 1 respectively.

```
- If SCS of PRACH in PRACH configuration of 4 step RA is set to 960
KHz,
    * gnB shall set the parameter msg1-FDM to 1
  - else If SCS of PRACH in PRACH configuration of 4 step RA is set to
480 KHz
    * gnB shall set the parameter msg1-FDM to one of 1, 2
  - Else If SCS of PRACH in PRACH configuration of 4 step RA is set
to
one of 1.25, 5, 15, 30, 60 and 120 KHz
    * gnB shall set the parameter msg1-FDM to one of 1, 2, 4, 8
```

-continued

```
- If SCS of PRACH in PRACH configuration of 2 step RA is set to 960
KHz,
    * gnB shall set the parameter msgA-RO-FDM to 1
  - else If SCS of PRACH in PRACH configuration of 2 step RA is set to
480 KHz
    * gnB shall set the parameter msgA-RO-FDM to one of 1, 2
  - Else If SCS of PRACH in PRACH configuration of 2 step RA is set
to
one of 1.25, 5, 15, 30, 60 and 120 KHz
    * gnB shall set the parameter msgA-RO-FDM to one of 1, 2, 4, 8
```

The parameter msg1-FDM is the number of PRACH transmission occasions FDMed in one-time instance. The parameter msgA-RO-FDM is the number of msgA PRACH transmission occasions Frequency-Division Multiplexed in one-time instance In this embodiment of this disclosure for receiving/transmitting MsgB for 2 step RA by UE/gNB, three MsgB-RNTIs are defined, first MsgB-RNTI, second MsgB-RNTI and third MsgB-RNTI, wherein the first MsgB-RNTI, second MsgB-RNTI and third MsgB-RNTI are computed as follows:

First MsgB-RNTI=1+*s*_id+14**t*_id+14*80**f*_id+14*80*8*ul_carrier_id+14*80*8*2, where s_id is the index of the first OFDM symbol of the PRACH occasion (0≤s_id<14), t_id is the index of the first slot of the PRACH occasion in a system frame (0≤t_id<80), f_id is the index of the PRACH occasion in the frequency domain (0≤f_id<8), and ul_carrier_id is the UL carrier used for Random Access Preamble transmission (0 for NUL carrier, and 1 for SUL carrier). Slots in a system frame are indexed sequentially starting from zero. The PRACH occasion is the one in which the UE has transmitted preamble. For the gNB operation PRACH occasion is the one in which it has received preamble.

Second MsgB-RNTI=1+*s*_id+14**t*_id+14*320**f*_id+14*320*2*ul_carrier_id+14*320*2*2, where s_id is the index of the first OFDM symbol of the PRACH occasion (0≤s_id<14), t_id is the index of the first slot of the PRACH occasion in a system frame (0≤t_id<320), f_id is the index of the PRACH occasion in the frequency domain (0≤f_id<2), and ul_carrier_id is the UL carrier used for Random Access Preamble transmission (0 for NUL carrier, and 1 for SUL carrier). Slots in a system frame are indexed sequentially starting from zero. The PRACH occasion is the one in which the UE has transmitted preamble. For the gNB operation PRACH occasion is the one in which it has received preamble.

Third MsgB-RNTI=1+*s*_id+14**t*_id+14*640**f*_id+14*640*1*ul_carrier_id+14*640*1*2, where s_id is the index of the first OFDM symbol of the PRACH occasion (0≤s_id<14), t_id is the index of the first slot of the PRACH occasion in a system frame (0≤t_id<640), f_id is the index of the PRACH occasion in the frequency domain (0≤f_id<1), and ul_carrier_id is the UL carrier used for Random Access Preamble transmission (0 for NUL carrier, and 1 for SUL carrier). Slots in a system frame are indexed sequentially starting from zero. The PRACH occasion is the one in which the UE has transmitted preamble. For the gNB operation PRACH occasion is the one in which it has received preamble.

UE/gNB selects between the first MsgB-RNTI, second MsgB-RNTI and third MsgB-RNTI as follows:

UE/gNB first determine the SCS for PRACH (corresponding to the transmitted/received preamble)

SCS for PRACH is signaled by the gNB in the RACH configuration (e.g., the RACH-ConfigCommon for 2 step RA.). The RACH configuration used by the UE is the RACH configuration in the BWP configuration of UL BWP selected for random access procedure. The BWP configuration is signaled by the gNB in system information or in dedicated RRC signaling message (i.e., RRCReconfiguration message). The BWP configuration in system information is typically used in RRC_IDLE/RRC_INACTIVE state. The BWP configuration in dedicated RRC signaling message is typically used in RRC_CONNECTED state.

```
- If SCS of PRACH = 480 KHz
    * UE/gNB uses second MsgB-RNTI for MsgB
reception/transmission
- Else If SCS of PRACH = 960 KHz
    * UE/gNB uses third MsgB-RNTI for MsgB
reception/transmission
- Else (if SCS of PRACH equals 1.25, 5, 15, 30, 60 and 120 KHz)
    * UE/gNB uses first MsgB-RNTI for MsgB
reception/transmission
(Alternate)
- MSGB-RNTI = 1 + s_id + 14 * t_id + 14 * A1 * f_id + 14 * A1 *
A2 * ul_carrier_id + 14 * A1 * A2 * 2,
```

where s_id is the index of the first OFDM symbol of the PRACH occasion (0≤s_id<14), A1 is equal to 80 (first value), 320 (second value) and 640 (third value), A2 is equal to 1 or 2 or 8, t_id is the index of the first slot of the PRACH occasion in a system frame (0≤t_id<A1), f_id is the index of the PRACH occasion in the frequency domain (0≤f_id<A2), and ul_carrier_id is the UL carrier used for Random Access Preamble transmission (0 for NUL carrier, and 1 for SUL carrier). Slots in a system frame are indexed sequentially starting from zero. The PRACH occasion is the one in which the UE has transmitted preamble. For the gNB operation PRACH occasion is the one in which it has received preamble.

UE/gNB selects between the first value, second value and third value of A1 and A2 as follows:

UE/gNB first determine the SCS for PRACH (corresponding to the transmitted/received preamble)

SCS for PRACH is signaled by the gNB in the RACH configuration (e.g., the RACH-ConfigCommon for 4 step RA.). The RACH configuration used by the UE is the RACH configuration in the BWP configuration of UL BWP selected for random access procedure. The BWP configuration is signaled by the gNB in system information or in dedicated RRC signaling message (i.e., RRCReconfiguration message). The BWP configuration in system information is typically used in RRC_IDLE/RRC_INACTIVE state. The BWP configuration in dedicated RRC signaling message is typically used in RRC_CONNECTED state.

```
- If SCS of PRACH = 480 KHz
    * UE/gNB uses second value of A1 and A2 i.e., A1 = 320, A2 = 2;
for MsgB-RNTI for MsgB reception/transmission
- Else If SCS of PRACH = 960 KHz
    * UE/gNB uses third value of A1 and A2 i.e., A1 = 640, A2 = 1;
for MsgB -RNTI for MsgB reception/transmission
```

-continued

```
- Else (if SCS of PRACH equals 1.25, 5, 15, 30, 60 and 120 KHz)
    * UE/gNB uses first value of A1 and A2 i.e., A1 = 80, A2 = 8; for
MsgB -RNTI for MsgB reception/transmission
```

Note that for PRACH SCS of 1.25 and 5 KHz, number of slots in system frame are determined according to SCS of 15 KHz ($2^u$×15, where u=0). For SCS of 15 KHz ($2^u$×15, where u=0), there are 10 slots in a system frame. For SCS of 30 KHz ($2^u$×15, where u=1), there are 20 slots in a system frame. For SCS of 60 KHz ($2^u$×15, where u=2), there are 40 slots in a system frame. For SCS of 120 KHz ($2^u$×15, where u=3), there are 80 slots in a system frame. For SCS of 480 KHz ($2^u$×15, where u=5), there are 320 slots in a system frame. For SCS of 960 KHz ($2^u$×15, where u=6), there are 640 slots in a system frame.

Embodiment 17 (Two RA-RNTIs, Scheme 2)

In this embodiment, number of FDMed RACH occasions for 480 KHz and 960 KHz are limited to 1.

```
- If SCS of PRACH in PRACH configuration of 4 step RA is set to one
of 480 KHz and 960 KHz,
    * gnB shall set the parameter msg1-FDM to 1
- Else If SCS of PRACH in PRACH configuration of 4 step RA is set
to
one of 1.25, 5, 15, 30, 60 and 120 KHz
    * gnB shall set the parameter msg1-FDM to one of 1, 2, 4, 8
- If SCS of PRACH in PRACH configuration of 2 step RA is set to one
of 480 KHz and 960 KHz,
    * gnB shall set the parameter msgA-RO-FDM to 1
- Else If SCS of PRACH in PRACH configuration of 2 step RA is set
to
one of 1.25, 5, 15, 30, 60 and 120 KHz
    * gnB shall set the parameter msgA-RO-FDM to one of 1, 2, 4, 8
```

The parameter msg1-FDM is the number of PRACH transmission occasions FDMed in one-time instance. The parameter msgA-RO-FDM is the number of msgA PRACH transmission occasions Frequency-Division Multiplexed in one-time instance In this embodiment of this disclosure for receiving/transmitting RAR for 4 step RA by UE/gNB, two RA-RNTIs are defined, first RA-RNTI and second RA-RNTI are computed as follows:

First RA-RNTI=1+$s$_id+14*$t$_id+14*80*$f$_id+14*80*8*ul_carrier_id, where s_id is the index of the first OFDM symbol of the PRACH occasion (0≤s_id<14), t_id is the index of the first slot of the PRACH occasion in a system frame (0≤t_id<80), f_id is the index of the PRACH occasion in the frequency domain (0≤f_id<8), and ul_carrier_id is the UL carrier used for Random Access Preamble transmission (0 for NUL carrier, and 1 for SUL carrier). Slots in a system frame are indexed sequentially starting from zero. The PRACH occasion is the one in which the UE has transmitted preamble. For the gNB operation PRACH occasion is the one in which it has received preamble.

Second RA-RNTI=1+$s$_id+14*$t$_id+14*640*$f$_id+14*640*1*ul_carrier_id, where s_id is the index of the first OFDM symbol of the PRACH occasion (0≤s_id<14), t_id is the index of the first slot of the PRACH occasion in a system frame (0≤t_id<640), f_id is the index of the PRACH occasion in the frequency domain (0≤f_id<1), and ul_carrier_id is the UL carrier used for Random Access Preamble transmission (0 for NUL carrier, and 1 for SUL carrier). Slots in a system frame are indexed sequentially starting from zero. The PRACH occasion is the one in which the UE has transmitted preamble. For the gNB operation PRACH occasion is the one in which it has received preamble.

UE/gNB selects between the first RA-RNTI and second RA-RNTI as follows:

UE/gNB first determine the SCS for PRACH (corresponding to the transmitted/received preamble)

SCS for PRACH is signaled by the gNB in the RACH configuration (e.g., the RACH-ConfigCommon for 4 step RA.). The RACH configuration used by the UE is the RACH configuration in the BWP configuration of UL BWP selected for random access procedure. The BWP configuration is signaled by the gNB in system information or in dedicated RRC signaling message (i.e., RRCReconfiguration message). The BWP configuration in system information is typically used in RRC_IDLE/RRC_INACTIVE state. The BWP configuration in dedicated RRC signaling message is typically used in RRC_CONNECTED state.

```
- If SCS of PRACH > 120 KHz (or if SCS of PRACH is 480 KHz or 960 KHz)
    * UE/gNB uses second RA-RNTI for RAR reception/transmission
- Else (if SCS of PRACH equals 1.25, 5, 15, 30, 60 and 120 KHz)
    * UE/gNB uses first RA-RNTI for RAR reception/transmission
```

(Alternate)

$$RA\text{-}RNTI=1+s\_id+14*t\_id+14*A1*f\_id+14*A1*A2*ul\_carrier\_id,$$

where s_id is the index of the first OFDM symbol of the PRACH occasion (0≤s_id<14), A1 is equal to 80 (first value) and 640 (third value), A2 is equal to 1 or 8, t_id is the index of the first slot of the PRACH occasion in a system frame (0≤t_id<A1), f_id is the index of the PRACH occasion in the frequency domain (0≤f_id<A2), and ul_carrier_id is the UL carrier used for Random Access Preamble transmission (0 for NUL carrier, and 1 for SUL carrier). Slots in a system frame are indexed sequentially starting from zero. The PRACH occasion is the one in which the UE has transmitted preamble. For the gNB operation PRACH occasion is the one in which it has received preamble.

UE/gNB selects between the first value and second value of A1 and A2 as follows:

UE/gNB first determine the SCS for PRACH (corresponding to the transmitted/received preamble)

SCS for PRACH is signaled by the gNB in the RACH configuration (e.g., the RACH-ConfigCommon for 4 step RA.). The RACH configuration used by the UE is the RACH configuration in the BWP configuration of UL BWP selected for random access procedure. The BWP configuration is signaled by the gNB in system information or in dedicated RRC signaling message (i.e., RRCReconfiguration message). The BWP configuration in system information is typically used in RRC_IDLE/RRC_INACTIVE state. The BWP configuration in dedicated RRC signaling message is typically used in RRC_CONNECTED state.

```
- If SCS of PRACH > 120 KHz (or if SCS of PRACH is 480 KHz or 960 KHz)
    * UE/gNB uses second value of A1 and A2 i.e., A1 = 640, A2 = 1; for RA-RNTI for RAR reception/transmission
- Else (if SCS of PRACH equals 1.25, 5, 15, 30, 60 and 120 KHz)
    * UE/gNB uses first value of A1 and A2 i.e., A1 = 80, A2 = 8; for RA-RNTI for RAR reception/transmission
```

Note that for PRACH SCS of 1.25 and 5 KHz, number of slots in system frame are determined according to SCS of 15 KHz ($2^u$×15, where u=0). For SCS of 15 KHz ($2^u$×15, where u=0), there are 10 slots in a system frame. For SCS of 30 KHz ($2^u$×15, where u=1), there are 20 slots in a system frame. For SCS of 60 KHz ($2^u$×15, where u=2), there are 40 slots in a system frame. For SCS of 120 KHz ($2^u$×15, where u=3), there are 80 slots in a system frame. For SCS of 480 KHz ($2^u$×15, where u=5), there are 320 slots in a system frame. For SCS of 960 KHz ($2^u$×15, where u=6), there are 640 slots in a system frame.

Embodiment 18 (Two MsgB-RNTIs, Scheme 2)

In this embodiment, number of FDMed RACH occasions for 480 KHz and 960 KHz are limited to 1.

```
- If SCS of PRACH in PRACH configuration of 4 step RA is set to one of 480 KHz and 960 KHz,
    * gnB shall set the parameter msg1-FDM to 1
- Else If SCS of PRACH in PRACH configuration of 4 step RA is set to
one of 1.25, 5, 15, 30, 60 and 120 KHz
    * gnB shall set the parameter msg1-FDM to one of 1, 2, 4, 8
- If SCS of PRACH in PRACH configuration of 2 step RA is set to one of 480 KHz and 960 KHz,
    * gnB shall set the parameter msgA-RO-FDM to 1
- Else If SCS of PRACH in PRACH configuration of 2 step RA is set to
one of 1.25, 5, 15, 30, 60 and 120 KHz
    * gnB shall set the parameter msgA-RO-FDM to one of 1, 2, 4, 8
```

The parameter msg1-FDM is the number of PRACH transmission occasions FDMed in one-time instance. The parameter msgA-RO-FDM is the number of msgA PRACH transmission occasions Frequency-Division Multiplexed in one-time instance In this embodiment of this disclosure for receiving/transmitting MsgB for 2 step RA by UE/gNB, two MsgB-RNTIs are defined, first MsgB-RNTI and second MsgB-RNTI, wherein the first MsgB-RNTI, second MsgB-RNTI are computed as follows:

$$\text{First MsgB-RNTI}=1+s\_id+14*t\_id+14*80*f\_id+14*80*8*ul\_carrier\_id+14*80*8*2,$$

where s_id is the index of the first OFDM symbol of the PRACH occasion (0≤s_id<14), t_id is the index of the first slot of the PRACH occasion in a system frame (0≤t_id<80), f_id is the index of the PRACH occasion in the frequency domain (0≤f_id<8), and ul_carrier_id is the UL carrier used for Random Access Preamble transmission (0 for NUL carrier, and 1 for SUL carrier). Slots in a system frame are indexed sequentially starting from zero. The PRACH occasion is the one in which the UE has transmitted preamble. For the gNB operation PRACH occasion is the one in which it has received preamble.

$$\text{Second MsgB-RNTI}=1+s\_id+14*t\_id+14*640*f\_id+14*640*1*ul\_carrier\_id+14*640*1*2,$$

where s_id is the index of the first OFDM symbol of the PRACH occasion (0≤s_id<14), t_id is the index of the first slot of the PRACH occasion in a system frame (0≤t_id<640), f_id is the index of the PRACH occasion in the frequency domain (0≤f_id<1), and ul_carrier_id is the UL carrier used for Random Access Preamble transmission (0 for NUL carrier, and 1 for SUL carrier). Slots in a system frame are indexed sequentially starting from zero. The PRACH occasion is the one in which the UE has transmitted preamble. For the gNB operation PRACH occasion is the one in which it has received preamble.

UE/gNB selects between the first MsgB-RNTI, second MsgB-RNTI as follows:

- UE/gNB first determine the SCS for PRACH (corresponding to the transmitted/received preamble)
  - SCS for PRACH is signaled by the gNB in the RACH configuration (e.g., the RACH-ConfigCommon for 2 step RA.). The RACH configuration used by the UE is the RACH configuration in the BWP configuration of UL BWP selected for random access procedure. The BWP configuration is signaled by the gNB in system information or in dedicated RRC signaling message (i.e., RRCReconfiguration message). The BWP configuration in system information is typically used in RRC_IDLE/RRC_INACTIVE state. The BWP configuration in dedicated RRC signaling message is typically used in RRC_CONNECTED state.

```
- If SCS of PRACH > 120 KHz (or if SCS of PRACH is 480 KHz or 960 KHz)
    * UE/gNB uses second MsgB-RNTI for MsgB reception/transmission
- Else (if SCS of PRACH equals 1.25, 5, 15, 30, 60 and 120 KHz)
    * UE/gNB uses first MsgB-RNTI for MsgB reception/transmission
```

(Alternate)

$$MSGB\text{-}RNTI=1+s\_id+14*t\_id+14*A1*f\_id+14*A1*A2*ul\_carrier\_id+14*A1*A2*2,$$

where s_id is the index of the first OFDM symbol of the PRACH occasion (0≤s_id<14), A1 is equal to 80 (first value) and 640 (third value), A2 is equal to 1 or 8, t_id is the index of the first slot of the PRACH occasion in a system frame (0≤t_id<A1), f_id is the index of the PRACH occasion in the frequency domain (0≤f_id<A2), and ul_carrier_id is the UL carrier used for Random Access Preamble transmission (0 for NUL carrier, and 1 for SUL carrier). Slots in a system frame are indexed sequentially starting from zero. The PRACH occasion is the one in which the UE has transmitted preamble. For the gNB operation PRACH occasion is the one in which it has received preamble.

UE/gNB selects between the first value, second value of A1 and A2 as follows:

- UE/gNB first determine the SCS for PRACH (corresponding to the transmitted/received preamble)
  - SCS for PRACH is signaled by the gNB in the RACH configuration (e.g., the RACH-ConfigCommon for 4 step RA.). The RACH configuration used by the UE is the RACH configuration in the BWP configuration of UL BWP selected for random access procedure. The BWP configuration is signaled by the gNB in system information or in dedicated RRC signaling message (i.e., RRCReconfiguration message). The BWP configuration in system information is typically used in RRC_IDLE/RRC_INACTIVE state. The BWP configuration in dedicated RRC signaling message is typically used in RRC_CONNECTED state.

```
- If SCS of PRACH > 120 KHz (or if SCS of PRACH is 480 KHz or 960 KHz)
    * UE/gNB uses second value of A1 and A2 i.e., A1 = 640, A2 = 1; for MsgB-RNTI for MsgB reception/transmission
- Else (if SCS of PRACH equals 1.25, 5, 15, 30, 60 and 120 KHz)
    * UE/gNB uses first value of A1 and A2 i.e., A1 = 80, A2 = 1; for MsgB -RNTI for MsgB reception/transmission
```

Note that for PRACH SCS of 1.25 and 5 KHz, number of slots in system frame are determined according to SCS of 15 KHz ($2^u$×15, where u=0). For SCS of 15 KHz ($2^u$×15, where u=0), there are 10 slots in a system frame. For SCS of 30 KHz ($2^u$×15, where u=1), there are 20 slots in a system frame. For SCS of 60 KHz ($2^u$×15, where u=2), there are 40 slots in a system frame. For SCS of 120 KHz ($2^u$×15, where u=3), there are 80 slots in a system frame. For SCS of 480 KHz ($2^u$×15, where u=5), there are 320 slots in a system frame. For SCS of 960 KHz ($2^u$×15, where u=6), there are 640 slots in a system frame.

Embodiment 19 (Two RA-RNTIs, Scheme 3)

In this embodiment, number of RACH occasions per slot for 480 KHz and 960 KHz are limited to 1 in time domain.

```
- If SCS of PRACH in PRACH configuration of 4 step RA is set to one of 480 KHz and 960 KHz,
    * gnB shall set the parameter msg1-FDM to 1
- Else If SCS of PRACH in PRACH configuration of 4 step RA is set to
one of 1.25, 5, 15, 30, 60 and 120 KHz
    * gnB shall set the parameter msg1-FDM to one of 1, 2, 4, 8
- If SCS of PRACH in PRACH configuration of 2 step RA is set to one of 480 KHz and 960 KHz,
    * gnB shall set the parameter msgA-RO-FDM to 1
- Else If SCS of PRACH in PRACH configuration of 2 step RA is set to
one of 1.25, 5, 15, 30, 60 and 120 KHz
    * gnB shall set the parameter msgA-RO-FDM to one of 1, 2, 4, 8
```

The parameter msg1-FDM is the number of PRACH transmission occasions FDMed in one-time instance. The parameter msgA-RO-FDM is the number of msgA PRACH transmission occasions Frequency-Division Multiplexed in one-time instance In this embodiment of this disclosure for receiving/transmitting RAR for 4 step RA by UE/gNB, two RA-RNTIs are defined, first RA-RNTI and second RA-RNTI are computed as follows:

$$\text{First RA-RNTI}=1+s\_id+14*t\_id+14*80*f\_id+14*80*8*ul\_carrier\_id,$$

where s_id is the index of the first OFDM symbol of the PRACH occasion (0≤s_id<14), t_id is the index of the first slot of the PRACH occasion in a system frame (0≤t_id<80), f_id is the index of the PRACH occasion in the frequency domain (0≤f_id<8), and ul_carrier_id is the UL carrier used for Random Access Preamble transmission (0 for NUL carrier, and 1 for SUL carrier). Slots in a system frame are indexed sequentially starting from zero. The PRACH occasion is the one in which the UE has transmitted preamble. For the gNB operation PRACH occasion is the one in which it has received preamble.

$$\text{Second RA-RNTI}=1+t\_id+640*f\_id+640*8*ul\_carrier\_id,$$

Where t_id is the index of the first slot of the PRACH occasion in a system frame (0≤t_id<640), f_id is the index of the PRACH occasion in the frequency domain (0≤f_id<8), and ul_carrier_id is the UL carrier used for Random Access Preamble transmission (0 for NUL carrier, and 1 for SUL carrier). Slots in a system frame are indexed sequentially starting from zero. The PRACH occasion is the one in which the UE has transmitted preamble. For the gNB operation PRACH occasion is the one in which it has received preamble.

UE/gNB selects between the first RA-RNTI and second RA-RNTI as follows:

UE/gNB first determine the SCS for PRACH (corresponding to the transmitted/received preamble)

SCS for PRACH is signaled by the gNB in the RACH configuration (e.g., the RACH-ConfigCommon for 4 step RA.). The RACH configuration used by the UE is the RACH configuration in the BWP configuration of UL BWP selected for random access procedure. The BWP configuration is signaled by the gNB in system information or in dedicated RRC signaling message (i.e., RRCReconfiguration message). The BWP configuration in system information is typically used in RRC_IDLE/RRC_INACTIVE state. The BWP configuration in dedicated RRC signaling message is typically used in RRC_CONNECTED state.

```
- If SCS of PRACH > 120 KHz (or if SCS of PRACH is 480 KHz or
960 KHz)
    * UE/gNB uses second RA-RNTI for RAR reception/transmission
- Else (if SCS of PRACH equals 1.25, 5, 15, 30, 60 and 120 KHz)
    * UE/gNB uses first RA-RNTI for RAR reception/transmission
```

Note that for PRACH SCS of 1.25 and 5 KHz, number of slots in system frame are determined according to SCS of 15 KHz ($2^u \times 15$, where u=0). For SCS of 15 KHz ($2^u \times 15$, where u=0), there are 10 slots in a system frame. For SCS of 30 KHz ($2^u \times 15$, where u=1), there are 20 slots in a system frame. For SCS of 60 KHz ($2^u \times 15$, where u=2), there are 40 slots in a system frame. For SCS of 120 KHz ($2^u \times 15$, where u=3), there are 80 slots in a system frame. For SCS of 480 KHz ($2^u \times 15$, where u=5), there are 320 slots in a system frame. For SCS of 960 KHz ($2^u \times 15$, where u=6), there are 640 slots in a system frame.

Embodiment 20 (Two MsgB-RNTIs, Scheme 3)

In this embodiment, number of FDMed RACH occasions for 480 KHz and 960 KHz are limited to 1.

```
- If SCS of PRACH in PRACH configuration of 4 step RA is set to one
of 480 KHz and 960 KHz,
    * gnB shall set the parameter msg1-FDM to 1
- Else If SCS of PRACH in PRACH configuration of 4 step RA is set
to
one of 1.25, 5, 15, 30, 60 and 120 KHz
    * gnB shall set the parameter msg1-FDM to one of 1, 2, 4, 8
- If SCS of PRACH in PRACH configuration of 2 step RA is set to one
of 480 KHz and 960 KHz,
    * gnB shall set the parameter msgA-RO-FDM to 1
- Else If SCS of PRACH in PRACH configuration of 2 step RA is set
to
one of 1.25, 5, 15, 30, 60 and 120 KHz
    * gnB shall set the parameter msgA-RO-FDM to one of 1, 2, 4, 8
```

The parameter msg1-FDM is the number of PRACH transmission occasions FDMed in one-time instance. The parameter msgA-RO-FDM is the number of msgA PRACH transmission occasions Frequency-Division Multiplexed in one-time instance In this embodiment of this disclosure for receiving/transmitting MsgB for 2 step RA by UE/gNB, two MsgB-RNTIs are defined, first MsgB-RNTI and second MsgB-RNTI, wherein the first MsgB-RNTI, second MsgB-RNTI are computed as follows:

$$\text{First MsgB-RNTI}=1+s\_id+14*t\_id+14*80*f\_id+14*80*8*ul\_carrier\_id+14*80*8*2,$$

where s_id is the index of the first OFDM symbol of the PRACH occasion (0≤s_id<14), t_id is the index of the first slot of the PRACH occasion in a system frame (0≤t_id<80), f_id is the index of the PRACH occasion in the frequency domain (0≤f_id<8), and ul_carrier_id is the UL carrier used for Random Access Preamble transmission (0 for NUL carrier, and 1 for SUL carrier). Slots in a system frame are indexed sequentially starting from zero. The PRACH occasion is the one in which the UE has transmitted preamble. For the gNB operation PRACH occasion is the one in which it has received preamble.

$$\text{Second MsgB-RNTI}=1+t\_id+640*f\_id+640*8*ul\_carrier\_id+640*8*2,$$

t_id is the index of the first slot of the PRACH occasion in a system frame (0≤t_id<640), f_id is the index of the PRACH occasion in the frequency domain (0≤f_id<8), and ul_carrier_id is the UL carrier used for Random Access Preamble transmission (0 for NUL carrier, and 1 for SUL carrier). Slots in a system frame are indexed sequentially starting from zero. The PRACH occasion is the one in which the UE has transmitted preamble. For the gNB operation PRACH occasion is the one in which it has received preamble.

UE/gNB selects between the first MsgB-RNTI, second MsgB-RNTI as follows:

UE/gNB first determine the SCS for PRACH (corresponding to the transmitted/received preamble)

SCS for PRACH is signaled by the gNB in the RACH configuration (e.g., the RACH-ConfigCommon for 2 step RA.). The RACH configuration used by the UE is the RACH configuration in the BWP configuration of UL BWP selected for random access procedure. The BWP configuration is signaled by the gNB in system information or in dedicated RRC signaling message (i.e., RRCReconfiguration message). The BWP configuration in system information is typically used in RRC_IDLE/RRC_INACTIVE state. The BWP configuration in dedicated RRC signaling message is typically used in RRC_CONNECTED state.

```
- If SCS of PRACH > 120 KHz (or if SCS of PRACH is 480 KHz or
960 KHz)
    * UE/gNB uses second MsgB-RNTI for MsgB
reception/transmission
- Else (if SCS of PRACH equals 1.25. 5, 15, 30, 60 and 120 KHz)
    * UE/gNB uses first MsgB-RNTI for MsgB
reception/transmission
```

Embodiment 21 (Same RA-RNTI Equation, Different t_id Indexing, Scheme 4)

In this embodiment of this disclosure for receiving/transmitting RAR for 4 step RA by UE/gNB, RA-RNTI is computed as follows:

$$\text{RA-RNTI}=1+s\_id+14*t\_id+14*80*f\_id+14*80*8*ul\_carrier\_id,$$

where s_id is the index of the first OFDM symbol of the PRACH occasion (0≤s_id<14), t_id is the index of the first slot of the PRACH occasion in a system frame (0≤t_id<80), f_id is the index of the PRACH occasion in the frequency domain (0≤f_id<8), and ul_carrier_id is the UL carrier used for Random Access Preamble transmission (0 for NUL carrier, and 1 for SUL carrier). The PRACH occasion is the one in which the UE has transmitted preamble. For the gNB operation PRACH occasion is the one in which it has received preamble.

UE/gNB first determine the SCS for PRACH (corresponding to the transmitted/received preamble)

SCS for PRACH is signaled by the gNB in the RACH configuration (e.g., the RACH-ConfigCommon for 4 step RA.). The RACH configuration used by the UE is the RACH configuration in the BWP configuration of UL BWP selected for random access procedure. The BWP configuration is signaled by the gNB in system information or in dedicated RRC signaling message (i.e., RRCReconfiguration message). The BWP configuration in system information is typically used in RRC_IDLE/RRC_INACTIVE state. The BWP configuration in dedicated RRC signaling message is typically used in RRC_CONNECTED state.

```
- If SCS of PRACH > 120 KHz (or if SCS of PRACH is 480 KHz or 960 KHz)
    * t_id = X1 MSBs of slot index; For example, if slot index is 10 bits, X1 can be 3 bits and X2 can be 7 bits.
    * X2 LSBs (or LSBs other than X1 MSBs) of slot index is included in DCI (of the PDCCH addressed to RA-RNTI) or RAR MAC PDU (scheduled by the PDCCH addressed to RA-RNTI).
    * slots in a system frame are indexed sequentially from 0
- Else (if SCS of PRACH equals 1.25, 5, 15, 30, 60 and 120 KHz)
    * t_id = slot index; Slots in a system frame are indexed sequentially from 0
```

Embodiment 22 (Same MsgB-RNTI Equation, Different t_id Indexing, Scheme 4)

In this embodiment of this disclosure for receiving/transmitting MsgB for 2 step RA by UE/gNB, MsgB-RNTI is computed as follows:

$$\text{MsgB-RNTI}=1+s\_id+14*t\_id+14*80*f\_id+14*80*8*ul\_carrier\_id+14*80*8*2,$$

where s_id is the index of the first OFDM symbol of the PRACH occasion (0≤s_id<14), t_id is the index of the first slot of the PRACH occasion in a system frame (0≤t_id<80), f_id is the index of the PRACH occasion in the frequency domain (0≤f_id<8), and ul_carrier_id is the UL carrier used for Random Access Preamble transmission (0 for NUL carrier, and 1 for SUL carrier). The PRACH occasion is the one in which the UE has transmitted preamble. For the gNB operation PRACH occasion is the one in which it has received preamble.

UE/gNB first determine the SCS for PRACH (corresponding to the transmitted/received preamble)

SCS for PRACH is signaled by the gNB in the RACH configuration (e.g., the RACH-ConfigCommon for 2 step RA.). The RACH configuration used by the UE is the RACH configuration in the BWP configuration of UL BWP selected for random access procedure. The BWP configuration is signaled by the gNB in system information or in dedicated RRC signaling message (i.e., RRCReconfiguration message). The BWP configuration in system information is typically used in RRC_IDLE/RRC_INACTIVE state. The BWP configuration in dedicated RRC signaling message is typically used in RRC_CONNECTED state.

```
- If SCS of PRACH > 120 KHz (or if SCS of PRACH is 480 KHz or 960 KHz)
    * t_id = X1 MSBs of slot index; For example, if slot index is 10 bits, X1 can be 3 bits and X2 can be 7 bits.
    * X2 LSBs (or LSBs other than X1 MSBs) of slot index is included in DCI (of the PDCCH addressed to MsgB -RNTI) or MsgB MAC PDU (scheduled by the PDCCH addressed to MsgB-RNTI).
    * slots in a system frame are indexed sequentially from 0
- Else (if SCS of PRACH equals 1.25, 5, 15, 30, 60 and 120 KHz)
    * t_id = slot index; Slots in a system frame are indexed sequentially from 0
```

Note that for PRACH SCS of 1.25 and 5 KHz, number of slots in system frame are determined according to SCS of 15 KHz ($2^u$×15, where u=0). For SCS of 15 KHz ($2^u$×15, where u=0), there are 10 slots in a system frame. For SCS of 30 KHz ($2^u$×15, where u=1), there are 20 slots in a system frame. For SCS of 60 KHz ($2^u$×15, where u=2), there are 40 slots in a system frame. For SCS of 120 KHz ($2^u$×15, where u=3), there are 80 slots in a system frame. For SCS of 480 KHz ($2^u$×15, where u=5), there are 320 slots in a system frame. For SCS of 960 KHz ($2^u$×15, where u=6), there are 640 slots in a system frame.

Embodiment 23 (Same RA-RNTI Equation, Different t_id Indexing, Scheme 5)

In this embodiment of this disclosure for receiving/transmitting RAR for 4 step RA by UE/gNB, RA-RNTI is computed as follows:

$$\text{RA-RNTI}=1+s\_id+14*t\_id+14*80*f\_id+14*80*8*ul\_carrier\_id,$$

where s_id is the index of the first OFDM symbol of the PRACH occasion (0≤s_id<14), t_id is the index of the first slot of the PRACH occasion in a system frame (0≤t_id<80), f_id is the index of the PRACH occasion in the frequency domain (0≤f_id<8), and ul_carrier_id is the UL carrier used for Random Access Preamble transmission (0 for NUL carrier, and 1 for SUL carrier). The PRACH occasion is the one in which the UE has transmitted preamble. For the gNB operation PRACH occasion is the one in which it has received preamble.

UE/gNB first determine the SCS for PRACH (corresponding to the transmitted/received preamble)

SCS for PRACH is signaled by the gNB in the RACH configuration (e.g., the RACH-ConfigCommon for 4 step RA.). The RACH configuration used by the UE is the RACH configuration in the BWP configuration of UL BWP selected for random access procedure. The BWP configuration is signaled by the gNB in system information or in dedicated RRC signaling message (i.e., RRCReconfiguration message). The BWP configuration in system information is typically used in RRC_IDLE/RRC_INACTIVE state. The BWP configuration in dedicated RRC signaling message is typically used in RRC_CONNECTED state.

- If SCS of PRACH > 120 KHz (or if SCS of PRACH is 480 KHz or 960 KHz)
    * t_id = slot index wherein only the slots which are configured with PRACH occasion(s) are sequentially indexed in system frame.
- Else (if SCS of PRACH equals 1.25, 5, 15, 30, 60 and 120 KHz)
    * t_id = slot index; Slots in a system frame are indexed sequentially from 0 irrespective of whether there is a PRACH occasion in slot or not.

Embodiment 24 (Same MsgB-RNTI Equation, Different t_id Indexing, Scheme 5)

In this embodiment of this disclosure for receiving/transmitting MsgB for 2 step RA by UE/gNB, MsgB-RNTI is computed as follows:

$$\text{MsgB-RNTI}=1+s\_id+14*t\_id+14*80*f\_id+14*80*8*ul\_carrier\_id+14*80*8*2,$$

where s_id is the index of the first OFDM symbol of the PRACH occasion (0≤s_id<14), t_id is the index of the first slot of the PRACH occasion in a system frame (0≤t_id<80), f_id is the index of the PRACH occasion in the frequency domain (0≤f_id<8), and ul_carrier_id is the UL carrier used for Random Access Preamble transmission (0 for NUL carrier, and 1 for SUL carrier). The PRACH occasion is the one in which the UE has transmitted preamble. For the gNB operation PRACH occasion is the one in which it has received preamble.

UE/gNB first determine the SCS for PRACH (corresponding to the transmitted/received preamble)

SCS for PRACH is signaled by the gNB in the RACH configuration (e.g., the RACH-ConfigCommon for 2 step RA.). The RACH configuration used by the UE is the RACH configuration in the BWP configuration of UL BWP selected for random access procedure. The BWP configuration is signaled by the gNB in system information or in dedicated RRC signaling message (i.e., RRCReconfiguration message). The BWP configuration in system information is typically used in RRC_IDLE/RRC_INACTIVE state. The BWP configuration in dedicated RRC signaling message is typically used in RRC_CONNECTED state.

- If SCS of PRACH > 120 KHz (or if SCS of PRACH is 480 KHz or 960 KHz)
    * t_id = slot index wherein only those slots within in a system frame which are configured with PRACH occasion(s) are sequentially indexed.
- Else (if SCS of PRACH equals 1.25, 5, 15, 30, 60 and 120 KHz)
    * t_id = slot index wherein Slots in a system frame are indexed sequentially from 0 irrespective of whether there is a PRACH occasion in slot or not.

Note that for PRACH SCS of 1.25 and 5 KHz, number of slots in system frame are determined according to SCS of 15 KHz ($2^u$×15, where u=0). For SCS of 15 KHz ($2^u$×15, where u=0), there are 10 slots in a system frame. For SCS of 30 KHz ($2^u$×15, where u=1), there are 20 slots in a system frame. For SCS of 60 KHz ($2^u$× 15, where u=2), there are 40 slots in a system frame. For SCS of 120 KHz ($2^u$×15, where u=3), there are 80 slots in a system frame. For SCS of 480 KHz ($2^u$×15, where u=5), there are 320 slots in a system frame. For SCS of 960 KHz ($2^u$×15, where u=6), there are 640 slots in a system frame.

Embodiment 25

In this embodiment of this disclosure for receiving/transmitting RAR for 4 step RA by UE/gNB, RA-RNTI is computed as follows:

$$\text{RA-RNTI}=1+s\_id+14*t\_id+14*80*f\_id+14*80*8*ul\_carrier\_id,$$

where s_id is the index of the first OFDM symbol of the PRACH occasion (0≤s_id<14), t_id is the index of the first slot of the PRACH occasion in a system frame (0≤t_id<80), f_id is the index of the PRACH occasion in the frequency domain (0≤f_id<8), and ul_carrier_id is the UL carrier used for Random Access Preamble transmission (0 for NUL carrier, and 1 for SUL carrier). The PRACH occasion is the one in which the UE has transmitted preamble. For the gNB operation PRACH occasion is the one in which it has received preamble.

UE/gNB first determine the SCS for PRACH (corresponding to the transmitted/received preamble)

SCS for PRACH is signaled by the gNB in the RACH configuration (e.g., the RACH-ConfigCommon for 4 step RA.). The RACH configuration used by the UE is the RACH configuration in the BWP configuration of UL BWP selected for random access procedure. The BWP configuration is signaled by the gNB in system information or in dedicated RRC signaling message (i.e., RRCReconfiguration message). The BWP configuration in system information is typically used in RRC_IDLE/RRC_INACTIVE state. The BWP configuration in dedicated RRC signaling message is typically used in RRC_CONNECTED state.

If SCS of PRACH>120 KHz (or if SCS of PRACH is 480 KHz or 960 KHz)

UE assumes that SCS is 120 KHz and determines the t_id according to SCS of 120 KHz. In this case, the UE determines the slot number/index (i.e., t_id) of the first slot of the PRACH occasion in which preamble is transmitted, wherein the system frame consists of 80 slots.

Else if SCS of PRACH equals 1.25 or 5 KHz

UE assumes that SCS is 15 KHz and determines the t_id according to SCS of 15 KHz. In this case, the UE determines the slot number/index (i.e., t_id) of first slot of PRACH occasion in which preamble is transmitted, wherein the system frame consists of 10 slots.

Else if SCS of PRACH equals 15, 30, 60 and 120 KHz

UE determines t_id according to PRACH SCS. In this case, the UE determines the slot number/index (t_id) of first slot of PRACH occasion in which preamble is transmitted, wherein the system frame consists of 10 slots, 20, 40, 80 slots for SCS of 15, 30, 60 and 120 KHz respectively.

In this embodiment of this disclosure for receiving/transmitting MsgB for 2 step RA by UE/gNB, MsgB-RNTI is computed as follows:

$$\text{MsgB-RNTI}=1+s\_id+14*t\_id+14*80*f\_id+14*80*8*ul\_carrier\_id+14*80*8*2,$$

where s_id is the index of the first OFDM symbol of the PRACH occasion (0≤s_id<14), t_id is the index of the first slot of the PRACH occasion in a system frame (0≤t_id<80), f_id is the index of the PRACH occasion in the frequency domain (0≤f_id<8), and ul_carrier_id is the UL carrier used for Random Access Preamble transmission (0 for NUL carrier, and 1 for SUL carrier). The PRACH occasion is the one in which the UE has transmitted preamble. For the gNB operation PRACH occasion is the one in which it has received preamble.

- UE/gNB first determine the SCS for PRACH (corresponding to the transmitted/received preamble)
  - SCS for PRACH is signaled by the gNB in the RACH configuration (e.g. the RACH-ConfigCommon for 2 step RA.). The RACH configuration used by the UE is the RACH configuration in the BWP configuration of UL BWP selected for random access procedure. The BWP configuration is signaled by the gNB in system information or in dedicated RRC signaling message (i.e., RRCReconfiguration message). The BWP configuration in system information is typically used in RRC_IDLE/RRC_INACTIVE state. The BWP configuration in dedicated RRC signaling message is typically used in RRC_CONNECTED state.
- If SCS of PRACH>120 KHz (or if SCS of PRACH is 480 KHz or 960 KHz)
  - UE assumes that SCS is 120 KHz and determines the t_id according to SCS of 120 KHz. In this case, the UE determines the slot number/index (i.e t_id) of first slot of PRACH occasion in which preamble is transmitted, wherein the system frame consists of 80 slots.
- Else if SCS of PRACH equals 1.25 or 5 KHz
  - UE assumes that SCS is 15 KHz and determines the t_id according to SCS of 15 KHz. In this case, the UE determines the slot number/index (i.e., t_id) of first slot of PRACH occasion in which preamble is transmitted, wherein the system frame consists of 10 slots.
- Else if SCS of PRACH equals 15, 30, 60 and 120 KHz
  - UE determines t_id according to PRACH SCS. In this case, the UE determines the slot number/index (i.e., t_id) of first slot of PRACH occasion in which preamble is transmitted, wherein the system frame consists of 10 slots, 20, 40, 80 slots for SCS of 15, 30, 60 and 120 KHz respectively.

Throughout the various embodiments above, the UE/gNB determine RA-RNTI and/or MsgB-RNTI based on the SCS for PRACH corresponding to the transmitted/received preamble. Meanwhile, the UE/gNB can also use SCS for RAR (or, SCS for message 2 or MSG B) instead of the SCS for PRACH, for determining and/or selecting RA-RNTI and/or MsgB-RNTI. Here, the UE/gNB can determined the SCS for RAR (or, SCS for message 2 or MSG B) based on information signaled by the gNB in the MIB and a frequency range of a carrier frequency on which the MIB is signaled.

Instead of the SCS of PRACH, the SCS of Msg2/MsgB can be used wherein the SCS of Msg2/MsgB is received from the gNB in system information block SIB (e.g. SIB1).

Instead of the SCS of PRACH, SCS of UL BWP in which PRACH is transmitted can be used, wherein the SCS of UL BWP is received from the gNB in BWP configuration. The BWP configuration is received from the gNB in SIB1 or dedicated RRC signaling message (e.g. RRCReconfiguration message).

Figure 17:
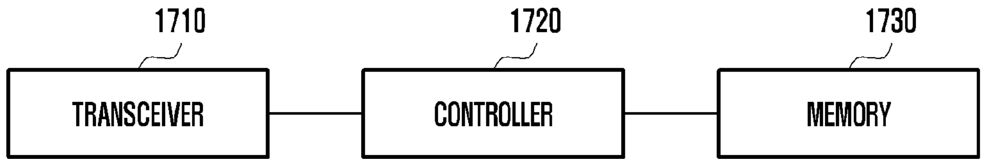
FIG. 17 is a block diagram of a terminal according to an embodiment of the disclosure.

FIG. 17 is a block diagram of a terminal according to an embodiment of the disclosure.

Referring to FIG. 17, a terminal includes a transceiver 1710, a controller 1720 and a memory 1730. The controller 1720 may refer to a circuitry, an application-specific integrated circuit (ASIC), or at least one processor. The transceiver 1710, the controller 1720 and the memory 1730 are configured to perform the operations of the terminal illustrated in the FIGS. 1 to 3, 4A, 4B, 5A, 5B, 6A, 6B, 7A, 7B, 8, 9A, 9B, 10A, 10B, 11A, 11B 12A, 12B, 13A, 13B, 14A, 14B, 15A, 15B, 16A, and 16B, or described above. Although the transceiver 1710, the controller 1720 and the memory 1730 are shown as separate entities, they may be realized as a single entity like a single chip. Or, the transceiver 1710, the controller 1720 and the memory 1730 may be electrically connected to or coupled with each other.

The transceiver 1710 may transmit and receive signals to and from other network entities, e.g., a base station.

The controller 1720 may control the terminal to perform functions according to one of the embodiments described above. For example, the controller 1720 controls the transceiver 1710 and/or memory 1730 to perform random access related procedures according to various embodiments of the disclosure.

In an embodiment, the operations of the terminal may be implemented using the memory 1730 storing corresponding program codes. Specifically, the terminal may be equipped with the memory 1730 to store program codes implementing desired operations. To perform the desired operations, the controller 1720 may read and execute the program codes stored in the memory 1730 by using at least one processor or a CPU.

Figure 18:
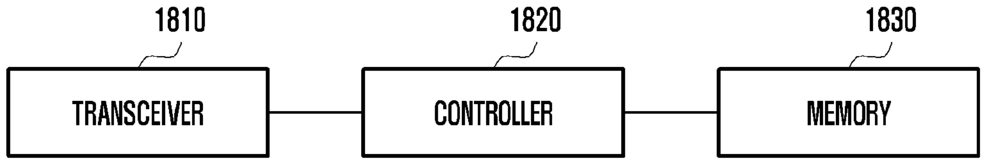
FIG. 18 is a block diagram of a base station according to an embodiment of the disclosure.

FIG. 18 is a block diagram of a base station according to an embodiment of the disclosure.

Referring to FIG. 18, a base station includes a transceiver 1810, a controller 1820 and a memory 1830. The controller 1820 may refer to a circuitry, an ASIC, or at least one processor. The transceiver 1810, the controller 1820 and the memory 1830 are configured to perform the operations of the base station illustrated in the FIGS. 1 to 3, 4A, 4B, 5A, 5B, 6A, 6B, 7A, 7B, 8, 9A, 9B, 10A, 10B, 11A, 11B 12A, 12B, 13A, 13B, 14A, 14B, 15A, 15B, 16A, and 16B, or described above. Although the transceiver 1810, the controller 1820 and the memory 1830 are shown as separate entities, they may be realized as a single entity like a single chip. Or, the transceiver 1810, the controller 1820 and the memory 1830 may be electrically connected to or coupled with each other.

The transceiver 1810 may transmit and receive signals to and from other network entities, e.g., a terminal or a UE.

The controller 1820 may control the base station to perform functions according to one of the embodiments described above. For example, the controller 1820 controls the transceiver 1810 and/or memory 1830 to perform random access related procedures according to various embodiments of the disclosure.

In an embodiment, the operations of the base station may be implemented using the memory 1830 storing corresponding program codes. Specifically, the base station may be equipped with the memory 1830 to store program codes implementing desired operations. To perform the desired operations, the controller 1820 may read and execute the program codes stored in the memory 1830 by using at least one processor or a CPU.

While the disclosure has been shown and described with reference to various embodiments thereof, it will be understood by those skilled in the art that various changes in form and details may be made therein without departing from the spirit and scope of the disclosure as defined by the appended claims and their equivalents.

As described above, embodiments disclosed in the specification and drawings are merely used to present specific examples to easily explain the contents of the disclosure and to help understanding, but are not intended to limit the scope of the disclosure. Accordingly, the scope of the disclosure should be analyzed to include all changes or modifications derived based on the technical concept of the disclosure in addition to the embodiments disclosed herein.

What is claimed is:

1. A method performed by a terminal in a wireless communication system, the method comprising:

receiving, from a base station, physical random access channel (PRACH) configuration information;

transmitting, to the base station, a random access preamble for a random access procedure in a PRACH occasion; and monitoring a physical downlink control channel (PDCCH) addressed to a radio network temporary identifier (RNTI) in a random access response window, wherein the RNTI is identified based on an index of a first slot of the PRACH occasion in a system frame in which the random access preamble is transmitted, wherein, in case that a subcarrier spacing is 15 kHz, 30 kHz, 60 kHz, or 120 kHz, the index of the first slot of the PRACH occasion in the system frame is determined based on the subcarrier spacing, and wherein, in case that a subcarrier spacing is 480 kHz or 960 kHz, the index of the first slot of the PRACH occasion in the system frame is determined based on an index of a slot for a subcarrier spacing of 120 kHz, where the index of the first slot of the PRACH occasion in the system frame is equal to or larger than 0 and less than 80.

2. The method of claim 1, wherein a number of slots in the system frame is 80 for the subcarrier spacing of 120 kHz, and the index of the slot for the subcarrier spacing of 120 kHz is numbered in the system frame from 0 to 79.

3. The method of claim 1, wherein, in case that the random access procedure is a 4-step random access procedure, the RNTI is a random access RNTI (RA-RNTI) and is identified by:

$$RA\text{-}RNTI=1+s\_id+14*t\_id+14*80*f\_id+14*80*8*ul\_carrier\_id,$$

where s_id is an index of a first orthogonal frequency division multiplexing (OFDM) symbol of the PRACH occasion, t_id is the index of the first slot of the PRACH occasion in the system frame, f_id is an index of the PRACH occasion in a frequency domain, and ul_carrier_id indicates an uplink carrier used for the random access preamble.

4. The method of claim 1, wherein, in case that the random access procedure is a 2-step random access procedure, the RNTI is a message B RNTI (MSGB-RNTI) and is identified by:

$$MSGB\text{-}RNTI=1+s\_id+14*t\_id+14*80*f\_id+14*80*8*ul\_carrier\_id+14*80*8*2,$$

where s_id is an index of a first orthogonal frequency division multiplexing (OFDM) symbol of the PRACH occasion, t_id is the index of the first slot of the PRACH occasion in the system frame, f_id is an index of the PRACH occasion in a frequency domain, and ul_carrier_id indicates an uplink carrier used for the random access preamble.

5. A method performed by a base station in a wireless communication system, the method comprising:

transmitting, to a terminal, physical random access channel (PRACH) configuration information;

receiving, from the terminal, a random access preamble for a random access procedure in a PRACH occasion; and transmitting, to the terminal, a physical downlink control channel (PDCCH) addressed to a radio network temporary identifier (RNTI) in a random access response window, wherein the RNTI is identified based on an index of a first slot of the PRACH occasion in a system frame in which the random access preamble is received, wherein, in case that a subcarrier spacing is 15 kHz, 30 kHz, 60 kHz, or 120 kHz, the index of the first slot of the PRACH occasion in the system frame is determined based on the subcarrier spacing, and wherein, in case that a subcarrier spacing is 480 kHz or 960 kHz, the index of the first slot of the PRACH occasion in the system frame is determined based on an index of a slot for a subcarrier spacing of 120 kHz, where the index of the first slot of the PRACH occasion in the system frame is equal to or larger than 0 and less than 80.

6. The method of claim 5, wherein a number of slots in the system frame is 80 for the subcarrier spacing of 120 kHz, and the index of the slot for the subcarrier spacing of 120 kHz is numbered in the system frame from 0 to 79.

7. The method of claim 5, wherein, in case that the random access procedure is a 4-step random access procedure, the RNTI is a random access RNTI (RA-RNTI) and is identified by:

$$RA\text{-}RNTI=1+s\_id+14*t\_id+14*80*f\_id+14*80*8*ul\_carrier\_id,$$

where s_id is an index of a first orthogonal frequency division multiplexing (OFDM) symbol of the PRACH occasion, t_id is the index of the first slot of the PRACH occasion in the system frame, f_id is an index of the PRACH occasion in a frequency domain, and ul_carrier_id indicates an uplink carrier used for the random access preamble.

8. The method of claim 5, wherein, in case that the random access procedure is a 2-step random access procedure, the RNTI is a message B RNTI (MSGB-RNTI) and is identified by:

$$MSGB\text{-}RNTI=1+s\_id+14*t\_id+14*80*f\_id+14*80*8*ul\_carrier\_id+14*80*8*2,$$

where s_id is an index of a first orthogonal frequency division multiplexing (OFDM) symbol of the PRACH occasion, t_id is the index of the first slot of the PRACH occasion in the system frame, f_id is an index of the PRACH occasion in a frequency domain, and ul_carrier_id indicates an uplink carrier used for the random access preamble.

9. A terminal in a wireless communication system, the terminal comprising:

a transceiver configured to transmit or receive a signal; and a controller coupled with the transceiver and configured to:

receive, from a base station, physical random access channel (PRACH) configuration information, transmit, to the base station, a random access preamble for a random access procedure in a PRACH occasion, and monitor a physical downlink control channel (PDCCH) addressed to a radio network temporary identifier (RNTI) in a random access response window, wherein the RNTI is identified based on an index of a first slot of the PRACH occasion in a system frame in which the random access preamble is transmitted, wherein, in case that a subcarrier spacing is 15 kHz, 30 kHz, 60 kHz, or 120 kHz, the index of the first slot of the PRACH occasion in the system frame is determined based on the subcarrier spacing, and wherein, in case that a subcarrier spacing is 480 kHz or 960 kHz, the index of the first slot of the PRACH occasion in the system frame is determined based on an index of a slot for a subcarrier spacing of 120 kHz, where the index of the first slot of the PRACH occasion in the system frame is equal to or larger than 0 and less than 80.

10. The terminal of claim 9, wherein a number of slots in the system frame is 80 for the subcarrier spacing of 120 kHz, and the index of the slot for the subcarrier spacing of 120 kHz is numbered in the system frame from 0 to 79.

11. The terminal of claim 9, wherein, in case that the random access procedure is a 4-step random access procedure, the RNTI is a random access RNTI (RA-RNTI) and is identified by:

$$\text{RA-RNTI}=1+s\_id+14*t\_id+14*80*f\_id+14*80*8*ul\_carrier\_id,$$

where s_id is an index of a first orthogonal frequency division multiplexing (OFDM) symbol of the PRACH occasion, t_id is the index of the first slot of the PRACH occasion in the system frame, f_id is an index of the PRACH occasion in a frequency domain, and ul_carrier_id indicates an uplink carrier used for the random access preamble.

12. The terminal of claim 9, wherein, in case that the random access procedure is a 2-step random access procedure, the RNTI is a message B RNTI (MSGB-RNTI) and is identified by:

$$\text{MSGB-RNTI}=1+s\_id+14*t\_id+14*80*f\_id+14*80*8*ul\_carrier\_id+14*80*8*2,$$

where s_id is an index of a first orthogonal frequency division multiplexing (OFDM) symbol of the PRACH occasion, t_id is the index of the first slot of the PRACH occasion in the system frame, f_id is an index of the PRACH occasion in a frequency domain, and ul_carrier_id indicates an uplink carrier used for the random access preamble.

13. A base station in a wireless communication system, the base station comprising:

a transceiver configured to transmit or receive a signal; and a controller coupled with the transceiver and configured to:

transmit, to a terminal, physical random access channel (PRACH) configuration information, receive, from the terminal, a random access preamble for a random access procedure in a PRACH occasion, and transmit, to the terminal, a physical downlink control channel (PDCCH) addressed to a radio network temporary identifier (RNTI) in a random access response window, wherein the RNTI is identified based on an index of a first slot of the PRACH occasion in a system frame in which the random access preamble is received, wherein, in case that a subcarrier spacing is 15 kHz, 30 kHz, 60 kHz, or 120 kHz, the index of the first slot of the PRACH occasion in the system frame is determined based on the subcarrier spacing, and wherein, in case that a subcarrier spacing is 480 kHz or 960 kHz, the index of the first slot of the PRACH occasion in the system frame is determined based on an index of a slot for a subcarrier spacing of 120 kHz, where the index of the first slot of the PRACH occasion in the system frame is equal to or larger than 0 and less than 80.

14. The base station of claim 13, wherein a number of slots in the system frame is 80 for the subcarrier spacing of 120 kHz, and the index of the slot for the subcarrier spacing of 120 kHz is numbered in the system frame from 0 to 79.

15. The base station of claim 13, wherein, in case that the random access procedure is a 4-step random access procedure, the RNTI is a random access RNTI (RA-RNTI) and is identified by:

$$\text{RA-RNTI}=1+s\_id+14*t\_id+14*80*f\_id+14*80*8*ul\_carrier\_id,$$

where s_id is an index of a first orthogonal frequency division multiplexing (OFDM) symbol of the PRACH occasion, t_id is the index of the first slot of the PRACH occasion in the system frame, f_id is an index of the PRACH occasion in a frequency domain, and ul_carrier_id indicates an uplink carrier used for the random access preamble.

16. The base station of claim 13, wherein, in case that the random access procedure is a 2-step random access procedure, the RNTI is a message B RNTI (MSGB-RNTI) and is identified by:

$$\text{MSGB-RNTI}=1+s\_id+14*t\_id+14*80*f\_id+14*80*8*ul\_carrier\_id+14*80*8*2,$$

where s_id is an index of a first orthogonal frequency division multiplexing (OFDM) symbol of the PRACH occasion, t_id is the index of the first slot of the PRACH occasion in the system frame, f_id is an index of the PRACH occasion in a frequency domain, and ul_carrier_id indicates an uplink carrier used for the random access preamble.

* * * * *